US008620480B2

(12) United States Patent
 Alexanian

(10) Patent No.: US 8,620,480 B2
(45) Date of Patent: *Dec. 31, 2013

(54) IRRIGATION WATER CONSERVATION WITH AUTOMATED WATER BUDGETING AND TIME OF USE TECHNOLOGY

(76) Inventor: George Alexanian, Fresno, CA (US)

( * ) Notice: Subject to any disclaimer, the term of this patent is extended or adjusted under 35 U.S.C. 154(b) by 235 days.

This patent is subject to a terminal disclaimer.

(21) Appl. No.: 12/955,839

(22) Filed: Nov. 29, 2010

(65) Prior Publication Data

US 2011/0093123 A1 Apr. 21, 2011

Related U.S. Application Data

(63) Continuation-in-part of application No. 11/879,700, filed on Jul. 17, 2007, now Pat. No. 7,844,368, which is a continuation-in-part of application No. 11/336,690, filed on Jan. 20, 2006, now Pat. No. 7,266,428, which is a continuation-in-part of application No. 10/824,667, filed on Apr. 13, 2004, now Pat. No. 7,058,478.

(60) Provisional application No. 60/465,457, filed on Apr. 25, 2003, provisional application No. 60/831,904, filed on Jul. 20, 2006, provisional application No. 60/899,200, filed on Feb. 1, 2007.

(51) Int. Cl.
 *G05D 11/00* (2006.01)
 *A01G 25/00* (2006.01)

(52) U.S. Cl.
 USPC .............................. 700/284; 239/69

(58) Field of Classification Search
 USPC ............... 700/284; 239/68–70, 723; 137/78.1–78.3, 624.11–624.15, 137/624.21; 405/36, 37
 See application file for complete search history.

(56) References Cited

U.S. PATENT DOCUMENTS

| 3,058,346 A | 10/1962 | Rudomanski et al. |
| 3,114,243 A | 12/1963 | Winters |
| 3,372,899 A | 3/1968 | McPhearson |
| 3,653,595 A | 4/1972 | Greengard et al. |

(Continued)

FOREIGN PATENT DOCUMENTS

WO 0246852 6/2002

OTHER PUBLICATIONS

"Report on Performance of ET Based Irrigation Controller—Analysis of Operation of WeatherTRAK (TM) Controller in Field Conditions During 2002," Aquacraft, Inc., Apr. 23, 2003.*

(Continued)

*Primary Examiner* — M. N. Von Buhr
(74) *Attorney, Agent, or Firm* — Mark D. Miller

(57) ABSTRACT

The present invention provides a multitude of embodiments for landscape water conservation with automated water budgeting or seasonal adjustment. Water budget automation may be implemented within an irrigation controller, by means of an add-on or a plug-in to the controller, or broadcast from a central location. The environmental data used for automated water budgeting may be historical including ambient temperature, wind, solar radiation, relative humidity, soil moisture, soil temperature, or evapotranspiration, or combinations thereof, or with a combination of current sensor data. The automated water budgeting may be accomplished with a percentage accumulation method which adjusts watering intervals and schedules, or on a daily percentage basis. In addition, government based restricted watering schedules may be combined within all the above embodiments to provide additional flexibility for water conservation.

184 Claims, 35 Drawing Sheets

(56) References Cited

U.S. PATENT DOCUMENTS

| | | |
|---|---|---|
| 3,726,477 A | 4/1973 | Shapiro |
| 3,787,728 A | 1/1974 | Bayer et al. |
| 3,902,825 A | 9/1975 | Quillen |
| 3,987,845 A | 10/1976 | Potthoff et al. |
| 4,010,898 A | 3/1977 | Williams |
| 4,146,049 A | 3/1979 | Kruse et al. |
| 4,176,395 A | 11/1979 | Evelyn-Veere |
| 4,185,650 A | 1/1980 | Neves et al. |
| 4,208,630 A | 6/1980 | Martinez |
| 4,209,131 A | 6/1980 | Barash et al. |
| 4,265,403 A | 5/1981 | Bonetti |
| 4,333,490 A | 6/1982 | Enter, Sr. |
| RE31,023 E | 9/1982 | Hall, III |
| 4,396,149 A | 8/1983 | Hirsch |
| 4,396,150 A | 8/1983 | Burrough |
| 4,431,338 A | 2/1984 | Hornabrook |
| 4,502,288 A | 3/1985 | Lynch |
| 4,526,034 A | 7/1985 | Campbell et al. |
| 4,545,396 A | 10/1985 | Miller et al. |
| 4,548,225 A | 10/1985 | Busalacchi |
| 4,567,563 A | 1/1986 | Hirsch |
| 4,569,020 A | 2/1986 | Snoddy et al. |
| 4,575,004 A | 3/1986 | Geiger |
| 4,599,889 A | 7/1986 | Pateras Pescara de Castelluccio |
| 4,613,077 A | 9/1986 | Aronson |
| 4,613,764 A | 9/1986 | Lobato |
| 4,626,984 A | 12/1986 | Unruh et al. |
| 4,646,224 A | 2/1987 | Ransburg et al. |
| 4,684,920 A | 8/1987 | Reiter |
| 4,691,341 A | 9/1987 | Knoble et al. |
| 4,709,585 A | 12/1987 | Altenhofen |
| 4,755,942 A | 7/1988 | Gardner et al. |
| 4,789,097 A | 12/1988 | Anderson et al. |
| 4,837,499 A | 6/1989 | Scherer, III |
| 4,852,802 A | 8/1989 | Iggulden et al. |
| 4,856,227 A | 8/1989 | Oglevee et al. |
| 4,858,377 A | 8/1989 | Oglevee et al. |
| 4,876,647 A | 10/1989 | Gardner et al. |
| 4,913,351 A | 4/1990 | Costa |
| 4,921,001 A | 5/1990 | Pittsinger |
| 4,922,433 A | 5/1990 | Mark |
| 4,934,400 A | 6/1990 | Cuming |
| 4,952,868 A | 8/1990 | Scherer, III |
| 4,962,522 A | 10/1990 | Marian |
| 4,967,789 A | 11/1990 | Kypris |
| 4,992,942 A | 2/1991 | Bauerle et al. |
| 5,023,787 A | 6/1991 | Evelyn-Veere |
| 5,097,861 A | 3/1992 | Hopkins et al. |
| 5,101,083 A | 3/1992 | Tyler et al. |
| 5,121,340 A | 6/1992 | Campbell et al. |
| 5,141,332 A | 8/1992 | Bergstein |
| 5,148,826 A | 9/1992 | Bakhshaei |
| 5,208,855 A | 5/1993 | Marian |
| 5,229,937 A | 7/1993 | Evelyn-Veere |
| 5,244,177 A | 9/1993 | Campbell et al. |
| 5,251,153 A | 10/1993 | Nielsen et al. |
| 5,321,578 A | 6/1994 | Morrison et al. |
| 5,337,957 A | 8/1994 | Olson |
| 5,341,831 A | 8/1994 | Zur |
| 5,355,122 A | 10/1994 | Erickson |
| 5,375,617 A | 12/1994 | Young |
| 5,444,611 A | 8/1995 | Woytowitz et al. |
| 5,445,176 A | 8/1995 | Goff |
| 5,465,904 A | 11/1995 | Vaello |
| 5,479,338 A | 12/1995 | Ericksen et al. |
| 5,479,339 A | 12/1995 | Miller |
| 5,638,847 A | 6/1997 | Hoch, Jr. et al. |
| 5,696,671 A | 12/1997 | Oliver |
| 5,740,031 A | 4/1998 | Gagnon |
| 5,836,339 A | 11/1998 | Klever et al. |
| 5,839,660 A | 11/1998 | Morganstern et al. |
| 5,853,122 A | 12/1998 | Capiro |
| 5,870,302 A | 2/1999 | Oliver |
| 5,908,157 A | 6/1999 | Antonellis et al. |
| 5,921,280 A | 7/1999 | Ericksen et al. |
| 5,960,813 A | 10/1999 | Sturman et al. |
| 6,016,971 A | 1/2000 | Welch et al. |
| 6,076,740 A | 6/2000 | Townsend |
| 6,088,621 A | 7/2000 | Woytowitz et al. |
| 6,098,898 A | 8/2000 | Storch |
| 6,102,061 A | 8/2000 | Addink |
| 6,145,755 A | 11/2000 | Feltz |
| 6,173,727 B1 | 1/2001 | Davey |
| 6,227,220 B1 | 5/2001 | Addink |
| 6,250,091 B1 | 6/2001 | Jerome |
| 6,257,264 B1 | 7/2001 | Sturman et al. |
| 6,259,955 B1 | 7/2001 | Brundisini et al. |
| 6,267,298 B1 | 7/2001 | Campbel |
| 6,298,285 B1 | 10/2001 | Addink et al. |
| 6,312,191 B1 | 11/2001 | Rosenfeld |
| 6,314,340 B1 | 11/2001 | Mecham et al. |
| 6,343,255 B1 | 1/2002 | Peek et al. |
| 6,397,162 B1 | 5/2002 | Ton |
| 6,401,742 B1 | 6/2002 | Cramer et al. |
| 6,402,048 B1 | 6/2002 | Collins |
| 6,452,499 B1 | 9/2002 | Runge et al. |
| 6,453,215 B1 | 9/2002 | Lavoie |
| 6,453,216 B1 | 9/2002 | McCabe et al. |
| 6,585,168 B1 | 7/2003 | Capiro |
| 6,589,033 B1 | 7/2003 | Johnson et al. |
| 6,675,098 B2 | 1/2004 | Peek et al. |
| 6,714,134 B2 | 3/2004 | Addink et al. |
| 6,748,327 B1 | 6/2004 | Watson |
| 6,766,817 B2 | 7/2004 | da Silva |
| 6,795,767 B2 | 9/2004 | Nakamoto et al. |
| 6,823,239 B2 | 11/2004 | Sieminski |
| 6,892,113 B1 | 5/2005 | Addink et al. |
| 6,892,114 B1 | 5/2005 | Addink et al. |
| 6,895,987 B2 | 5/2005 | Addink et al. |
| 6,898,467 B1 | 5/2005 | Smith et al. |
| 6,918,404 B2 | 7/2005 | Dias da Silva |
| 6,938,834 B2 | 9/2005 | Harris |
| 6,944,523 B2 | 9/2005 | Addink et al. |
| 6,947,811 B2 | 9/2005 | Addink et al. |
| 6,950,728 B1 | 9/2005 | Addink et al. |
| 6,963,808 B1 | 11/2005 | Addink et al. |
| 7,010,394 B1 | 3/2006 | Runge et al. |
| 7,010,396 B2 * | 3/2006 | Ware et al. ............... 700/284 |
| 7,048,204 B1 | 5/2006 | Addink et al. |
| 7,050,887 B2 | 5/2006 | Alvarez |
| 7,058,478 B2 | 6/2006 | Alexanian |
| 7,058,479 B2 | 6/2006 | Miller |
| 7,063,270 B2 * | 6/2006 | Bowers et al. ............... 239/1 |
| 7,066,586 B2 | 6/2006 | da Silva |
| 7,096,094 B2 | 8/2006 | Addink et al. |
| 7,165,730 B2 | 1/2007 | Clark et al. |
| 7,229,026 B2 * | 6/2007 | Evelyn-Veere ............... 239/11 |
| 7,236,908 B2 | 6/2007 | Timko et al. |
| 7,243,005 B1 | 7/2007 | Beutler et al. |
| 7,245,991 B1 * | 7/2007 | Woytowitz ............... 700/284 |
| 7,248,945 B2 | 7/2007 | Woytowitz |
| 7,266,428 B2 | 9/2007 | Alexanian |
| 7,286,904 B2 | 10/2007 | Graham |
| 7,317,972 B2 | 1/2008 | Addink et al. |
| 7,330,796 B2 | 2/2008 | Addink et al. |
| 7,337,042 B2 | 2/2008 | Marian et al. |
| 7,363,113 B2 | 4/2008 | Runge et al. |
| 7,403,840 B2 | 7/2008 | Moore et al. |
| 7,406,363 B2 | 7/2008 | Doering et al. |
| 7,412,303 B1 | 8/2008 | Porter et al. |
| 7,413,380 B2 | 8/2008 | Corwon et al. |
| 7,430,458 B2 | 9/2008 | Dansereau et al. |
| 7,439,867 B2 | 10/2008 | Staples |
| 7,444,207 B2 | 10/2008 | Nickerson et al. |
| 7,487,925 B2 | 2/2009 | Skinner |
| 7,513,755 B2 | 4/2009 | Geisinger et al. |
| 7,522,975 B2 | 4/2009 | Perez |
| 7,532,954 B2 | 5/2009 | Evelyn-Veere et al. |
| 7,552,632 B2 | 6/2009 | Runge et al. |
| 7,584,023 B1 | 9/2009 | Palmer et al. |
| 7,596,429 B2 | 9/2009 | Cardinal et al. |
| 7,613,546 B2 | 11/2009 | Nelson et al. |
| 7,640,079 B2 | 12/2009 | Nickerson et al. |
| 7,769,494 B1 | 8/2010 | Simon et al. |

(56) References Cited

U.S. PATENT DOCUMENTS

| | | | |
|---|---|---|---|
| 7,788,970 B2 | 9/2010 | Hitt et al. | |
| 7,805,221 B2 | 9/2010 | Nickerson | |
| 7,810,515 B2 | 10/2010 | Nies et al. | |
| 7,844,368 B2* | 11/2010 | Alexanian | 700/284 |
| 7,853,363 B1 | 12/2010 | Porter et al. | |
| 7,877,168 B1 | 1/2011 | Porter et al. | |
| 7,953,517 B1* | 5/2011 | Porter et al. | 700/284 |
| 7,957,843 B2 | 6/2011 | Sacks | |
| 7,962,244 B2* | 6/2011 | Alexanian | 700/284 |
| 7,962,245 B2 | 6/2011 | Runge et al. | |
| 7,966,153 B2* | 6/2011 | Bangalore | 702/188 |
| 8,014,904 B1* | 9/2011 | Woytowitz | 700/284 |
| 8,145,357 B2* | 3/2012 | Nibler et al. | 700/276 |
| 8,150,554 B2 | 4/2012 | Anderson | |
| 8,193,930 B2 | 6/2012 | Petite et al. | |
| 8,215,570 B2 | 7/2012 | Hitt | |
| 8,401,705 B2 | 3/2013 | Alexanian | |
| 8,443,822 B2 | 5/2013 | Ivans | |
| 2001/0049563 A1 | 12/2001 | Addink et al. | |
| 2002/0002425 A1 | 1/2002 | Dossey et al. | |
| 2002/0010516 A1 | 1/2002 | Addink | |
| 2002/0020441 A1 | 2/2002 | Addink | |
| 2002/0027504 A1 | 3/2002 | Davis | |
| 2002/0060631 A1 | 5/2002 | Runge et al. | |
| 2002/0072829 A1 | 6/2002 | Addink et al. | |
| 2002/0091452 A1 | 7/2002 | Addink et al. | |
| 2002/0092965 A1 | 7/2002 | Addink et al. | |
| 2003/0025400 A1 | 2/2003 | Hall | |
| 2003/0080199 A1 | 5/2003 | Condreva | |
| 2003/0109964 A1 | 6/2003 | Addink et al. | |
| 2003/0178070 A1 | 9/2003 | Glicken | |
| 2003/0179102 A1 | 9/2003 | Barnes | |
| 2003/0182022 A1 | 9/2003 | Addink et al. | |
| 2003/0183018 A1 | 10/2003 | Addink et al. | |
| 2003/0208306 A1 | 11/2003 | Addink et al. | |
| 2003/0230638 A1 | 12/2003 | Dukes et al. | |
| 2004/0011880 A1 | 1/2004 | Addink et al. | |
| 2004/0015270 A1 | 1/2004 | Addink et al. | |
| 2004/0039489 A1 | 2/2004 | Moore et al. | |
| 2004/0089164 A1 | 5/2004 | Addink et al. | |
| 2004/0117070 A1 | 6/2004 | Barker | |
| 2004/0194833 A1* | 10/2004 | Townsend et al. | 137/624.11 |
| 2004/0217189 A1 | 11/2004 | Regli | |
| 2005/0019184 A1 | 1/2005 | Geisinger et al. | |
| 2005/0137752 A1 | 6/2005 | Alvarez | |
| 2005/0187665 A1 | 8/2005 | Fu | |
| 2005/0250440 A1 | 11/2005 | Zhou et al. | |
| 2005/0279856 A1 | 12/2005 | Nalbandian et al. | |
| 2006/0043208 A1 | 3/2006 | Graham | |
| 2006/0091245 A1 | 5/2006 | Ivans | |
| 2006/0116792 A1 | 6/2006 | Addink | |
| 2006/0122735 A1 | 6/2006 | Goldberg et al. | |
| 2006/0155489 A1 | 7/2006 | Addink | |
| 2006/0217846 A1 | 9/2006 | Woytowitz | |
| 2006/0293797 A1 | 12/2006 | Weiler | |
| 2007/0016334 A1 | 1/2007 | Smith et al. | |
| 2007/0156318 A1 | 7/2007 | Anderson et al. | |
| 2007/0179674 A1 | 8/2007 | Ensworth et al. | |
| 2007/0191991 A1 | 8/2007 | Addink | |
| 2007/0221744 A1 | 9/2007 | Simon et al. | |
| 2007/0282486 A1 | 12/2007 | Walker et al. | |
| 2007/0293990 A1 | 12/2007 | Alexanian | |
| 2008/0027586 A1 | 1/2008 | Hern et al. | |
| 2008/0119948 A1 | 5/2008 | O'Connor | |
| 2008/0167931 A1* | 7/2008 | Gerstemeier et al. | 705/8 |
| 2009/0043427 A1 | 2/2009 | Addink | |
| 2009/0094097 A1* | 4/2009 | Gardenswartz | 705/10 |
| 2009/0138105 A1 | 5/2009 | Crawford | |
| 2009/0202366 A1 | 8/2009 | Geisinger et al. | |
| 2009/0281672 A1* | 11/2009 | Pourzia | 700/284 |
| 2010/0030389 A1* | 2/2010 | Palmer et al. | 700/284 |
| 2010/0030476 A1 | 2/2010 | Woytowytz | |
| 2010/0094472 A1 | 4/2010 | Woytowytz | |
| 2010/0106337 A1 | 4/2010 | Sacks | |
| 2010/0145530 A1 | 6/2010 | Nickerson | |
| 2010/0256827 A1* | 10/2010 | Bragg et al. | 700/284 |
| 2010/0312404 A1 | 12/2010 | Nickerson | |
| 2011/0077785 A1 | 3/2011 | Nickerson et al. | |
| 2011/0238229 A1 | 9/2011 | Woytowitz et al. | |

OTHER PUBLICATIONS

"Reclamation, Managing Water in the West—Weather Based Technologies for Residential Irrigation Scheduling," Technical Review Report, U.S. Dept. of the Interior, May 2004.*
Hunt, T. and Lessick, D. et al., Residential Weather-Based Irrigation Scheduling: Evidence from the Irvine "ET Controller" Study (2001).
List of Principal Symbols and Acronyms; 2003, five web pages.
Cattaneo & Upham, Methods to Calculate Evapotranspiration Differences and Choices, 3-page article.
Water-Efficient Landscaping; 2001, 2-page article.
The Irrigation Association—Water Management Committee, Turf and Landscape Irrigation Best Management Practice, Appendix G, Deficit Irrigation Practice.
Engineer's Notebook No. 106, A Simple Evapotranspiration Model for Hawaii: The Hargreaves Model; CTAHR Fact Sheet, 1-page article, May 1997, WU.
Austin Lawn Sprinkler Association, Technical Information-Using Evapotranspiration Data; Nov. 2002, 1-page webpage.
ET Different Formula, 1-page Chart.
USFAO, Preface page Web Page, Feb. 2003.
US Department of the Interior Bureau of Reclamation Lower Colorado Region Southern California Area Office, Temecula, California & Technical Service Center Water Resources Planning Operations Support Group, Denver, Colorado; Weather and Soil Moisture Based Landscape Irrigation Scheduling Devices; Reclamation Managing Water in the West, Aug. 2004; 135 pages.
Instructions, Model PK-1B pump controller, Mar. 1993.
"Irrigation & Green Industry" Magazine, Nov. 2010.
Universal Smart Module brochure, Aug. 2009.
Smart Clock Brochure, original from approx. May 2007.
Enercon Plus Brochure, original from approx. May 2007.
WeatherSmartPro brochure, Mar. 2010.
SolarSync brochure, Oct. 2099.
Aqua Conserve User's Guide, Jun. 2010.
Aqua Conserve ET-8 Series Manual, 2010.
Climate Logic wireless weather sensing system flyer, Nov. 2010.
WeatherSmart manual, Mar. 2010.
Irritrol, "Climate Logic" wireless weather sensor system user's guide, 2011.
Rain Bird, Simple-to-Set Smart Controller Operation Manual, 2010.
Hunter, X-Core residential irrigation controller manual, 2010.
Solar Sync sensor, 2011.
WeatherSmartPro brochure, Oct. 2009.
Metropolitan Water District of Southern California, The Watering Index and Watering Calculator, 2011.
Metropolitan Water District of Southern California, Save a Buck: Irrigation Controllers, 2011.
SolarSync Owner's Manual and Programming Instructions, Dec. 2009.
Toro XTRA Smart Wireless weather sensor system installation and setup guide.
Toro ECXTRA Automatic Sprinkler System Control Timer, User's Guide.
AquaConserve ACT-9 and ACT-14 Station Aqua Climate Tracker Irrigation Controller User's Guide (2001).
AquaConserve ACT-9 and ACT-14 Quick Reference & Installation Guide (2001).
TORO Xtra Smart Wireless Weather Sensor System Installation and Setup Guide (2010).
"Weather Based Controller Bench Test Report", Metropolitan Water District of Southern California, Apr. 2004.
"Evaluation of Weather-Sensing Landscape Irrigation Controllers", University of California Cooperative Extension, Center for Landscape and Urban Horticulture, Jun. 2004.
"Weather and Soil Moisture Based Landscape Irrigation Scheduling Devices—Technical Review Report", US Department of the Interior, Bureau of Reclamation, Aug. 2006.

(56) References Cited

OTHER PUBLICATIONS

"Weather and Soil Moisture Based Landscape Irrigation Scheduling Devices—Technical Review Report, 2nd Edition", US Department of the Interior, Bureau of Reclamation, Aug. 2007.
"Weather and Soil Moisture Based Landscape Irrigation Scheduling Devices—Technical Review Report, 3rd Edition", US Department of the Interior, Bureau of Reclamation, Sep. 2009.
"Weather and Soil Moisture Based Landscape Irrigation Scheduling Devices—Technical Review Report, 4th Edition", US Department of the Interior, Bureau of Reclamation, Jul. 2012.
Mayer, Peter et al, "Evaluation of California Weather-Based 'Smart' Irrigation Controller Programs", Jul. 1, 2009.
Cattaneo, Diego et al., "Methods to calculate Evapotranspiration: differences and choices".
Rain Bird ET Manager Series Installation and Operation Manual (2007).
Zotarelli, Lincoln, et al., "Step by Step Calculation of the Penman-Monteith Evapotranspriation (FAO-56 Method)", Agricultural and Biological Engineering Dept., Florida Cooperative Extension Service, Institute of Food and Ag Sciences, Univ. of Florida (Feb. 2010).
"Weather and Soil Moisture Based Landscape Irrigation Scheduling Devices", U.S. Dept. of the Interior, Bureau of Reclamation (Sep. 2009).
"Calculating Temperature Rise and Equipment De-Rating when Using Oberon Enclosures", Oberon (Wireless Communication Solutions) Jul. 16, 2012.
Hoffman, "Heat Dissipation in Electrical Enclosures" (2011).
"Protective cooling Solutions Overview", McLean Cooling Technology (2011).
Wankhede, Mahendra, et al, "Evaluation of Cooling Solutions for Outdoor Electronics", Therminic (2007).
"Enclosure Design Considerations", Saginaw Control & Engineering (2007).
"Solar Heat Gain" Hoffman (2011).
Xaxx, Jagg, "The Effects of Solar Radiation on Metal Enclosures", eHOW.com, Dec. 11, 2012.
"New ET manager cartridge from Rain Bird", SportsTurf (2009).
Rain Bird ET Manager Cartridge for ESP-LX Modular, Installation & User Guide, Rain Bird (2008).

\* cited by examiner

Extraterrestrial Radiation (RA) Expressed in Equivalent Evaporation (in mm/day)

| January (1) | February (2) | March (3) | April (4) | May (5) | June (6) | July (7) | August (8) | September (9) | October (10) | November (11) | December (12) | Latitude (degrees) (13) |
|---|---|---|---|---|---|---|---|---|---|---|---|---|
| (a) Northern Hemisphere | | | | | | | | | | | | |
| 3.8 | 6.1 | 9.4 | 12.7 | 15.8 | 17.1 | 16.4 | 14.1 | 10.9 | 7.4 | 4.5 | 3.2 | 50 |
| 4.3 | 6.6 | 9.8 | 13.0 | 15.9 | 17.2 | 16.5 | 14.3 | 11.2 | 7.8 | 5.0 | 3.7 | 48 |
| 4.9 | 7.1 | 10.2 | 13.3 | 16.0 | 17.2 | 16.6 | 14.5 | 11.5 | 8.3 | 5.5 | 4.3 | 46 |
| 5.3 | 7.6 | 10.6 | 13.7 | 16.1 | 17.2 | 16.6 | 14.7 | 11.9 | 8.7 | 6.0 | 4.7 | 44 |
| 5.9 | 8.1 | 11.0 | 14.0 | 16.2 | 17.3 | 16.7 | 15.0 | 12.2 | 9.1 | 6.5 | 5.2 | 42 |
| 6.4 | 8.6 | 11.4 | 14.3 | 16.4 | 17.3 | 16.7 | 15.2 | 12.5 | 9.6 | 7.0 | 5.7 | 40 |
| 6.9 | 9.0 | 11.8 | 14.5 | 16.4 | 17.2 | 16.7 | 15.3 | 12.8 | 10.0 | 7.5 | 6.1 | 38 |
| 7.4 | 9.4 | 12.1 | 14.7 | 16.4 | 17.2 | 16.7 | 15.4 | 13.1 | 10.6 | 8.0 | 6.6 | 36 |
| 7.9 | 9.8 | 12.4 | 14.8 | 16.5 | 17.1 | 16.8 | 15.5 | 13.4 | 10.8 | 8.5 | 7.2 | 34 |
| 8.3 | 10.2 | 12.8 | 15.0 | 16.5 | 17.0 | 16.8 | 15.6 | 13.6 | 11.2 | 9.0 | 7.8 | 32 |
| 8.8 | 10.7 | 13.1 | 15.2 | 16.5 | 17.0 | 16.8 | 15.7 | 13.9 | 11.6 | 9.5 | 8.3 | 30 |
| 9.3 | 11.1 | 13.4 | 15.3 | 16.5 | 16.8 | 16.7 | 15.7 | 14.1 | 12.0 | 9.9 | 8.8 | 28 |
| 9.8 | 11.5 | 13.7 | 15.3 | 16.4 | 16.7 | 16.6 | 15.7 | 14.3 | 12.3 | 10.3 | 9.3 | 26 |
| 10.2 | 11.9 | 13.9 | 15.4 | 16.4 | 16.6 | 16.5 | 15.8 | 14.5 | 12.6 | 10.7 | 9.7 | 24 |
| 10.7 | 12.3 | 14.2 | 15.5 | 16.3 | 16.4 | 16.4 | 15.8 | 14.6 | 13.0 | 11.1 | 10.2 | 22 |
| 11.2 | 12.7 | 14.4 | 15.6 | 16.3 | 16.4 | 16.3 | 15.9 | 14.8 | 13.3 | 11.6 | 10.7 | 20 |
| 11.6 | 13.0 | 14.6 | 15.6 | 16.1 | 16.1 | 16.1 | 15.8 | 14.9 | 13.6 | 12.0 | 11.1 | 18 |
| 12.0 | 13.3 | 14.7 | 15.6 | 16.0 | 15.9 | 15.9 | 15.7 | 15.0 | 13.9 | 12.4 | 11.6 | 16 |
| 12.4 | 13.6 | 14.9 | 15.7 | 15.8 | 15.7 | 15.7 | 15.7 | 15.1 | 14.1 | 12.8 | 12.0 | 14 |
| 12.8 | 13.9 | 15.1 | 15.7 | 15.7 | 15.5 | 15.5 | 15.6 | 15.2 | 14.4 | 13.3 | 12.5 | 12 |
| 13.2 | 14.2 | 15.3 | 15.7 | 15.5 | 15.3 | 15.3 | 15.5 | 15.3 | 14.7 | 13.6 | 12.9 | 10 |
| 13.6 | 14.5 | 15.3 | 15.6 | 15.3 | 15.0 | 15.1 | 15.4 | 15.3 | 14.8 | 13.9 | 13.3 | 8 |
| 13.9 | 14.8 | 15.4 | 15.4 | 15.1 | 14.7 | 14.9 | 15.2 | 15.3 | 15.0 | 14.2 | 13.7 | 6 |
| 14.3 | 15.0 | 15.5 | 15.5 | 14.9 | 14.4 | 14.6 | 15.1 | 15.3 | 15.1 | 14.5 | 14.1 | 4 |
| 14.7 | 15.3 | 15.6 | 15.3 | 14.6 | 14.2 | 14.3 | 14.9 | 15.3 | 15.3 | 14.8 | 14.4 | 2 |
| 15.0 | 15.5 | 15.7 | 15.3 | 14.4 | 13.9 | 14.1 | 14.8 | 15.3 | 15.4 | 15.1 | 14.8 | 0 |
| (b) Southern Hemisphere | | | | | | | | | | | | |
| 17.5 | 14.7 | 10.9 | 7.0 | 4.2 | 3.1 | 3.5 | 5.5 | 8.9 | 12.9 | 16.5 | 18.2 | 50 |
| 17.6 | 14.9 | 11.2 | 7.5 | 4.7 | 3.5 | 4.0 | 6.0 | 9.3 | 13.2 | 16.6 | 18.2 | 48 |
| 17.7 | 15.1 | 11.5 | 7.9 | 5.2 | 4.0 | 4.4 | 6.5 | 9.7 | 13.4 | 16.7 | 18.3 | 46 |
| 17.8 | 15.3 | 11.9 | 8.4 | 5.7 | 4.4 | 4.9 | 6.9 | 10.2 | 13.7 | 16.7 | 18.3 | 44 |
| 17.8 | 15.5 | 12.2 | 8.8 | 6.1 | 4.9 | 5.4 | 7.4 | 10.6 | 14.0 | 16.8 | 18.3 | 42 |
| 17.9 | 15.7 | 12.5 | 9.2 | 6.6 | 5.3 | 5.9 | 7.9 | 11.0 | 14.2 | 16.9 | 18.3 | 40 |
| 17.9 | 15.8 | 12.8 | 9.6 | 7.1 | 5.8 | 6.3 | 8.3 | 11.4 | 14.4 | 17.0 | 18.3 | 38 |
| 17.9 | 16.0 | 13.2 | 10.1 | 7.5 | 6.3 | 6.8 | 8.8 | 11.7 | 14.6 | 17.0 | 18.2 | 36 |
| 17.8 | 16.1 | 13.5 | 10.5 | 8.0 | 6.8 | 7.2 | 9.2 | 12.0 | 14.9 | 17.1 | 18.2 | 34 |
| 17.8 | 16.2 | 13.8 | 10.9 | 8.5 | 7.3 | 7.7 | 9.6 | 12.4 | 15.1 | 17.2 | 18.1 | 32 |
| 17.8 | 16.4 | 14.0 | 11.3 | 8.9 | 7.8 | 8.1 | 10.1 | 12.7 | 15.3 | 17.3 | 18.1 | 30 |
| 17.7 | 16.4 | 14.3 | 11.6 | 9.3 | 8.2 | 8.6 | 10.4 | 13.0 | 15.4 | 17.2 | 17.9 | 28 |
| 17.6 | 16.4 | 14.4 | 12.0 | 9.7 | 8.7 | 9.1 | 10.9 | 13.2 | 15.5 | 17.2 | 17.8 | 26 |
| 17.5 | 16.5 | 14.6 | 12.3 | 10.2 | 9.1 | 9.5 | 11.2 | 13.4 | 15.6 | 17.1 | 17.7 | 24 |
| 17.4 | 16.5 | 14.8 | 12.6 | 10.6 | 9.6 | 10.0 | 11.5 | 13.7 | 15.7 | 17.0 | 17.5 | 22 |
| 17.3 | 16.5 | 15.0 | 13.0 | 11.0 | 10.0 | 10.4 | 12.0 | 13.9 | 15.8 | 17.0 | 17.4 | 20 |
| 17.1 | 16.5 | 15.1 | 13.2 | 11.4 | 10.4 | 10.8 | 12.3 | 14.1 | 15.8 | 16.8 | 17.1 | 18 |
| 16.9 | 16.4 | 15.2 | 13.5 | 11.7 | 10.8 | 11.2 | 12.6 | 14.3 | 15.8 | 16.7 | 16.8 | 16 |
| 16.7 | 16.4 | 15.3 | 13.7 | 12.1 | 11.5 | 11.5 | 12.9 | 14.5 | 15.8 | 16.5 | 16.6 | 14 |
| 16.6 | 16.3 | 15.4 | 14.0 | 12.5 | 11.6 | 12.0 | 13.2 | 14.7 | 15.8 | 16.4 | 16.5 | 12 |
| 16.4 | 16.3 | 15.5 | 14.2 | 12.8 | 12.0 | 12.4 | 13.5 | 14.8 | 15.9 | 16.2 | 16.2 | 10 |
| 16.1 | 16.1 | 15.5 | 14.4 | 13.1 | 12.4 | 12.7 | 13.7 | 14.9 | 15.8 | 16.0 | 16.0 | 8 |
| 15.8 | 16.0 | 15.6 | 14.7 | 13.4 | 12.8 | 13.1 | 14.0 | 15.0 | 15.7 | 15.8 | 15.7 | 6 |
| 15.5 | 15.8 | 15.6 | 14.9 | 13.8 | 13.2 | 13.4 | 14.3 | 15.1 | 15.6 | 15.5 | 15.4 | 4 |
| 15.3 | 15.7 | 15.7 | 15.1 | 14.1 | 13.5 | 13.7 | 14.5 | 15.2 | 15.5 | 15.3 | 15.1 | 2 |
| 15.0 | 15.5 | 15.7 | 15.3 | 14.4 | 13.9 | 14.1 | 14.8 | 15.3 | 15.4 | 15.1 | 14.8 | 0 |

Fig. 6

IRRIGATION ASSOCIATION
6540 Arlington Boulevard
Falls Church, VA 22042
Tel: 703-536-7080
www.irrigation.org

| Smart Water Application Technology™ (SWAT™) Performance Report ||
|---|---|
| Testing Agency: Center for Irrigation Technology | www.californiawater.org |
| Product: Alex-Tronix Smart Clock® ||
| Product Type: Climatologically Based Controller ||
| Product Description: The Alex-Tronix Smart Clock® is a battery-operated controller with temperature and rain sensors. ||
| SWAT™ Protocol*: Turf and Landscape Equipment Climatologically Based Controllers 7th Draft Testing Protocol (November 2006) The concept of climatologically controlling irrigation systems has an extensive history of scientific study and documentation. The objective of this protocol is to evaluate how well current commercial technology has integrated the scientific data into a practical system that meets the agronomic needs of turf and landscape plants. The evaluation is accomplished by creating a virtual landscape subjected to a representative climate to evaluate the ability of individual controllers to adequately and efficiently irrigate that landscape. After initial programming and calibration the controller is expected to perform without further intervention during the test period. Performance results indicate to what degree the controller maintained root zone moistures within an acceptable range. If moisture levels are maintained without deficit, it can be assumed the crop growth and quality will be adequate. If moisture levels are maintained without excess it can be assumed that scheduling is efficient. ||
| *All SWAT™ Protocol may be viewed at www.irrigation.org ||

| Alex-Tronix Smart Clock® Controller SWAT™ Performance Summary ||
|---|---|
| Irrigation Adequacy | Irrigation Excess |
| Minimum of 6 test zones: 100% | Minimum of 6 test zones: 0% |
| Maximum of 6 test zones: 100% | Maximum of 6 test zones: 1.1% |
| Mean/Average of 6 test zones: 100% | Mean/Average of 6 test zones: 0.2% |
| Irrigation Adequacy represents how well irrigation met the needs of the plant material. This reflects the percentage of required water for turf or plant material supplied by rainfall and controller-scheduled irrigations. Research suggests that if this value is between 80% and 100%, the acceptable quality of vegetation will be maintained. | Irrigation Excess represents how much irrigation water was applied beyond the needs of the plant material. This reflects the percentage of water applied in excess of 100% of required water according to data from CIMIS station #80 Fresno State, Fresno County during the test period. |

| Product Detail Supplied by Manufacturer ||||||
|---|---|---|---|---|---|
| Alex-Tronix Smart Clock® | | | | | www.alex-tronix.com |
| Installation | Data Source | Data Link | Initial Purchase | Additional Hardware | Additional Fees |
| Replaces existing controller or is installed on a new system. | Tested with on site temperature sensor with optional rain sensor. | Hard wired | Purchase price includes temperature sensor. | ❏ Rain Switch Pole mount<br>❏ Rain and Temperature Sensors Pole mount<br>❏ Latching Solenoid<br>❏ Stainless Steel Pedestal mount | None |
| Additional Features ||||||
| Zones | Time of Day | Day of Week | Other || If Data Link is Discontinued |
| Available with 6 zones | Capable of restricting the time of day for watering. | Capable of restricting watering days by selection or interval. | ❏ Multiple start times<br>❏ Programmable rain delay<br>❏ 5-yr Battery life with low battery indication || Smart Clock may be used as a standard irrigation controller including percent adjust and 4 independent programs with multiple start times. |

Fig. 9A

| | 6540 Arlington Boulevard<br>Falls Church, VA 22042 | Tel: 703-536-7080<br>www.irrigation.org |
|---|---|---|

Smart Water Application Technology (SWAT) Performance Report

| Testing Agency: Center for Irrigation Technology | www.californiawater.org |
|---|---|

Product: Alex-Tronix Enercon Plus
Product Type: Climatologically Based Controller
Product Description: The Alex-Tronix Enercon Plus is a pedestal mounted battery-operated controller with temperature and rain sensors.

SWAT™ Protocol*: Turf and Landscape Equipment Climatologically Based Controllers 7th Draft Testing Protocol (November 2006)

The concept of climatologically controlling irrigation systems has an extensive history of scientific study and documentation. The objective of this protocol is to evaluate how well current commercial technology has integrated the scientific data into a practical system that meets the agronomic needs of turf and landscape plants. The evaluation is accomplished by creating a virtual landscape subjected to a representative climate to evaluate the ability of individual controllers to adequately and efficiently irrigate that landscape. After initial programming and calibration the controller is expected to perform without further intervention during the test period. Performance results indicate to what degree the controller maintained root zone moistures within an acceptable range. If moisture levels are maintained without deficit, it can be assumed the crop growth and quality will be adequate. If moisture levels are maintained without excess it can be assumed that scheduling is efficient.

*All SWAT™ Protocol may be viewed at www.irrigation.org

Alex-Tronix Enercon Plus Controller SWAT Performance Summary

| Irrigation Adequacy | Irrigation Excess |
|---|---|
| Minimum of 6 test zones: 100%<br>Maximum of 6 test zones: 100%<br>Mean/Average of 6 test zones: 100%<br>Irrigation Adequacy represents how well irrigation met the needs of the plant material. This reflects the percentage of required water for turf or plant material supplied by rainfall and controller-scheduled irrigations. Research suggests that if this value is between 80% and 100%, the acceptable quality of vegetation will be maintained. | Minimum of 6 test zones: 0%<br>Maximum of 6 test zones: 3.6%<br>Mean/Average of 6 test zones: 1%<br>Irrigation Excess represents how much irrigation water was applied beyond the needs of the plant material. This reflects the percentage of water applied in excess of 100% of required water according to data from CIMIS station #80 Fresno State, Fresno County during the test period. |

Product Detail Supplied by Manufacturer

Alex-Tronix Enercon Plus — www.alex-tronix.com

| Installation | Data Source | Data Link | Initial Purchase | Additional Hardware | Additional Fees |
|---|---|---|---|---|---|
| Replaces existing controller or is installed on a new system. | Tested with on site temperature sensor with optional rain sensor. | Hard wired | Purchase price includes temperature sensor mounted within pedestal. | ❑ Rain Switch Pole mount<br>❑ Rain and Temperature Sensors Pole mount<br>❑ Latching Solenoid<br>❑ Lightning Protection | None |

Additional Features

| Zones | Time of Day | Day of Week | Other | If Data Link is Discontinued |
|---|---|---|---|---|
| Available in a base model of 4 zones; can control up to 24 by installing additional station modules in groups of 4. | Capable of restricting the time of day for watering. | Capable of restricting watering days by selection or interval. | ❑ Multiple start times<br>❑ Programmable rain delay<br>❑ 5-yr Battery life with low battery indication | Enercon Plus may be used as a standard irrigation controller including percent adjust and 4 independent programs with multiple start times. |

Fig. 9B

6540 Arlington Boulevard  
Falls Church, VA 22042  
Tel: 703-536-7080  
www.irrigation.org

Smart Water Application Technology™ (SWAT) Performance Report

| | |
|---|---|
| Testing Agency: Center for Irrigation Technology | www.californiawater.org |

Product: Alex-Tronix Universal Smart Module®(USM®)

Product Type: Climatologically Based Controller

Product Description: the Alex-Tronix Universal Smart Module attaches to any new or existing AC controller to make it SMART. (Tested with a Rain Bird SST controller and Hunter Mini-Clik rain switch.)

**SWAT Protocol\*: Turf and Landscape Equipment Climatologically Based Controllers 8th Draft Testing Protocol (Sept. 2008)**
The concept of climatologically controlling irrigation systems has an extensive history of scientific study and documentation. The objective of this protocol is to evaluate how well current commercial technology has integrated the scientific data into a practical system that meets the agronomic needs of turf and landscape plants. The evaluation is accomplished by creating a virtual landscape subjected to a representative climate to evaluate the ability of individual controllers to adequately and efficiently irrigate that landscape. After initial programming and calibration the controller is expected to perform without further intervention during the test period. Performance results indicate to what degree the controller maintained root zone moistures within an acceptable range. If moisture levels are maintained without deficit, it can be assumed the crop growth and quality will be adequate. If moisture levels are maintained without excess it can be assumed that scheduling is efficient.

\*All SWAT protocol may be viewed at www.irrigation.org

Alex-Tronix Universal Smart Module® SWAT Performance Summary

| Irrigation Adequacy | Irrigation Excess |
|---|---|
| Minimum of 6 test zones: 99.1% | Minimum of 6 test zones: 0% |
| Maximum of 6 test zones: 100% | Maximum of 6 test zones: 5.6% |
| Mean/Average of 6 test zones: 99.9% | Mean/Average of 6 test zones: 2.2% |
| Irrigation Adequacy represents how well irrigation met the needs of the plant material. This reflects the percentage of required water for turf or plant material supplied by rainfall and controller-scheduled irrigations. Research suggests that if this value is between 80% and 100%, the acceptable quality of vegetation will be maintained. | Irrigation Excess represents how much irrigation water was applied beyond the needs of the plant material. This reflects the percentage of water applied in excess of 100% of required water according to data from CIMIS station #80 Fresno State, Fresno County during the test period. |

Product Detail Supplied by Manufacturer
Alex-Tronix Universal Smart Module (USM)   www.alex-tronix.com

| Installation | Data Source | Data Link | Initial Purchase | Additional Hardware | Additional Fees |
|---|---|---|---|---|---|
| An add-on module that works with a new or existing AC controller | Tested with on site temperature sensor with optional rain sensor. | Hard wired | Purchase price includes temperature sensor. | ❏ Rain Switch<br>❏ Temperature Sensor | None |

Additional Features

| Zones | Time of Day | Day of Week | Other | | If Data Link is Discontinued |
|---|---|---|---|---|---|
| Will control up to 8 stations. | Controlled by host controller | Controlled by host controller | ❏ The module learns the peak demand schedule and makes adjustments based on day of year.<br>❏ 5-yr Battery life with low battery indication<br>❏ With temperature sensor, can suspend irrigation at owner designated temperature threshold. | | The USM allows controller to operate at summer schedule until the link is re-established. |

Fig. 9C

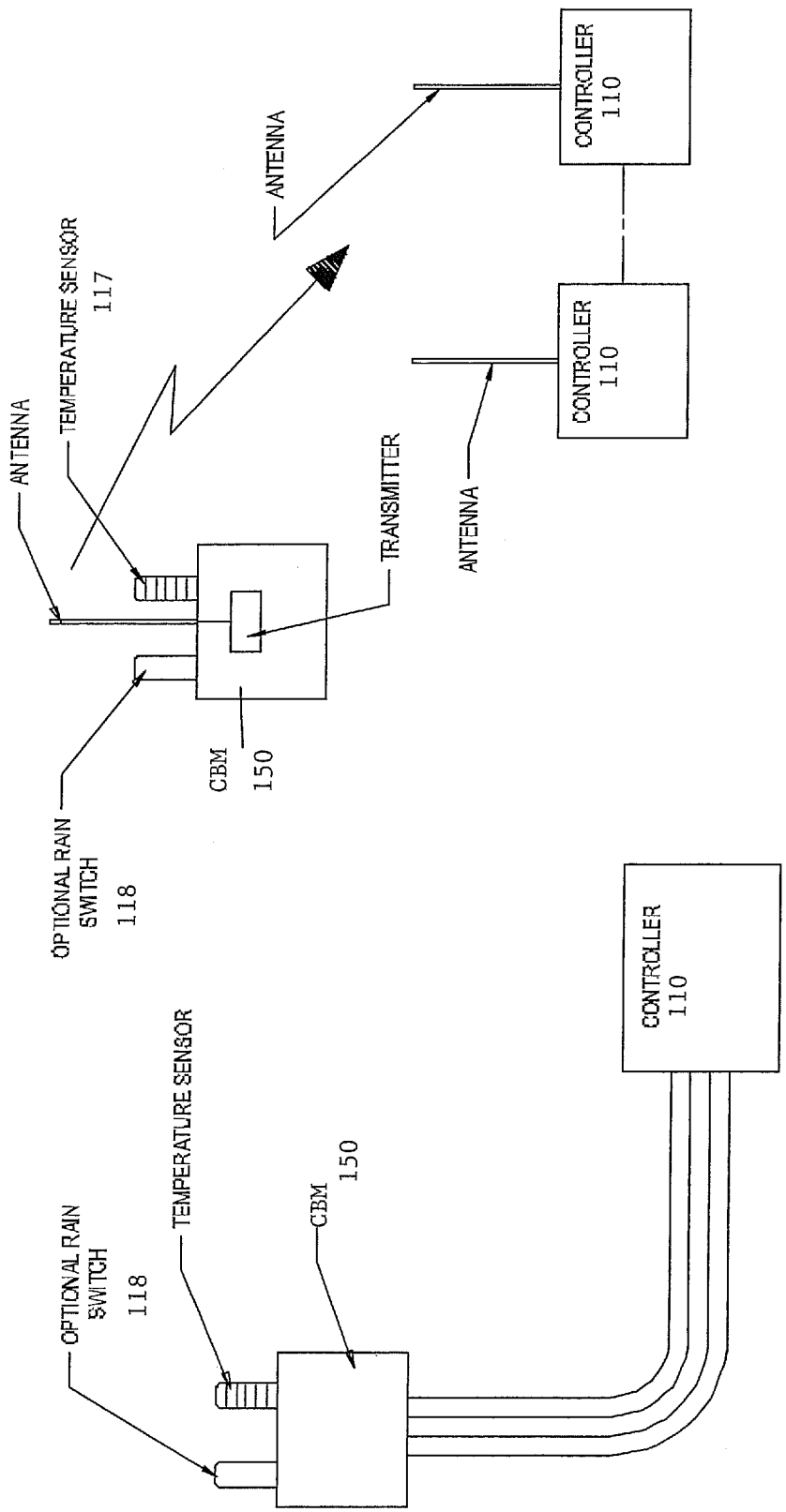

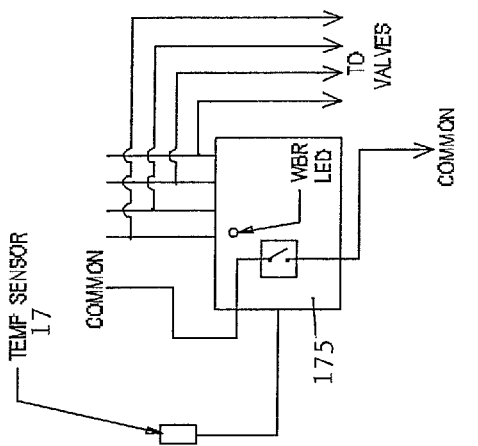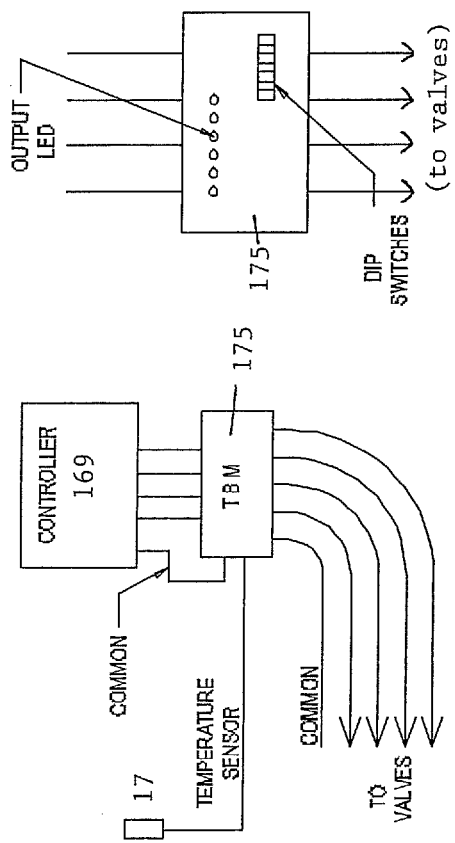

DROUGHT WATERING RESTRICTIONS

All water users have been assigned a watering group. Mandatory restrictions mean you may only run sprinklers on your groups' allowed watering day(s). To locate your group, check your bill, visit snwa.com or call your water provider.

My assigned group: _____

Southern Nevada Water Authority

| Watering Group | Winter<br>November - February | Spring / Fall<br>March - April / September - October | Summer<br>May - August |
|---|---|---|---|
| A | Monday | Monday, Wednesday, Friday | Any day |
| B | Tuesday | Tuesday, Thursday, Saturday | Any day |
| C | Wednesday | Monday, Wednesday, Friday | Any day |
| D | Thursday | Tuesday, Thursday, Saturday | Any day |
| E | Friday | Monday, Wednesday, Friday | Any day |
| F | Saturday | Tuesday, Thursday, Saturday | Any day |

For watering instructions, see inside panel.

[Prior Art]

Fig. 21 A

Mandatory watering restrictions

- Assigned watering days are mandatory. Running your irrigation system outside of your assigned days is water waste and may result in a water-waste fee or citation. Report water waste at snwa.com.

- From May 1 until Oct. 1, sprinkler watering is prohibited from 11 a.m. to 7 p.m.

- Watering with a handheld hose and supervised testing of your irrigation system are allowed anytime. New landscapes may be watered as needed for 30 days.

HOW TO COMPLY IN 3 EASY STEPS

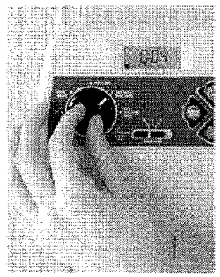

Adjust your watering clock seasonally: Sept. 1, Nov. 1, March 1 and May 1. Here's how:

1. Find your "watering days" function and adjust it to ensure it is only watering on your assigned day(s) each season.

2. Find your "start times" function and adjust it so you run 3 sprinkler watering cycles. Schedule cycles to be complete by sunrise in warm weather and during morning hours in cold weather.

3. For sprinklers, set your "run time" function to 4 minutes each cycle. Drip-irrigation needs vary; please see below. For more help setting your clock, visit snwa.com.

Sprinkler tips for grass

- On assigned day(s), schedule sprinklers to water 3 cycles a day, 4 minutes each watering. Run each cycle 1 hour apart. For help with rotating sprinklers, visit snwa.com.

- You may not need to water as often as mandatory restrictions allow. Increase watering only if you see widespread dry spots. Use a handheld hose for smaller dry areas.

- Bermuda and other warm-season grasses require about one-third less water than Tall Fescue grass.

- Don't water on windy or rainy days.

- Regularly check your irrigation system for broken or misaligned sprinkler heads and drip emitters.

Drip tips for plants

For plant health, drip systems should run LONGER than sprinklers because they deliver water MORE SLOWLY. Plants need water LESS OFTEN.

Visit snwa.com for tips on checking your emitters and determining the length of your watering cycle.

A single drip cycle of 30-90 minutes is recommended for plants, depending on emitter flow, plant types and soil. Drip irrigation should run less often than sprinklers. The SNWA recommends:

- 1 day a week in winter (Nov.-Feb.)
- 2 days a week in spring and fall (March-April, Sept.-Oct.)
- 3 days a week in summer (May-Aug.) Daily watering is not necessary.

Need help? Call 258-SAVE or visit snwa.com.

[Prior Art]

FIG. 21B

USB PROGRAMMING OF MODULE:

COMPUTER DATA ENTRY: Fill in the following information:

Current Date: June 30, 2010
Current Time: 10:04 am
Zip code: 93711
Irrigation Zone: None
Minimum irrigation temperature: 38F
Accumulation threshold: 95%
Irrigation delay after rainfall (days, hours): 2 days, 0 hours Restricted watering schedules
Season: Spring
Spring calendar designation: April 1 to June 30
Even or odd designation: Even
Allowed watering Days: Tuesday, Thursday, Saturday
Not allowed watering times of day: From 8:00 am to 7:00 pm
Note: repeat above information for all seasons

FIG. 28A

IRRIGATION WATER CONSERVATION WITH AUTOMATED WATER BUDGETING AND TIME OF USE TECHNOLOGY

This is a continuation-in-part of U.S. Utility patent application Ser. No. 11/879,700 filed on Jul. 17, 2007, now U.S. Pat. No. 7,844,368, which is a continuation-in-part of U.S. Utility patent application Ser. No. 11/336,690 filed on Jan. 20, 2006, now U.S. Pat. No. 7,266,428, which is a continuation-in-part of U.S. Utility patent application Ser. No. 10/824,667 filed on Apr. 13, 2004, now U.S. Pat. No. 7,058,478, which claims the benefit of U.S. Provisional Application No. 60/465,457 filed on Apr. 25, 2003, all of which are incorporated herein by this reference. This application also claims the benefit of U.S. Provisional Application No. 60/831,904 filed on Jul. 20, 2006, and 60/899,200 filed on Feb. 1, 2007, which are also incorporated herein by this reference.

BACKGROUND OF THE INVENTION

1. Field of the Invention

The present invention relates to landscape water conservation by automating the water budget feature of irrigation controllers, that have heretofore been manually set.

The present invention relates to the management and conservation of irrigation water, primarily for, but not limited to, residential, commercial, and municipal landscaping applications. More specifically, numerous automated methods and apparatus are provided for adjusting irrigation schedule intervals or station run times using simplified water budgeting methods that use pre-determined periodic environmental water budgeting percentage data (compiled into bell shaped water budget percentage curves) based upon the time of year, location, or both. The pre-determined water budgeting percentage data may be used independently or with current environmental data and/or local watering restrictions, and/or with one or more environmental sensors, and then used to adjust irrigation run times, watering intervals, watering days, or watering times of the day to conserve landscape water. Physical embodiments may be provided within controllers, as add-ons or plug-ins, or with central irrigation systems to provide automation of water budgeting, a common manual feature of most landscape irrigation controllers.

2. Description of the Prior Art

Many regions of the United States lack sufficient water resources to satisfy all of their competing agricultural, urban, commercial and environmental needs. The "California Water Plan Update" published in 2009 by the California Department of Water Resources indicates that 80 million acre feet (maf) of water is needed to satisfy the annual water needs of the State of California. Of this amount, approximately forty-six percent is required for environmental purposes, forty-three percent for agricultural purposes, and eleven percent (approximately 8.8 maf) for urban use. Of this urban amount, 70% is for residential use, of which 50% is for landscaping.

The California Department of Water Resources, the EPA, and the Irrigation Association (IA) among others, have encouraged landscape water conservation with the use of "Smart" water technology with smart irrigation controllers, rain sensors, and soil moisture sensors. A smart controller is generally defined as one that can adjust its irrigation schedule daily based upon current weather or environmental conditions. Performance standards have been set to determine the level of efficiency for each of these products with Smart Water Application Technology (SWAT) testing conducted at the Center for Irrigation Technology in Fresno, Calif. Twenty irrigation controllers have undergone this testing to date with results posted on the IA web site. To date, all but three of the successfully tested controllers have been evapotranspiration (ET) based. The three non ET tested products use temperature budgeting, this inventor's technology presented in presented in parent pending application Ser. No. 11/879,700, grand parent U.S. Pat. No. 7,266,428, great grandparent U.S. Pat. No. 7,058,478, and provisional application 60/465,457 filed on Apr. 25, 2003. These results can be noted in FIGS. 9A, 9B, and 9C.

To further encourage the use of smart controllers, many water districts are offering rebates for those controllers that are posted in the IA web site with SWAT results. Soil moisture sensors and rain switches are the next set of smart devices that will be SWAT tested and posted. Controller add-ons and plug-ins have also recently started to be SWAT tested, such as the Hunter Solar Sync, the Irritrol Climate Logic, and this inventor's Universal Smart Module (see FIG. 9C). A distinction is made between an add-on or plug-in. Both are devices outside an irrigation controller and designed to make existing conventional (non smart) controllers smart. However, an add-on is typically mounted on the output of an irrigation controller and usually breaks the common line to control irrigation. As such, an add-on can normally make any existing controller smart. A plug-in provides data directly to the irrigation controller microprocessor and must normally be compatible with a certain brand or model controller.

As stated in this applicant's previous applications, ET based controllers, add-ons and plug-ins, while theoretically effective, were projected to be far too complicated or expensive or required monthly service fees to be an effective practical means for meaningful water conservation. Since 2003, this fact has not changed. The industry is still searching for products that provide real water conservation rather than theoretical water conservation. After seven years, still far fewer than 1% of irrigation controllers installed are smart, and many of them were installed only because they were provided free of charge or highly rebated. Furthermore, studies have shown that within one year of installation, less than half of those ET based smart controllers are still being used in their Smart mode. This fact was underscored by the AquaCraft study of weather based irrigation controllers (WBIC) sponsored by the California Department of Water Resources in 2009 that showed that the 3112 ET based smart controllers installed throughout California, only a 6% average water saving was recorded. Manufacturers had boasted that based on ET theory, 30-40% water savings would be possible.

At least fifteen different ET equations have been developed over the last fifty years. In FIG. 8, described in detail below, Cattaneo and Upham show four of those ET based data which indicate that the Pennman-Monteith data which is the standard used by the IA, DWR, and the FAO (food and agriculture office), is at certain times of the year as much as sixty percent different than the other three equations which all use the same CIMIS data.

The California Energy Commission was formed to provide recommendations to DWR for the implementation of California Assembly Bill 1881 concerning limiting the sale of smart controllers in California after January 2012. Due to the poor performance of ET based controllers, the Commission has suspended its meetings, leaving the implementation of bill 1881 in doubt. The reasons for its suspension are disagreement within the industry, disappointment of ET based controller performance, very poor sales of smart controllers in spite of rebates, and the state of California's economy.

All of these indicate that still after nearly a decade of ET and four decades of promoting soil moisture sensors, there is no clear consensus in the industry and government agencies as was originally predicted in this inventor's '478 patent.

In addition to the need for water conservation, many urban areas do not have the infrastructure necessary to serve their communities, which include pumping, delivery, and water pressure issues. As a consequence, many water districts have implemented restricted watering schedules to stabilize water deliveries and save water. These restrictions normally require periodic manual changes to irrigation schedules for compliance. An automated way to insure compliance would also be beneficial for both water conservation and infrastructure relief. Ideally, both smart technology and automated water restrictions could be incorporated within an irrigation controller or add-on or plug-in device to offer a choice to the water district depending upon their local conditions and needs. This subject referred to as "Time of Use" was explained by pending application Ser. No. 11/879,700 which is incorporated in its entirety herein. The present invention provides embodiments addressing both needs.

The present invention nor its predecessors do not state that ET and soil moisture based methods are not possible ways to help conserve water, but as currently embodied in other controllers (see Bureau of Reclamation report referenced herein), controllers and currently available ET methods are difficult to understand and implement. A number of references, patents, and published applications are in existence that cover ET-based methods and apparatus.

At the Feb. 17, 2004, EPA-sponsored "Water Efficient Product Market Enhancement Program" in Phoenix, Ariz., for landscaping irrigation systems and controllers, it was projected that thirty-six states will have severe water shortages by the year 2010. This projected shortage has proven to be relatively accurate as of the date of this application. A significant portion of this projected shortage was attributed to user neglect and system inefficiency in landscape irrigation. The California Urban Water Conservation Council estimated that the average California household utilized one-half acre foot of water (162,500 gallons) annually, and that fifty-five percent (89,375 gallons) of this amount was used for landscape irrigation. It further estimated that approximately one-third of the irrigation water was wasted, either due to inefficient irrigation systems or inadequate controller programming, oftentimes due in part to complicated controller programming procedures required of the operator. This results in a total annual waste of 1.81 maf of water for California households alone. Excessive water usages in municipal and commercial areas, golf courses and schools further contribute to the water shortage.

Such water shortages have forced many municipalities to enact strict water conservation measures. Two such measures include strongly encouraging the use of irrigation controllers that can adjust themselves to changing weather conditions, or instituting limitations of allowed watering days, or watering times during the day (sometimes referred to as Time-Of Use or "TOU" restrictions) both to minimize evaporation and during peak demand, which may vary during the various seasons. Some communities have also required the installation of water meters and "water police" auditors to enforce those schedules. Commercial and environmental users have enacted similar measures. For its part, the agricultural industry has responded to this shortage by resorting to drip, micro, and other low volume irrigation systems. However, after at least six years, there is still no consensus among consumers, water agencies, manufacturers, or state or federal government entities as to the most effective water conservation method or automated controls. For example, the California Energy Commission has suspended its proceedings for recommending labeling and sales standards; the California Department of Water Resources is not prepared to make recommendations concerning implementation of California Assembly Bill 1881 which would have required all irrigation controllers sold in California by January 2012 to be "smart."

Virtually all current weather based irrigation controllers and systems still utilize meteorological data to estimate the evapotranspiration, or ET, for a particular location. ET is generally used to determine the landscape watering needs by requiring input data consisting of crop coefficient factors, soil type, precipitation rates, degree of shade, and slope. This information is generally used to determine the initial controller irrigation schedule. In some applications, daily or periodic ET based calculations convert (typically) daily ET data to adjusted station run times or watering schedules. Some of these ET types of controllers and add-on modules are manufactured by Weathermatic, Rain Master, ET Water Systems, Hydro Point, Rain Bird, Hunter, Irritrol, and Toro, among others. All smart controllers, devices, and soil moisture sensors currently available are reviewed by the U.S. Department of the Interior, Bureau of Reclamation, Lower Colorado Region, available from the Southern California Area Office, in their updated September 2009 "Weather and Soil Moisture Based Landscape Irrigation Scheduling Devices".

The use and efficiency factors of ET based smart controllers is still in doubt. A recent large study of 3112 ET based controllers installed throughout California conducted by AquaCraft revealed a disappointing 6% water savings. In addition, much fewer than 1% conversion to smart controllers has been accomplished after seven years throughout the U.S., and of those, about half were either not programmed correctly due to ET complexity, or not used in their smart mode within the first year of installation, partially due to monthly ET data service fees. Furthermore, there is significant disagreement with regard to the EPA's WaterSense labeling proposals by the Irrigation industry. Finally, the EPA estimated in a document accompanying its WaterSense labeling first draft specification in December 2009 that the return on investment (ROI) for using an ET based controller was 15 years-a very long ROI which does not encourage conversion.

These continuing uncertainties and inefficiencies, along with cost, complexity, and the current state of the economy (which has deteriorated significantly since 2006) continue to slow efforts to convert to smart controller technology. Therefore, the industry is still seeking a simpler, more cost and a real water conservation effective solution. No matter how much water is theoretically saved by ET systems, the reality is that very little real water savings has been recorded to date using the currently available ET based and soil moisture sensing methods, even after the past six years of public education and municipal rebates. It is better to save real water than hypothetically saved water presented by most currently available ET based theories and methods which have been dominant to date.

Other than system inefficiencies, the main reason for landscape water waste was revealed in a marketing study conducted by the Irrigation Association (IA) and presented at the 2003 IA "Smart Water Application Technology" conference in San Diego, Calif. The study indicated that most consumers typically adjust their irrigation schedule only an average of three times a year, rather than on a daily or weekly basis, regardless of changes in environmental conditions. The relatively high cost of labor in many municipalities further prohibits frequent manual adjustments of irrigation controllers in the commercial and municipal markets. This generally results in over-irrigation and runoff, particularly during the off-seasons, oftentimes by as much as one to two hundred percent.

As an alternative to ET, soil moisture sensing devices and other methods of water conservation have been available for decades, but have enjoyed only limited success. Such devices and methods generally call for inserting moisture sensors into the soil to measure the soil moisture content. Newer soil moisture sensing technologies have more recently been developed, and claim to be theoretically accurate in measuring plant water needs. Such devices and methods are often problematic due to the location and number of sensors necessary to obtain accurate soil moisture readings, the high costs of installing and maintaining the sensors, and the integrity and reliability of the sensors' data. Nevertheless, soil moisture sensing devices and some simplified aspects of ET can be used in some embodiments of the present invention.

For about twenty years, most irrigation controllers have had a feature called the "seasonal adjust" feature. Typically the controller is programmed with the irrigation schedule and station run times appropriate to its installation time of the year and suitable for the type of landscape vegetation and soil type. As the seasons change or it gets cooler or warmer, the seasonal adjust feature allows the user to manually change the baseline station run times set at the time of initial installation. This is a convenience feature that allows for the changing of all station run times on the controller or stations assigned on a particular program at one time. While this feature has been commonly available, the homeowners or landscape maintenance personnel only use this feature an average of 3 times a year. In between each adjustment is where most of the landscape water is wasted. Smart watering methods and apparatus are needed to automate features such as this to be more effective for water conservation.

There are two primary ways to incorporate smart water technology using irrigation controllers. The first is to have it designed directly into the controller with software and features which require input from environmental sensors such as temperature, wind, relative humidity, or solar radiation or combinations thereof. The alternative is to have an add-on or a plug-in that is attached to the controller to adjust its irrigation schedule or watering durations. While add-ons and plug-ins are both generally separate from an existing controller, a distinction is made between the two. An add-on works with any brand of controller, normally installed in series on a common line to the valves, and may, for example, break the common line (shutting off the valves) under certain conditions. Many simple rain switches and soil moisture sensors are add-ons because they are installed on and break the common line, and when excessive precipitation or ground moisture is detected. A plug-in, on the other hand, literally plugs into only certain brands or models of controllers, and therefore requires compatibility with the controller. The Hunter Solar Sync and ET system and the Irritrol Climate Logic are examples of plug-ins, along with more sophisticated rain switches, moisture sensors, and weather stations.

ET, or evapotranspiration, is the theoretical calculation of the amount of water needed by plants to replace water lost through plant absorption and evaporation, and is expressed in inches or millimeters of water per day. The United States Food and Agriculture Office (USFAO), in its Irrigation and Drainage Paper No. 24, entitled "Crop Water Requirements," noted that "a large number of more or less empirical methods have been developed over the last fifty years by numerous scientists and specialists worldwide to estimate ET from different climatic variables."

There are at least 15 different ET formulas. Each of these formulas provides a different result for the reference ET (ETo). In their paper entitled "Methods to Calculate Evapotranspiration: Differences and Choices," Diego Cattaneo and Luke Upham published a four-year comparison of four different ETo formulas—the Penman-Monteith formula, the Schwab formula, the Penman formula, and the Penman program. Using the same four year data but different weather parameters and ET algorithms, the four theoretical ET calculations show results that vary by as much as seventy-percent (See FIG. 8) during certain times of the year.

Irrespective of these variations, a modified version of the Penman-Monteith formula (which varies the most from the other three equations) is still recognized as the "standard" by both the USFAO and California Irrigation Management Information System (CIMIS). Variances of less than twenty percent from this ET are considered acceptable, particularly as an irrigation deficit. In its first draft specification the EPA dated December 2009, the EPA proposed that up to a 20% deficit was not only acceptable, but in many cases was desirable during SWAT testing for the purposes of WaterSense labeling. It is now generally accepted that the Pennman-Monteith calculation provides 20% more irrigation than required. The Penman-Monteith formula is as follows:

$$ETo = \frac{\Delta(Rn - G)}{\lambda[\Delta + Y(1 + CdU2)]} + \frac{Y\frac{37}{Ta + 273.16}U2(Es - Ea)}{\Delta + Y(1 + CdU2)}$$

The variables within this formula represent the following:
ETo=grass reference evapotranspiration in millimeters per day.
$\Delta$=slope of saturation vapor pressure curve kPa° C. at the mean air temperature.
Rn=net radiation (MJm$^{-2}$h$^{-1}$).
G=soil heat flux density (MJm$^{-2}$h$^{-1}$).
Y=psychometric constant (kPa° C.).
Ta=mean hourly air temperature (° C.).
U2=wind speed at two meters (m s$^{-1}$).
Es=saturation vapor pressure (kPa) at the mean hourly air temperature
Ea=actual vapor pressure (kPa) at the mean hourly air temperature in ° C.
$\lambda$=latent heat of vaporization (MJkg$^{-1}$).
Cd=bulk surface resistance and aerodynamics resistance coefficient.

The simplest ET formula is the Hargreaves formula proposed by the College of Tropical Agriculture and Human Resources at the University of Hawaii at Manoa. Its equation is described in the College's Fact Sheet Engineer's Notebook No. 106, published May 1997, in an article entitled "[a] Simple Evapotranspiration Model for Hawaii," as follows:

$ETo=0.0135(T+17.18)Rs$

The variables within this formula represent the following:
ETo=potential daily evapotranspiration in mm/day.
T=mean daily temperature (° C.).
Rs=incident solar radiation converted to millimeters of water per day (MJ).

This formula relies upon the same ET theories and interrelationships as the other formulas disclosed above. As described herein, such reliance causes the Hargreaves formula to possess the same shortcomings as the other ET formulas.

In view of the significant discrepancies between various ET equations, as noted, the question is, which, if any, of these equations is the most accurate ET, or are they all merely theoretical estimations? The inventions described herein are not so much theoretical as practical and user-friendly alternative approaches to water conservation with greater potential to save real rather than theoretical water.

In an October 2005 Assembly bill 2717 task force meeting in Sacramento, Calif., the state Department of Water Resources (DWR) was asked for their definition of "Smart" controllers. The DWR described "Smart" in the same manner as the Irrigation Association, the Center for Irrigation Technology, and the EPA, in that a smart controller is capable of adjusting itself daily based upon the time of the year and the current environmental conditions and that smart technology is not limited to ET controllers.

A number of irrigation controller manufacturers currently offer ET based controllers as noted in the Bureau of Water Reclamation report. Several of them obtain the environmental data to calculate ET from historical records, while others utilize adjacently located weather stations to obtain real-time data. Others receive such information from a network of existing weather stations by radio, satellite or pager means for a monthly fee. The Irrigation Association announced at their November 2005 conference SWAT meeting in Phoenix, Ariz. that the Center for Irrigation Technology (CIT) is continuing to test all climatologically based water saving systems to include ET, ground moisture sensing, and other types of smart technology. As of October 2010, CIT is still conducting SWAT testing on climate based controllers, add-ons, and plug-ins. The EPA is in the process of establishing additional testing laboratories who will use the SWAT test protocol as the basis for their evaluation of smart controllers, rain switches, soil moisture sensors, add-ons and plug-ins, in addition to other water saving devices. Just recently, at the Smart Water Conference meeting with the EPA, it was announced that the EPA standards are proposed to be incorporated with the International Code Council standards.

The following U.S. patents all disclose various methods by which an irrigation controller calculates or adjusts an irrigation schedule based upon historical, distal, or local ETo: U.S. Pat. Nos. 4,962,522; 5,097,861; 5,208,855; 5,479,339; 5,696,671; 6,298,285 and 6,314,340. All of these methods calculate ETo values or receive them from external sources, and use such values to adjust and regulate irrigation. Such external sources may be CIMIS ET databases, local sensors, cable lines or broadcast stations. Several of these methods also utilize other data, such as precipitation.

While the replacement of the water in the vegetation root zone by means of theoretically calculated ET has been of academic interest for over fifty years, methods incorporating ET formulas, and the installation, comprehension and programming of controllers utilizing such methods, including those cited in the referenced patents above, are generally far too complex for the average user to understand and implement. Such a conclusion was reached in an earlier study of ET controllers by the Irvine Ranch Water District, entitled "Residential Weather Based Irrigation Scheduling Study." The study stated the following: "The water agency solution to date has been to conduct residential audits, leaving the homeowner with a suggested watering schedule, hoping it would then be followed. These programs have had limited effect and a short-term impact. A preferred solution would be to install irrigation controllers that automatically adjust watering times based on local weather conditions. Unfortunately, until now, these large landscape control systems have been far too complex and expensive for residential applications."

Such complexity is underscored by the one hundred forty-five principal symbols and acronyms identified by the USFAO for use and description of the factors and variables related to ET theory and its various formulas, covering such variables as: the capillary rise; the resistance correction factor; the soil heat capacity; the psychrometer coefficient; and the bulk stomatal resistance of a well-illuminated leaf. The sheer number of variables renders ET theory difficult to explain, understand and apply, especially for an unsophisticated consumer with little or no scientific or meteorological background. For example, the manual for one ET-based controller currently on the market comprises over one hundred fifty pages of instructions and explanations. Such unfamiliarity and complexity increase the margins of error already associated with the various ET formulas, further diminishing their effectiveness.

Water districts, irrigation consultants, manufacturers, the Irrigation Association, the Center for Irrigation Technology and other attendees at the EPA's Water Efficient Product Market Enhancement Program estimated that, due to the complexity, cost, impracticality of installation and difficulty in programming current irrigation controllers, less than one percent of all commercial and residential landscape irrigation systems currently and effectively utilize some form of the ET or moisture sensing method. While manufacturers, water districts, and irrigation consultants have accepted the concept of smart controllers as a means of landscape water conservation, homeowners (the users) have still not embraced this technology after seven years of education and encouragement with rebates.

To further emphasize this lack of acceptance, after six years of public education and encouragement with rebates and water rate increases, the Los Angeles Metropolitan Water District (that serves 3.5 million households) recently reported a total conversion of 90,000 systems to ET based controllers either provided free of charge or heavily rebated (2.6%). In another large water district, the Southern Nevada Water Authority that serves Clark County, Nevada reported in 2009 that after a three year period of 50% rebates, fewer than 100 such "smart" based controllers have been rebated. Such paltry adoption exists despite over fifty years of ET research, and over thirty years of ground moisture sensing technology. In 2006, about 1.2 million new conventional (non smart) controllers were installed or replaced in the U.S. Since the recession, this number has declined to about 700,000 controllers a year. The EPA has estimated that there currently are 13.5 million existing non smart controllers in residential use. In view of the extremely slow conversion to new ET based controllers, it would be far more effective in terms of real water conservation versus theoretical water conservation to address the 13.5 million existing controllers to make them more water efficient. Even if the ET or ground moisture sensing methods provided one hundred percent efficiency, which they do not, the limited adoption of these methods renders them an ineffective means of significant water conservation, since less than one percent of the water waste would be prevented.

A second shortcoming of the ET method is its dependence upon numerous categories of local, real-time meteorological data. As indicated above, many variables must be measured in order to calculate ET. Data for each variable must be obtained by separate sensors, each one installed in a particular location. Such particularity requires an understanding of local environmental conditions and meteorology. Furthermore, accuracy requires that the data be received from local sensors. Given the numerous microclimates existing within any one geographical area, data received from remotely located sensors may be inaccurate. The data must also be received and processed in real-time, since average or historical ET data may be inaccurate during periods of unusual or excessive heat, cold, or rain, or other deviations from historical climate patterns. Any inaccurate data would result in even greater ET deviations and inefficient irrigation. However, general trends may still be identified, even with inaccurate ET data. These general trends may be used to create the bell curves (or portions thereof) utilized in embodiments of the present invention.

ET measuring devices are generally also expensive to install and maintain. Sensors or weather stations must be placed within each microclimate to measure the different variables utilized by the formula of choice. Each weather station may cost up to several thousand dollars. Furthermore, all of these sensors or stations must undergo regular inspection, maintenance and calibration to insure that they continue to provide accurate data. This further increases the actual cost of each station. The sensors and stations must also be powered in some manner—depending upon the particular geographic location, AC power may not be readily available. All of these considerations increase the cost of implementing an ET-based irrigation system to a prohibitive level, and limit the widespread adoption of this method. Finally, all of this assumes that the weather station or sensors is even installable in a particular area. Some areas, such as street medians or parks, are not suitable for weather station or sensor installation due to aesthetic reasons or the likelihood of vandalism.

Another shortcoming of ET-based controllers is that all of the ETo formulas (including the Hargreaves formula) are generally expressed in hundredths of an inch, or millimeters, of water per day. Thus, ETo must be converted to an actual irrigation time of minutes. Such a conversion is dependent upon the characteristics of the particular hydraulic system, such as the valve sizes, water flow rates, and sprinkler or drip irrigation precipitation rates. One conversion formula, proposed by the Austin (Texas) Lawn Sprinkler Association, calculates the sprinkler run time in minutes (T) as follows:

$$T = \frac{60 \times ETo \times Kc}{Pr \times Ea}$$

The variables within this equation represent the following:
ETo=reference evapotranspiration rate, in inches.
Kc=the percentage crop coefficient.
Pr=the sprinkler precipitation rate, in inches per hour.
Ea=the percentage application efficiency of the hydraulics system.

As an example of such complexity, the crop coefficient (Kc) is different for each crop or landscape plant or grass type. Determining the precipitation rate (Pr) requires knowledge of the hydraulic system specifications—the particular types of valves and sprinklers, the number of valves and sprinklers within the system, the water flow rate and operating pressure and an actual measurement of each type of water delivery sprinkler, bubbler, or dripper. Such information is not readily available to the average consumer. Instead, the consumer must expend additional time and money to retain an irrigation expert to configure and install the system.

Another ET-to-irrigation-time conversion method, the 'deficit irrigation practice,' was proposed by the IA Water Management Committee in Appendix G of its October 2002 article entitled "Turf and Landscape Irrigation Best Management Practices." This conversion method comprised ten separate formulas, and utilized a total of twenty-nine variables and constants, not including those utilized in calculating the ET value. Many of these variables represented concepts and relationships difficult for the average irrigation designer, much less a consumer, to understand, such as: the local landscape coefficient for the particular vegetation; available water depending upon the particular soil composition; allowable water depletion rate from the root zone; maximum percentage allowable depletion without plant stress; the water management factor necessary to overcome water management inefficiency; the whole day stress-based irrigation interval; water flow rates for the particular system; and, of course, ET.

Due to the urgency arising from severe national drought and environmental conditions, and the shortcomings of the various present technologies, the irrigation industry is still researching alternative methods for water conservation and prevention of unintended runoff. The Center for Irrigation Technology in Fresno, Calif., recently renamed as the Irrigation Center for Water Technology (ICWT) along with other educational and research institutions and water conservation agencies, is conducting studies evaluating various water conservation methods. On the national level, the EPA has introduced its "WaterSense" irrigation efficiency rating program similar to the "EnergyStar" rating system currently in use for equipment energy efficiency. The purpose of such an irrigation efficiency rating program is to promote consumer awareness, compliance, and standardization as an alternative to nationally and regionally mandated water conservation measures which would severely and negatively impact the irrigation industry, landscape aesthetics and the ecology. As a result, the EPA WaterSense program introduced its first draft specification for irrigation controller labeling in December of 2009. The second draft is expected in December 2010.

It is clear from the foregoing discussion that since 2003 the irrigation water management industry, in view of a politically and economically sensitive, and urgent, water crisis, is still pursuing highly scientific, mathematical and/or theoretical approaches for resolving the problems of wasted irrigation water and drought conditions. Unsurprisingly, such approaches have met with limited success. The EPA, United States Department of Energy (DOE), Bureau of Reclamation, ecologists, environmentalists, municipalities, water agencies, research institutions, irrigation consultants, and manufacturers, and now the International Code Council are all still searching for new methods that provide practical (as opposed to theoretical) improved irrigation efficiency—methods that overcome the particular shortcomings of existing systems.

California Bill 1881 states the following in Article 10.8, section 25401.9(c) under "*Water Conservation in Landscaping*" as follows: "On and after Jan. 1, 2012, an irrigation controller or moisture sensor for landscape irrigation uses may not be sold or installed in the state unless the controller or sensor meets the performance standards and labeling requirements established pursuant to this section." No such standards are available to date, nor is there any projected date since the California Energy Commission has suspended its mission after three public meetings and input from irrigation professionals, manufacturers, water districts, and irrigation consultants. Therefore, the implementation of 1881 will most likely be delayed and standards not published in the near future due to the suspension of the California Energy Commission meetings due to disagreements within the industry and fiscal reasons. It is believed that several embodiments of the present invention will meet the anticipated performance standards and would therefore qualify for sale in California.

Landscape water conservation, when it is substantial and effective, also provides additional benefits. As noted by the EPA in its "Water Efficient Landscaping" guidelines, landscape water conservation also results in "decreased energy use (and air pollution associated with its generation) because less pumping and treatment of water is required and reduced runoff of storm water and irrigation water that carries top soils, fertilizers, and pesticides into lakes, rivers, and streams, fewer yard trimmings, reduced landscaping labor and maintenance costs, and extended life for water resources infrastructures (e.g. reservoirs, treatment plants, groundwater aquifers), thus reduced taxpayer costs." Thus, there is an urgent need for irrigation systems that conserve water and energy, and minimize negative impact upon the environment, by automatically adjusting their schedules periodically in response to meteorological and seasonal changes.

The problem of irrigation mismanagement, and the main hurdle faced by these entities, can be simply summarized as follows: once a system is properly designed and installed, most of the wasted landscape irrigation water and runoff is caused by not adjusting for daily, periodic, or seasonal changes. For example, in California, most homeowners and municipalities continue to irrigate their system in the fall based upon the summer schedule until the first rain storm of the year occurs followed by a sharp drop in temperature. If the summer schedule is assumed to be 100%, and November irrigation actually only requires, for example, about 20% of summer irrigation to satisfy the vegetation needs, this means that as much as 80% of the water is wasted in the fall. Such inaction is usually caused by the complexity and difficulty of determining the particular adjustment amounts and the significant inconvenience of daily adjustments.

As an alternative to costly and impractical to install weather stations, some manufacturers are offering an ET service that broadcasts the daily ET signal by means of a satellite or pager system. An example of this approach is the AccuWater system which takes weather data collected through a private network of weather stations and or sensors. Another example is the HydroPoint Weather TRAK that requires every controller to have a receiver that either receives ET that affects the controller irrigation programming, or one that receives separate weather sensor data that is then calculated locally into an ET value (such as provided by Irrisoft with its Weather Reach Receiver and the RainBird ET Manager).

As discussed in provisional patent applications 60/831,904 and 60/899,200 (which have been incorporated above), many communities also have water pumping and delivery issues due to drought and increasing population and demand on the infrastructure delivering that water. Many of those communities have enacted limitations on watering schedules in order to minimize the demand on those facilities. The most common water restriction method has been to limit watering to odd and even days of the month, meaning that odd numbered addresses can water on the odd day of the month, while even numbered addresses can water on even days of the month. During certain times of the year, the homeowner must also manually change the allowed time of the day that he can water. By limiting landscape irrigation to certain times of the day and by either even or street address designations, or by watering groups such as designated by the SNWA (Southern Nevada Water Authority) as shown in FIGS. 21A and 21B. In the case of SNWA, the region is divided into six watering groups, designated as A-F. Watering is allowed every day during the summer for every group, but not between the hours of 11 AM and 7 PM to minimize evaporation and high peak demand periods. During the spring and fall, irrigation is permitted any time of day, but only three times a week depending upon the assigned watering group. In the winter, only one watering day per week is permitted. Fines are issued for multiple offenders. However, this method is difficult to police because there are 500,000 customers in Clark County, Nevada, so many users commonly violate these rules. It is inconvenient for the homeowner, for example, to remember to change the watering schedule and comply with the allowed watering times of the day at least 4 times a year, particularly if they are not familiar with the programming of the controller. The SNWA estimates that after 5 years of public education and rules "enforcement", has resulted in 30% estimated compliance. While there is still a long way to go, this is far better in terms of saving real water and easing infrastructure demands than rebated ET based controllers or ground moisture sensors have shown to date. With ET related complexities and frequent disregard for watering time of use rules, a simple, intuitive solution would be highly preferred over the existing highly theoretical and technical, but impractical, state of the art ET-based and ground moisture sensing control systems and dependence upon human manual compliance with restricted watering schedules.

Furthermore, according to the EPA support statement of December 2009 accompanying their first draft WaterSense Specification, there are thirteen and a half million existing residential controllers in current use nationally. While ET based controllers address newly installed systems, existing non smart controllers, including battery powered controllers have not been addressed. Since it will most likely take a decade to replace all existing controllers with smart controllers, some simple inexpensive methods are needed to save water in the interim, because ET based methods and soil moisture sensors have not been effective in providing meaningful water conservation over the last decade since the use of ET was promoted within the irrigation industry and state and federal government agencies The relatively low cost of water, the ET based controller's initial high cost and complexity, and monthly service fees have contributed to the very low usage of ET based controllers, add-ons, plug ins.

It is therefore desirable to provide simple, user-intuitive and readily acceptable landscape water conservation methods and devices.

It is desirable that these methods and devices have a minimum of environmental sensor inputs, and a minimum of additional controller programming to implement smart water technology so as to not require professional installation or water audits.

It is also desirable that these methods not require monthly ET based service fees It is also desirable that these methods and apparatus can be implemented within the controller, or through an add-on or plug-in device to address the 13.5 million existing irrigation controllers in the U.S. (according to the EPA WaterSense draft specification of December 2009).

It is also desirable that these methods and apparatus be reasonably retail priced so as to not depend upon rebates for their acceptance.

It is also desirable that automation be provided within controllers, add-ons or plug-ins for watering restrictions alone or in combination with smart controllers, plug-ins or add-ons.

It is also desirable to automate water budgeting by providing simple, user-intuitive, and readily acceptable water conservation approaches, and clearly understood automated methods and apparatus for calculating and/or implementing adjustments to irrigation schedules.

It is further desirable to provide methods and apparatus that automate the "seasonal adjust" function of irrigation controllers either internally to a controller, or using add-ons or plug-ins.

It is preferable, but not necessary, to utilize temperature budgeting, air or ground moisture sensing, or even historical ET in automating water budgeting.

It is further desirable to provide methods and apparatus that minimize the margins and sources of errors by minimizing the number of sensor inputs required by the variables in the formulas.

It is further desirable to provide methods and apparatus that utilize minimal local, real-time meteorological data that is not necessarily ET based.

It is further desirable that such methods and apparatus be cost-efficient, affordable, installable, and usable by a large number of people and entities within the irrigation industry with the widest range of applications possible.

It is further desirable that such methods and apparatus be understandable by the average consumer.

It is further desirable that such methods and apparatus be accomplished automatically, without requiring regular manual adjustments by the operator of the irrigation watering time settings or schedules.

It is also desirable that temperature budgeting be adaptable to time of use restrictions established by various communities or water agencies.

It is also highly desirable to provide very simple methods and apparatus for water conservation for existing AC and DC powered controllers for faster implementation of landscape water conservation.

SUMMARY OF THE INVENTION

The present invention, the pending parent application Ser. No. 11/879,700, the grandparent U.S. Pat. No. 7,266,428, the great-grandparent U.S. Pat. No. 7,058,478, and U.S. Provisional application 60/465,457 filed Apr. 25, 2003, address the above desires and provide numerous automated methods of landscape water conservation by automating the seasonal "water budget" or "seasonal adjust" feature available in many irrigation controllers. Embodiments of the present invention provide methods and apparatus by which temperature budgeting, as a preferred embodiment, or ET, or soil moisture or other embodiments, can be utilized to automate the "water budget" or "seasonal adjust" feature, in order to automatically alter irrigation watering schedules, station run times and/or watering intervals easily and effectively. The invention of this and previous patents is automation of the "water budget" or "seasonal adjustment" feature. Temperature budgeting is merely a preferred method of accomplishing that goal. Historical ET or ground moisture may be used to accomplish this goal. As shown by examples below, no complicated ET calculations, transmitted ET data, or programming is required to accomplish water conservation with the present methods and apparatus.

More particularly, numerous automated methods, apparatus and systems for water conservation and management are disclosed herein and in the above predecessor patents, embodiments which automate the manual "seasonal adjust" or water budget feature available in many irrigation controllers. Embodiments of the invention are independent of expensive weather stations, evapotranspiration (ET or ETo calculations), or complicated formulas for calculating irrigation durations or sprinkler operating times based strictly upon ETo. The preferred embodiments utilize periodic environmental data that may be incorporated into calculated water budget percentage (WBP) bell shaped curves or portions thereof. The water budget percentages may be pre-programmed into controllers, add-on modules or plug-in modules, and which may be used independently of, or optionally with current environmental sensors. Embodiments of the invention may incorporate one or more of the following features:

1. An optional precipitation sensor may be used to interrupt, delay or prohibit irrigation cycles.
2. An optional temperature sensor may be used to shut down or prohibit irrigation in case of cold temperatures. A temperature sensor can also adjust irrigation run times or alter watering intervals when the high temperature exceeds the historical averages for certain locations.
3. An optional soil moisture or other sensor may be also be used in much the same way as a precipitation or temperature sensor.
4. Zip code entry can determine a specific location or geographic region.
5. Application of the water budget feature is automatic.
6. Physical embodiments may be provided within the controller, as add-ons, or as plug-ins
7. Water budget percent (WBP) may be broadcast wirelessly from a central location.
8. Irrigation controller or add-on or central broadcasting modules may be powered by AC, DC, ambient light, battery or otherwise.
9. In some applications, embodiments of the invention may be an add-on to an existing battery (non AC) powered controller using a back biased output diode.

Embodiments of the non smart versions of the present invention may incorporate one or more "bell" curves, or portions thereof, that include a set of percentages plotted over time that are applicable to particular geographical areas. In most cases, a full bell curve ordinarily covers an entire year. These bell curves are derived using historical, climatic, geographic and/or environmental information for a particular locality and preferably cover an annual time frame.

An exemplary annual bell curve for California is shown in FIG. 1 and compared to an ET curve for California using CIMIS ET data. It is to be appreciated that the calculated water budget percentages (WBP) sometimes closely approximate ET based percentage curves and calculations, as seen in FIG. 1. In the WBP embodiments, a percentage may be provided, for example, for each day of the year, and that percentage is used each day to deviate from an otherwise standard daily watering schedule. It is to be appreciated that in various embodiments, different sets of water budget percentages (e.g., different portions of a bell curve) may be provided over different time frames (e.g. hourly, daily, weekly, monthly, semi-annually, bi-annually, etc.). It is also to be appreciated that a set of water budget percentages for one locality may not necessarily be appropriate for use at another locality. Hence multiple selectable water budget percentage curves would be desirable.

In some embodiments, the temperature budgeting algorithm described in more detail elsewhere herein may be used to derive the water budget percentages found in annual bell curves (or portions thereof) which very closely approximate ET bell curves (see FIGS. 1 and 1A) or portions thereof (e.g., daily or periodic water budget percentages). These WBP's may be derived, for example, from analytical studies at various locations throughout a geographical region representing all types of weather conditions. Embodiments of regional bell curves are time-of-year dependent and generally represent an estimated average of watering needs for plants which approximate evapotranspiration needs.

In some embodiments, an add-on module may be provided with data input consisting of location (zip code, zone, weather region, etc.). This may be accomplished by directly entering the zip code, for example, into the module microprocessor, or by plugging the module outfitted with a USB port, or similar data input mechanism, into an existing personal computer. Once the location is known, data for that location such as latitude, periodic (daily, weekly, or monthly) RA factors, and periodic average high temperatures for that location is used to calculate the periodic water budget percentages curve (WBP) for that location. Once the daily percentages are determined from the curve (similar to those shown in FIG. 1A), the station watering times or watering intervals are calculated within the module. The module can then adjust the run times or watering intervals externally from the existing controller by, for example, breaking the common line.

Alternately, a controller may be designed or modified to accept the WBP data from a PC with the use of a memory stick or the like, or by other wired or wireless means. If a plug-in module is used, the WBP data may be provided to the controller through the plug-in module, which itself may receive the data by any of the above means. The controller then alters its watering run times or intervals based upon the WBP provided. In other embodiments, the controller may further adjust its watering schedule or station run times according to the WBP data using local watering restrictions, which may also be downloaded by any of the above means. Such controllers can be augmented with additional environmental sensors such as a rain switch or sensor, temperature sensor, soil moisture sensor, or other sensor, or combinations of sensors, to modify implementation of the WBP.

In highly simplified embodiments, add-on modules may be provided that are pre-programmed with the date, time and one or more WBP bell curves (or portions thereof) for a particular geographic location. The programming may be accomplished when a module is made, or a module may have an input port for downloading the WBP data for a selected geographic location where the module is to be used, together with the current date and time (if not already provided). The modules of these embodiments are preferably battery powered, and have an electrical input and output connection so that they may be connected, for example, on a common line between a controller and its valves to break that common line when appropriate. These modules may be encapsulated (potted) to protect them from exterior environmental conditions. The simple modules of these embodiments include internal clocks and contain programming to accumulate periodic (e.g. daily) water budget percentages (WBP) from the pre-programmed bell curves. When the accumulated WBPs reach or exceed a given threshold level (e.g. 100%), the modules close the connection allowing current to flow through the line for a given interval (e.g. 24 hours). When the interval is over, the connection is broken, and accumulation of periodic WBPs starts over until the threshold is reached or exceeded again. In preferred embodiments, it is desirable that the controller be set to water a full summer cycle every day. The modules of these embodiments will prevent such watering until the threshold is reached, and on that day the controller can perform full watering. It is to be appreciated that modules of these embodiments may be placed on any line leading to or from a valve in order to control that valve; and that multiple modules may be used to control multiple valves. In some embodiments, a display may be provided on such modules showing one or more of the following: current date, current time, whether watering is currently being allowed or not, accumulation toward threshold, etc. In some embodiments a reset input/switch (to reset the accumulation) and/or a manual override input (e.g. switch) may also be provided.

In slightly more sophisticated embodiments of the pre-programmed modules of the present invention, local watering restrictions may also be loaded into a module, along with the WBPs for a geographic location, and the current date and time. This additional data is used by the module and its internal clock to prevent watering during restricted days and/or times of day. Thus, the accumulated WBPs may reach or exceed the established threshold on a day or at a time when watering is prohibited according to the known local watering restrictions. In such cases, programming in the modules of these embodiments will delay closing the line (completing the circuit to allow watering to occur) until a day/time when watering is permitted according to the local watering restrictions. After watering is allowed to occur, the connection is then broken, and accumulation of periodic WBPs starts over until the threshold is reached or exceeded again. Accumulation of WBPs may or may not continue during the delay, depending on the desires of the user. Embodiments of these modules may also have a display, reset and/or override functions.

In more sophisticated embodiments of the pre-programmed modules of the present invention, at least one environmental sensor may be provided, with or without the local watering restrictions, along with the WBPs for a geographic location, and the current date and time. Input from the environmental sensor is used by the module, along with the watering restrictions if provided, to prevent watering under certain environmental conditions and/or during restricted days and/or times of day. Thus, the accumulated WBPs may reach or exceed the established threshold on a day or at a time when an environmental sensor indicates that there is a condition where watering should not occur (e.g., there has been recent precipitation, the temperature is below freezing, etc.). Programming and internal clocks in the modules of these embodiments will cause watering to be delayed until the environmental condition has changed. If local watering restrictions are also available, watering will be prevented until both (a) the environmental condition has changed/passed, and (b) it is an allowed watering day/time. After watering is allowed to occur, the connection is then broken, and accumulation of periodic WBPs starts over until the threshold is reached or exceeded again at which time the environmental sensor(s), and local watering restrictions if present, are again consulted before watering is allowed to occur. Accumulation of WBPs may or may not continue during the delay, depending on the desires of the user. Embodiments of these modules may also have a display (including current environmental input), reset and/or override functions.

In advanced embodiments of the modules of the present invention, a plurality of inputs are provided on such modules, corresponding to the plurality of valve output control lines from the controller. Some of these embodiments may be referred to as "plug ins." A module is attached between the controller and these lines to the valves, and the common line. In these embodiments, the module "learns" the irrigation schedule by monitoring the voltage or current on each line used to control each individual valve. The module is programmed with the WBP for the given geographic location, along with the date and time, and optionally any restricted watering schedules and/or one or more environmental sensors. However, instead of accumulating WBPs until a threshold is reached, the daily WBP is used to modify the daily irrigation schedule from the controller. By way of example and without limitation to the appended claims, a controller may be programmed to water 4 valves for 12 minutes each. A module of these embodiments learns this schedule, and then applies the current day's WBP to that schedule. So, for example, if the WBP for the day is 75%, then the module will cut off each valve after 9 minutes of operation. Of course, if optional environmental sensors and/or restricted watering schedules are provided, the module will also prevent watering during those times. Embodiments of these modules may also have a display, reset and/or override functions.

In other embodiments, simple controllers may be provided that that are pre-programmed with the date, time and one or more WBP bell curves (or portions thereof) for a particular geographic location. The programming may be accomplished when the controller is made, or a controller may have an input port for downloading the WBP data for a selected geographic location where the controller is to be used, together with the current date and time (if not already provided). The controllers of these embodiments contain programming to accumulate periodic (e.g. daily) water budget percentages (WBP) from the pre-programmed bell curves. When the accumulated WBPs reach or exceed a given threshold level (e.g. 100%), the controller is allowed to operate its valves for a given interval (e.g. 24 hours). When the interval is over, operation of the valves is prevented, and accumulation of periodic WBPs starts over until the threshold is reached or exceeded again. In preferred embodiments, it is desirable that the controller be set to water a full summer cycle every day. The programming of these embodiments will prevent such watering until the threshold is reached, and on that day the controller can perform full watering. Embodiments of these controllers may also have a display, reset and/or override functions.

In slightly more sophisticated embodiments of the pre-programmed controllers of the present invention, local watering restrictions may also be loaded into a controller, along with the WBPs for a geographic location, and the current date and time. This additional data is used by the controller to prevent watering during restricted days and/or times of day. Thus, the accumulated WBPs may reach or exceed the established threshold on a day or at a time when watering is prohibited according to the known local watering restrictions. In such cases, programming in the controllers of these embodiments will delay watering until a day/time when watering is permitted according to the local watering restrictions. After watering is allowed to occur, watering is again prevented, and accumulation of periodic WBPs starts over until the threshold is reached or exceeded again. Accumulation of WBPs may or may not continue during the delay, depending on the desires of the user. Embodiments of these controllers may also have a display, reset and/or override functions.

In more sophisticated embodiments of pre-programmed controllers of the present invention, at least one environmental sensor may be provided, with or without the local watering restrictions, along with the WBPs for a geographic location, and the current date and time. Input from the environmental sensor is used by the controller, along with the watering restrictions if provided, to prevent watering under certain environmental conditions and/or during restricted days and/or times of day. Thus, the accumulated WBPs may reach or exceed the established threshold on a day or at a time when an environmental sensor indicates that there is a condition where watering should not occur (e.g., there has been recent precipitation, the temperature is below freezing, etc.). Programming in the controllers of these embodiments will cause watering to be delayed until the environmental condition has changed. If local watering restrictions are also available, watering will be prevented until both (a) the environmental condition has changed/passed, and (b) it is an allowed watering day/time. After watering is allowed to occur, watering is again prevented, and accumulation of periodic WBPs starts over until the threshold is reached or exceeded again, at which time the environmental sensor(s), and local watering restrictions if present, are again consulted before watering is allowed to occur again. Accumulation of WBPs may or may not continue during the delay, depending on the desires of the user. Embodiments of these controllers may also have a display, reset and/or override functions.

In some controller embodiments, instead of accumulating WBPs until a threshold is reached, the daily WBP is used to modify the daily irrigation schedule of controller. By way of example and without limitation to the appended claims, a controller may be programmed to water 4 valves for 12 minutes each. Then, for example, if the WBP for the day is 75%, then the controller will cut off each valve after 9 minutes of operation. Of course, if optional environmental sensors and/or restricted watering schedules are provided, the controller will also prevent watering during those times In some embodiments, a water budget percentage (WBP) bell curve may be developed, for example, by using soil moisture sensing data combined with specific location historical or baseline soil temperature and/or soil moisture information, and comparing it to current soil temperature and moisture data. The station run times or adjusted watering schedules may be determined directly from a bell curve such as those shown in FIG. 1A. Each region of the United States, or the world, for that matter, could have historical bell curves pre-programmed into the controller or add-on or plug-in device.

In some embodiments, it is possible to obtain a water percentage bell curve using soil moisture sensing data combined with specific location historical or baseline soil temperature and soil moisture information and comparing it to current soil temperature and moisture data. As with temperature budgeting, in some of these embodiments the controller may be programmed with a baseline or summer irrigation schedule. In this case, the baseline schedule may be determined from the soil type, slope, and crop coefficient factors, as well as the sprinkler precipitation rate. The present invention is not particularly concerned with how the baseline schedule is determined, only that it can be adjusted on a periodic (preferably daily) basis after the baseline or summer schedule is determined using ET, soil data, experience, or readily available programming software such as that provided by Rain Bird on their web site. The WBP is expressed as a percentage, which is a ratio of numbers. Historical or baseline soil data compared to current similar data may provide a percentage similar to temperature budgeting. From the resulting percentages, or percentages interpolated from a bell curve for soil, the station run times or watering intervals can similarly be adjusted either in an external module which then supplies this information to the existing controller, or which may break the common line. Alternately, the data can be provided directly into the controller which then adjusts the irrigation based upon the daily or periodic percentage data or bell curve. As with the temperature methods, field sensor data can be provided by hard wired or wireless means to the external module or to the controller directly. A precipitation sensor can be added optionally to immediately interrupt irrigation. If an adequate rainfall amount is recorded, the soil moisture sensor will indicate that condition and interrupt or disable irrigation. The rain fall information may also be provided by wired or wireless means.

Similarly, historical ET for a location may be provided for the month of July as the baseline month. Then a periodic ET is compared to the baseline ET and its ratio is expressed as a percentage with which the run times or watering intervals or schedules are adjusted. FIG. 1A shows several curves expressed as a percentage of the baseline (preferably summer) irrigation schedule. These ET based curves can then be stored into the controller, add-on, or plug-in microprocessor. One of these is then selected by entering a zip code or region as shown in FIG. 1A. While FIG. 1A shows temperature budgeting percentage curves, the analytical study in FIG. 1 at twenty five locations indicates close approximation to ET regardless of location. Another observation is that while wind and relative humidity may have a daily affect upon ET, that for landscape purposes over longer periods of time, these two environmental parameters tend to cancel each other out. During the course of a month, a certain number of windy days will tend to increase the need for irrigation, while certain days of higher humidity will tend to decrease the need for irrigation. Automation of the water budget feature is therefore similar whether the preferred temperature budgeting method is used, soil moisture, or ET based. The proposed inventive devices do not transmit or receive ET data, nor do they calculate ET from sensor data. Historical ET data may however be used for the purposes of establishing the summer or baseline peak irrigation percentage (typically 100%).

Operationally, as with temperature budgeting, the controller is programmed with a baseline or summer irrigation schedule which may be determined, for example, from the soil type, slope, and/or crop coefficient factors, as well as the sprinkler or dripper precipitation rates. Rain Bird, for example, among others provides an irrigation schedule determination means over the internet. Certain landscape data is entered and a recommended schedule is developed from their web site. Alternate means of determining summer or baseline irrigation schedules come from personal experience, or other published landscape watering guidelines. The present invention is not concerned as to how the baseline irrigation schedule is determined, whether it is soil moisture sensor based, or climatologically, or ET based. Embodiments of the present invention automate or simulate the automation of the water budget or "seasonal adjust" feature. The water budget feature within a controller can be automated internally, provided by an external plug-in that provides the percentage data to the controller microprocessor, or adjusts the watering intervals or station run times by means of an external plug-in that is connected to either the controller common line or monitors the controller outputs. In embodiments of the invention, adjustment of a baseline schedule may be accomplished with either a cumulative or a (preferred) daily water budget adjustment after the baseline watering schedule is determined—so long as it can be automatically adjusted on a periodic (preferably daily) basis after a baseline (e.g. summer) schedule is determined. A water budget is expressed as a set of percentages, and embodiments of the present invention automate application of those percentages. The present invention starts after the baseline irrigation schedule is determined and uses a water budget percentage (WBP) bell curve for the location to adjust that schedule. The schedule may optionally be modified based on current environmental sensor data. Those sensors may include air temperature, relative humidity, solar radiation, wind, and rainfall, or combinations thereof. Then, based on the WBP and optional current environmental conditions, the station run times or watering intervals are adjusted accordingly.

Historical or baseline soil data available from sources such as CIMIS may be used or compared to current similar data to provide percentages in a manner similar to temperature budgeting. From the resulting percentages, or percentages interpolated from soil moisture data, the station run times or watering intervals can similarly be adjusted. This may be accomplished in an external module which then supplies this information to the existing controller, or which breaks the common line; or, alternatively, the data can be provided directly into the controller which then adjusts the irrigation based upon the daily or periodic WBP data or bell curve. The field sensor data can be provided by hard wired or wireless means to the external module or controller. A precipitation sensor can be added optionally to immediately interrupt irrigation. If an adequate rainfall amount is recorded, the soil moisture sensor will indicate that condition and interrupt or disable irrigation. The rain fall information may also be provided by wired or wireless means.

While temperature budgeting is preferred over soil moisture sensing and ET methods, because of the complications of using ET directly, and the simplicity of using water budget percentages, in some situations historical ET data may be used to develop water budgeting percentages of the present invention and avoid complicated programming of an ET-based controller, add-on or plug-in. For example, historical ET data may be used to develop WBP bell curves for daily or periodic water budget percentages. As stated previously, the present invention is not concerned with how the baseline or summer irrigation schedule is determined, only with its adjustment of that schedule after it is determined. Historical ET data is readily available from a number of government climatological sources such as CIMIS. While conventional ET methods are cumbersome, complicated, and expensive, it is still a widely recognized method of determining the baseline irrigation schedule. It is important to recognize that all embodiments of the present invention do not receive or transmitted ET data directly, nor use sensor data to calculate ET, nor store current or historical ET to determine the baseline irrigation schedule. Historical ET and/or other historical data may only be used as one way to develop a WBP curve for a location.

In embodiments utilizing the derived sets of daily water budget percentages, an existing controller may be programmed with a summer irrigation schedule. Such a summer schedule may be obtained from prior experience, with professional assistance, or using various published guidelines that allow the user to factor in such items as landscape vegetation type, precipitation rate, soil type slope, and/or location to determine an appropriate summer irrigation schedule. The water budget percentages (WBP) may then be determined with reference to this summer schedule, so that daily deviations from the summer schedule may be made using the WBPs. Accordingly, the percentages during hotter times of the year are large (e.g. a given day in June may be 98%), resulting watering times nearly equal to the peak summer run times; but in cooler times of the year, the percentages are generally smaller (e.g. a given day in October may be only 35%), resulting in shorter watering station run times or longer intervals between watering cycles, depending upon the method selected.

In preferred embodiments, with the lowest cost and simplest to install and program, the selected bell curve (or portion thereof) provides daily or periodic water budget percentages (WBPs) that are added (accumulated), so that watering is delayed until a certain threshold is reached, at which time watering is allowed to occur according to the preferred summer run time. During the hot times of the year, these embodiments would ordinarily result in a daily or near daily irrigation cycles; but during the cooler times of the year, the percentages are much smaller resulting in an increased interval between irrigation cycles since it would take more days for the accumulations to reach the threshold. In embodiments with precipitation sensors described below, if rainfall has been detected, irrigation could be further delayed.

In some WBP embodiments, optional environmental sensors may be employed to determine whether there has been recent precipitation, and in these embodiments, watering may be delayed if such precipitation has been detected. The output from an environmental sensor (e.g. a precipitation sensor or rain switch) may go directly into the microprocessor of either the controller or add-on module. In these embodiments, the microprocessor determines how long the rain delay should be, and may be instructed to pause the watering interval until the rain delay period has ended, then resume normal operation, much like the "pause" feature of a DVR.

After 10 years of smart product development, public education, and studies, the industry is still searching for more effective, simpler, cost effective means of water conservation than ET based or soil moisture based methods. Embodiments of the present invention present simple alternatives to water conservation without the use of ET, soil moisture sensors, complicated programming, high cost, or monthly service fees. The WBP embodiments do not use any form of ET or smart water technology as defined by the industry. Instead they use a pre-determined watering interval for a particular time or day of the year to approximate the watering needs of the landscape materials. Combining an educated estimate for watering needs with an optional simple sensor (such as a rain switch and/or a temperature sensor) provides for better watering efficiency than mandated watering restrictions and inefficient ET or soil based methods.

Other embodiments of the present invention rely upon the time of year, current local temperature data, and information particular to the geographic location, to calculate and adjust one or more irrigation schedules on a daily or periodic basis. These embodiments satisfy the definition of "smart" controller by using current temperature data and the information concerning the invention's geographic location to calculate a periodic (preferably daily) water budget ratio which is used to alter, adjust and/or modify one or more irrigation schedules. This is accomplished by comparing current geo-environmental data to historical geo-environmental data and calculating a percentage of water for the current day compared to a peak, summer or other benchmark irrigation schedule. Minimizing the number of climatic variables and simplifying the calculation in this manner renders the present invention easier and less expensive to install, operate and maintain, and therefore, much more appealing to the public. The present invention also provides apparatus and methods to combine simple temperature budgeting with time of use (TOU) to offer residential, commercial, municipal users and water districts options that best meet the needs of their local and regional water related issues. It is important to note that the present method does not use any environmental data to calculate ET, nor use any historically stored ET, nor does it transmit or receive ET.

For about twenty years, most irrigation controllers have had a "seasonal adjust" or water budget feature as part of their functions. This allowed the user to manually set a percentage of the original run time settings and alter the run times by the set percentage. For example, if the run time for station 5 was 10 minutes and station 7 was for 20 minutes, setting the water budget to 70% would adjust those run times to 7 minutes and 14 minutes respectively. Embodiments of the present invention automate the station run time percentage feature by the aforementioned selected "bell" curves, or portions thereof, or in other embodiments, by varying the watering interval with daily (or periodic) accumulation of the bell curve percentages until a threshold is reached. The bell curves obtained and used by the WBP embodiments of the present invention may be a result of temperature budgeting calculations obtained by the algorithm described herein which are compared to ET based methods in FIGS. 1 and 1A.

The preferred water conserving smart technology methods of the present and previous physical embodiments of are sometimes referred to as "temperature budgeting," and the calculated result is a water budget or water budget ratio (WBR) that can be used to modify irrigations schedules in a variety of ways. The terms "water budget" and "water budget ratio" may sometimes be interchanged, both referring to a percentage, and not a particular volume of water. The WBP embodiments include compilations of these daily WBR percentages into bell curves or portions thereof. One major difference between the use of temperature budgeting embodiments and some of the WBR embodiments is that the temperature budgeting embodiments used environmental sensors to calculate a current daily or periodic water budget percentage that was applied daily or by means of accumulation to alter the station run times or watering intervals; whereas in the WBP embodiments, the percentages are pre-calculated for each day or period, and simply applied to that day or period when it arrives.

In some of the new embodiments of the present invention, a set of water budget percentages may be pre-determined for a given time period (e.g., a day, week, a month, a year), and that this set of pre-determined percentages are used in conjunction with a standard summer or peak watering schedule to provide daily deviations from the peak schedule. In some embodiments of the invention these daily deviations may also be affected by input from environmental sensors such as temperature, rain, solar radiation, wind, humidity, or combinations thereof.

In some embodiments, water budget percentage (WBP) curves appropriate for certain regions of the U.S. or abroad are stored into the controller, add-on or plug-in, or central broadcasting system. While no ET is used to calculate the water budget ratio or percentage, it should be noted that the ET based water budget bell curves of FIG. 1A is used for comparison with the temperature budgeting percentage curve from CIMIS data derived without using ET data are remarkably close. Thus, it is possible to use those percentages interchangeably. This allows for the storage of daily, weekly, monthly, or annual water budget percentages in the controller, add-on or plug-in without actually using ET for water budget calculations.

By way of example, an existing non smart controller may be installed at a residence and programmed with a summer irrigation schedule appropriate for, in this example, Winterhaven, Fla. This summer schedule has already been determined by experience, professional assistance, and/or from landscape irrigation watering guidelines. The controller, AC or DC powered, operates every day except for the lawn mowing day or family barbeque day, for example. As stated previously, most of the waste of landscape irrigation water (except for system inefficiency or lack of a rain switch) is due to not adjusting the controller throughout the year, preferably on a daily basis. In this example, an add-on module of the present invention is provided with a set of water budget bell curves by the zip code as an exemplary means of selection. The zip code for Winter Haven is 33880 which selects the WBP bell curve that is shown as Winter Haven in FIG. 1A. This WBP curve could be one derived with the temperature budgeting method or ET based bell curve of percentages because they are so similar, or from RA, ground moisture, or any other environmental data sufficient to provide a reliable water budget percentage bell curve. If it is now October, according to the FIG. 1A bell curve of temperature budgeted or ET based percentages, today's percentage could be, for example, 60%. Assuming that the threshold percentage is 100%, the embodiment will not allow watering today. If tomorrow is 62%, that is added to today's percentage such that the threshold of 100% is exceeded. At that point, the next 24 hours (or some other designated time frame) is designated as a watering interval. If an optional precipitation sensor is provided, and if it is raining or has recently rained, that irrigation cycle will be either cancelled or postponed, depending on whether the precipitation sensor breaks the common line itself or provides rainfall data directly into the add-on microprocessor or controller microprocessor which controls the common line.

In this example, assuming no rainfall, the accumulations in October will exceed 100% about every other day, so the controller will irrigate approximately once every other day. If the rain sensor merely breaks the common line as an add-on, irrigation is interrupted until the hygroscopic material in the rain switch dries out. If the rain sensor is a tipping bucket that provides actual rainfall data and is a plug-in directly into the controller microprocessor, the controller may be programmed to provide irrigation delay dependent upon the amount of rainfall data provided by the rain sensor. For example, if 0.10 inches of rain is detected, 12 hours of rain delay may be initiated. If 0.75 inches of rain is reported, 48 hours of rain delayed irrigation may be initiated.

It is to be appreciated that in some embodiments, only a portion of the WBP curve may be utilized. For example, and without limitation, the WBP data may be used only during the summer months (using only that portion of the annual bell curve), and not used during the remainder of the year. By way of illustration and without limitation, a controller may be programmed for a full summer watering schedule during the months of May-September, during which time the WBPs are used to modify the schedule; however, the controller may be programmed with different watering schedule(s) during the months of October-April during which time the WBPs are not used.

The temperature and percentage budgeting methods and embodiments of the present invention can be used with any irrigation controller system: AC, DC, battery, solar, water, wind, or ambient light powered, and with stand alone or central wired or wireless controllers, with or without remote programming, with wired or wireless sensors, as add-on modules to existing controllers that may be stand alone or independently or globally addressable as in a central control system, and in various combinations of these embodiments. Temperature budgeting embodiments of the present invention offer "smart water" technology that can also be used in the form of a module that may be mounted easily and inexpensively without a service fee at the irrigation valve(s) with independent valve operation from any existing controller. The present methods can also be combined with local communities time of use watering restrictions for full flexibility of choice of the method best suited for the local water related needs and conditions.

Temperature based water budgeting is guided by the following universally understood concepts:

1. More water is required to irrigate landscape or crops during periods of warmer temperatures.

2. Less water or longer intervals between irrigation cycles are required during periods of cooler temperatures.

3. Little or no water is required or desired below a certain temperature, or during certain times of the year 4. No irrigation is required while it is raining, or for a period thereafter.

5. For compliance to published municipal watering schedules, or allowed (or disallowed) watering times of the day, devices or methods are provided that will automatically enforce compliance with the local watering mandates either alone or in combination with smart water technology as herein described.

The methods and apparatus of the present invention may be provided in a commercially available device having some or all of the following components: a means for an operator to enter data into the controller, such as a keyboard, touch screen, dial, magnetic card readers, remote or wireless device; a microprocessor or microcontroller to compute and adjust the irrigation schedule according to the present invention, based upon internal and external data; one or more data storage means (which may or may not be integrated with the processor), such as random access or read-only memory chips, or hard drives, containing the present invention and zip code or latitude and extraterrestrial radiation lookup tables and other data used herein, and storing the preliminary and adjusted irrigation schedules; a power source, either alternating-current (AC), direct-current (DC), battery, solar, ambient light, water, or wind powered; at least one temperature sensor, which may be provided in a separate unit that is in communication with the microprocessor (e.g., through a physical hard-wired connection, a wireless connection or radio transmission), or may be a component built into the irrigation controller; and means for controlling or limiting the water used by an irrigation system, such as cutoff switches or adjustable valves.

Additional optional features include at least one precipitation sensor, at least one relative humidity sensor, and a global positioning system (GPS). The precipitation and/or relative humidity sensor(s) may be provided in separate unit(s) that are in communication with the microprocessor (e.g., through a physical hard-wired connection, a wireless connection or radio transmission), or they may be components built into the irrigation controller. It is to be appreciated that each of the sensors may constantly or periodically provide a signal or input of raw data to the controller that is read, processed and used in determining the water budget ratio that will be applied to the irrigation schedule without performing any calculation of ET. The GPS system may also be provided in a separate (optionally removable) unit, or it may be integrated with the controller unit as well.

Some embodiments of the present invention are installed within a common poly-vinyl-chloride (PVC) irrigation pipe. The pipe may be inserted into the ground so that it extends only slightly above the ground to offer improved wireless reception. This placement minimizes the profile of the controller, increasing the aesthetic appeal of the surrounding environment and reducing the likelihood of vandalism. The controller utilizes wireless communication means (such as radio or infrared), allowing the operator to program the apparatus remotely. A temperature sensor is installed within the pipe at a position that minimizes sun-loading effects. Such a location may be near or just below ground level, or on top of the pipe under a shaded and ventilated cover. An optional precipitation sensor, with or without a rain-catcher, may be mounted at the top end of the pipe to detect rainfall, or at another location in wired or wireless communication with the controller.

A preferred embodiment is battery-powered, using commercially available technology emphasizing energy conservation and the long-distance operation of irrigation valves. Significantly extended battery life, and the extended range of DC valve operations, such as those disclosed in this inventor's U.S. Pat. Nos. 5,914,847 and 6,351,366, allows the controller to be placed in remote areas, without the need for AC power or solar panels. Such battery power minimizes the dangers of power surges and outages, and improves electrical safety and aesthetic appeal. It also eliminates the installation and maintenance cost of power meters, and their unattractiveness in the landscaped area.

Alternative embodiments provide for an irrigation controller or module to be housed within a valve box, with externally mounted temperature and optional precipitation, relative humidity, or wind sensor(s) affixed upon the valve box or elsewhere, and provided in wired or wireless communication with the controller or module. The unit may be powered by using any one or more of the power sources described above, depending upon its particular placement relative to such available sources. This approach may be better suited for certain residential, commercial, and turf irrigation applications. A shortcoming of a valve box battery powered controller, it may not be practical to install an external rain and temperature sensor.

In commercial use with AC power, the operator first attaches the irrigation controller or module to an existing irrigation system. This can be done at any time of the year, not merely during the summer months. He also installs the temperature sensor within the target geographical area, and initiates its communication with the controller. An optional readily available rain sensor and/or humidity sensor may also be installed, and placed in communication with the controller. Finally, an optional GPS system may also be installed and placed in communication with the controller.

With more sophisticated methods that can be used worldwide, the operator initially programs the controller using either a data entry device at or on the controller or its enclosure, or using wireless or radio input that is received by the controller. The programming steps are as follows: the user first enters the current date and time (e.g., time-of-day, month, day, and year). The user then enters the expected summer high (referred to herein as the "stored" or "standard") temperature at the particular controller location. The user then provides the latitudinal location of the controller. The latitudinal location may be determined by the operator from information provided by various sources, such as online databases or a reference chart in the controller owner's manual. Alternatively, the latitudinal location may be determined by the controller itself when the operator enters the local zip code, the controller using an internal lookup table to match the zip code with an approximate latitude. An exemplary initial setup screen would thus have an appearance similar to the following:

Current Time/Date: 10:15 AM Feb. 15, 2004
Expected Summer High Temperature: 98° F.
Latitude of this Location: 36 N As an alternative to entering the local latitude and average summer high temperature, and as the preferred embodiment, the end user may simply enter a local 5-digit zip code. In 1993, Oregon State University developed a Spatial Climate Analysis Study. The result was entitled the "PRISM" model (Parameter-elevation Regressions on Independent Slopes Model) which takes all the zip codes in the United States and reports 10, 20 and 30 year averages of various climatological data such as maximum, minimum and average temperatures, rainfall, etc. The study took 4 kilometer square areas of the United States, and using the closest weather stations, interpolated the meteorological parameters taking into account topography such as elevation and proximity to water bodies. This study and data is recognized by the USDA National Resources Conservation Service, the Forest Service, and the NOAA Office of Global Programs.

By entering a zip code into the controller, the latitude and average summer high temperature may be automatically determined using such stored historical data. This eliminates the need for the user to enter the local latitude and estimated summer high temperature manually, simplifying the programming procedure further. This approach still requires providing the controller with an initial (summer) irrigation schedule. An example programming screen for this approach appears as follows:

Current time/date: 10:15 AM Feb. 15, 2004
Local zip code: 93711

In other embodiments, a GPS system is provided either with the controller or module, or in a separate, optionally removable unit. Upon power up, the GPS system determines the location (through satellite communication or the like), which is provided to the controller. Then, as with the zip codes discussed above, the latitude and/or average summer high temperature may be automatically determined from stored historical non ET based data using the position information from the GPS system, instead of user input. The user must still provide an initial irrigation schedule. In a preferred aspect of this embodiment, since the controller is not generally intended to be moved after it is deployed, the GPS system may be removed after the controller position is determined and downloaded, with the position information stored in non-volatile memory. Alternatively, the GPS system may be part of the deployed controller system, and remain with it.

As an alternative to the GPS method or zip code entry from which the controller or module internally determines the latitude and the average summer high temperature for that PRISM cell, that information or zip code could be inputted by the local irrigation distributor along with the date and the local time at or before the time of delivery of the unit. In this manner, the end user would only have to program the controller for its summer irrigation schedule and connect the temperature sensor and optional other sensors.

The controller requires a preliminary (preferably summer) irrigation schedule. This may be a default schedule, or an initial schedule provided by the operator. This preliminary schedule may be obtained from a system designer, consultant, equipment distributor or architect, any of whom may recommend an appropriate summer irrigation schedule based on the soil type, slope, variety of landscape vegetation, types of valves and sprinklers, and water available for that particular area.

The controller or module then automatically determines the extraterrestrial radiation factor (RA) for the standard date and location from a look-up table stored within the unit. The RA utilized by this invention must be distinguished from the solar radiation value (Rn or Rs) provided by weather stations and sensors, and utilized by ETo formulas. Specifically, RA is a function of the angle at which the sun strikes the earth at various times of the year at various latitudes, while solar radiation is a measure of the actual intensity of sunlight at a particular time. The zip code entry (or other location information input) determines the latitude and the historical average summer high temperature for that zip code/location. The latitude in turn determines the extraterrestrial radiation factor, which comprise the stored historical geo-environmental data of this invention.

The controller or module then automatically calculates the standard temperature budget factor (STBF) using the summer high temperature, its date and the latitude, and any number of relatively simple formulas utilizing the RA value for the high temperature date. Specifically, and as described in greater detail herein, one method of calculating the STBF is to multiply the high summer temperature (from a stored table, or provided by the operator) by an RA (the RA determined by the particular geographic location of the controller, and either the estimated date of the summer high temperature or the average summer RA values for the particular geographic location). The STBF is then stored within the controller and used for subsequent determinations of the water budget ratio (WBR), as described in greater detail herein.

The controller or module also obtains the actual high temperature and RA for the particular current period, the former from its temperature sensor and the latter from its internal look-up table. Such periodic data is used to calculate the periodic temperature budget factor (PTBF). The PTBF is calculated utilizing the same formula for calculating the STBF, but using currently available data.

In one aspect of the invention, the controller or module then computes the WBR by dividing the PTBF by the STBF. This ratio is then used to adjust the preliminary irrigation schedule for that particular period. In this aspect of the invention, preliminary irrigation schedule may be multiplied by the WBR to obtain the modified (actual) irrigation schedule. The present invention then irrigates the irrigation area pursuant to the modified irrigation schedule, as described in greater detail herein.

Because the present method relationally adjusts the irrigation station times or varies the watering schedule or watering days, it is suitable for nearly all conditions and locations. It inherently compensates for all of the characteristics and specifications of the existing irrigation system—unlike the prior art, it does not require multiple complicated formulas or variables. The method also inherently compensates for particular environmental conditions. For example, it may be applied to the "cycle and soak" method commonly utilized for sloped landscapes, since the present method increases or decreases the initial irrigation schedule for the sloped landscape based upon the WBR.

Several alternative embodiments of the present invention provide a temperature budgeting module outside of a stand-alone irrigation controller. Such a module is placed along the output path of an existing irrigation controller, so that it intercepts and processes any signals (typically the 24 VAC) from the controller to the irrigation system. Such modules permit the operator to add the desired features described herein to any existing irrigation controller without replacing the old controller entirely. In most embodiments, such a module will include a temperature sensor for use in determining current local temperature, to be used in calculating the WBR as described herein. In other embodiments, such a module may include additional optional sensors (e.g. precipitation, relative humidity, wind, etc.). In other embodiments, such a module may include a receiver for receiving a signal containing the WBR. In other embodiments, the signal received by the module may include any or all of the following information: current temperature, precipitation/wind information, and/or other information that is used by the module to calculate the WBR.

Other alternative embodiments of the present invention permit the operator to install the present invention upon an existing irrigation controller by making the appropriate software changes to the instruction set of the controller, and by adding a temperature sensor to an available input port.

Some embodiments of the present invention do not require the operator to input the actual date of the expected high temperature. Instead, the present invention may assume that such date occurs during the summer months, and average the RAs for the summer months to obtain an average RA for the STBF calculation.

Other embodiments of the present invention allow the operator to input the temperature, date and preliminary irrigation schedule for any time of the year. The present invention then determines the STBF from such data. The WBR remains accurate due to the ratio relationship between the PTBF and STBF, as described herein.

Other alternative embodiments of the present invention utilize AC power instead of battery power. While the latter is the preferred embodiment herein because it is the most technically challenging due to its power availability limitations, residential applications constitute over half of all landscape irrigation controllers, and virtually all of these residential controllers are AC-powered. Such embodiments may be installed anywhere upon the residential property, such as within a garage. They may be operated by input means built into the controller, or by wireless transmission from a remote. The temperature and rain sensors are mounted outdoors to measure ambient temperature, at various locations (such as the eave of the garage). These sensors may be hardwired to the controller or in short-range wireless communication with the controller. The method of calculating the WBR, and the operation of the cutoff switches and valves, remain unchanged.

Optional procedures may also be incorporated into the present invention. For example, after entering the expected summer high temperature and latitude or the zip code, the operator may specify the minimum irrigation temperature. This insures that the irrigation schedule is not activated when the temperature is near or below a certain point, such as freezing temperature. Such minimum temperature requirement serves two primary purposes—first, to conserve water, and second, to protect the safety of vehicles and pedestrians traveling through the irrigation zone during freezing temperatures. A second option permits the operator to further adjust the irrigation schedule according to the particular circumstances and/or limitations, such as the water delivery method utilized by the irrigation system, the specifications of the system, or the type of plants being watered. This allows the operator to fine-tune the irrigation schedule based upon personal experience, observations or unusual field situations. A third option is to attach a commonly available precipitation sensor to the irrigation controller, either directly or indirectly as a separate unit in communication with the irrigation controller (e.g., through a physical hard-wired connection, a wireless connection or radio transmission) or as a component built into the irrigation controller, so that the controller may detect the occurrence of rainfall and suppress the irrigation schedule during the affected periods.

The particular effect of current or recent precipitation upon the irrigation schedule may be determined by the operator. For example, the operator may cause the present invention to suppress the irrigation schedule if precipitation occurred within the previous twenty-four hours, or only if precipitation is occurring at the particular moment of irrigation. It is to be appreciated that a precipitation sensor (switch or precipitation measuring device) may periodically or constantly provide a signal or input to the controller or module that is read, processed and used in determining the water budget ratio that will be applied to the irrigation schedule, and that the mere presence of such a signal alone is not sufficient to terminate any irrigation cycle. The precipitation sensor may be a rain switch or rain sensor that measures actual rainfall. In some embodiments, the signal may only be provided once, or at periodic intervals, during which the controller reads and stores the data from the signal. Then, at a later time (such as just before an irrigation cycle is scheduled to commence), the controller processes the previously read and stored data to determine whether to shorten or skip the irrigation cycle. It is to be appreciated that at the time this processing is done, the signal may no longer be present.

In other embodiments, the previously disclosed controller or module housed inside a PVC pipe may be alternately mounted inside a valve box. A number of manufacturers offer valve box controllers in residential or commercial applications. These controllers are virtually all battery powered, as described by this inventor's U.S. Pat. No. 6,335,855 entitled "Battery powered programmable remote switch controller."

Temperature budgeting could be incorporated into these controllers which can be programmed directly by removing the valve box cover and inputting the irrigation program by means of data entry switches, or by downloading the program by using a portable programming unit which is then plugged into to the valve box controller. These valve box controllers can also be programmed by a wireless hand held programmer. These controllers would incorporate the same geo-environmental (non ET based) data as previously described (summer average high temperature and latitude or zip code) which can be obtained from the PRISM model and calculate the water budget ratio with the daily high temperature data from a wired or wireless temperature sensor. In this and other embodiments, a central temperature sensor or other regional broadcast of temperature could be used to provide the temperature and rain information to a large number of valve box controllers over a wide area with common latitude and average high temperature.

In cases where a central broadcasting temperature/rain sensor system is not available or feasible, or it is not practical to mount a temperature sensor near the valve box above the ground, an alternative approach provides the battery powered valve box controller with its zip code or other local geographic information, which determines the STBF. With the PRISM data, it is feasible to provide the valve box controller with its daily or periodic historical RA and average temperatures, providing the means for an approximate WBR calculation. While this is not a real time WBR calculation, it is an improvement over no periodic water budget adjustment, therefore saving the labor of frequent water budget adjustments during the course of the year, resulting in some water conservation.

In other embodiments of the present invention, the controller or module (AC or DC, solar, inside valve box, etc.) does not itself calculate the WBR. A centrally located processor with rain and temperature sensors is pre-programmed with the 5-digit zip code or other local geographic identification information, which determines the average summer high temperature and latitude for that and other environmentally similar zip codes. As noted previously, zip codes are preferred for use within the U.S. because of their simplicity. For worldwide applications where there are no zip codes, the summer average high temperature and latitude can be substituted. This apparatus can be called a CBM (Central Broadcast Module). While measuring the daily temperature and monitoring for rain with any one of a variety of commonly available rain switches, rain tipping buckets, or the like, embodiments of the centrally located processor calculate the WBR and transmit the WBR percentage to all controllers or modules within their range in a wired or wireless configuration. The CBM may or may not also transmit any weather sensor data to the remote controllers or modules. Typically, these embodiments forward only the calculated WBR by wired or wireless means, much like ET data is currently transmitted to irrigation controllers. However, in alternative embodiments, other data (e.g., temperature, wind, precipitation, and/or controller/module identification information) may also be transmitted. The basic water budget factor is the WBR=PTBF/STBF, as discussed previously. In a wireless configuration incorporating a rain switch or some other sensor, this equation can be further refined as follows: $WBR_M=STBR/PTBF \times ESF$ where $WBR_M$ is the modified water budget ratio (modified based on the additional sensor input), and ESF is the Environmental Sensor Factor, which can consist of a rain, wind, humidity, or solar sensor, or combinations thereof.

As an example, when the rain switch is closed (when it is not raining), ESF=1, not affecting the WBR. In the case of rain, this factor can be a small number (less than 1) decreasing the $WBR_M$ to a percentage at or near 0. The same method is used to restrict or eliminate irrigation during cold temperatures if the temperature is below a set point. In this embodiment, the WBR is calculated remotely outside the controller or module and transmitted to the controller(s) or module(s) within its hard-wired or wireless proximity. This embodiment is suitable for battery powered valve box controllers, commercial AC or DC powered controllers, or central control systems in larger projects such as parks, schools, golf courses, and large apartment complexes.

There are a number of advantages to this remote approach to transmitting the WBR using a CBM:
1. The individual controllers do not have to be programmed individually by zip codes. Even the current time and date can be transmitted to the remote field or slave controllers from the central processor.
2. There are no significant data storage requirements for the remote controllers. All the zip code information and look up tables are eliminated as this data is incorporated into the CBM. The remote controllers merely execute the water budget ratio prescribed by the central processor suitable for their local area.
3. This simplifies the modifications to the software in each of the remote controllers. Since most irrigation controllers already incorporate a method of changing the watering times by means of a manually-entered universal water budgeting software, it would be a simple conversion to automate this budgeting method with the temperature budgeting WBR approach.

In yet another embodiment that demonstrates the extensive flexibility of the temperature budgeting method of the present invention, a temperature budgeting module (TBM) may be provided between any existing irrigation controller's output and its cutoff switches (valves).

At this point, a distinction is made between the CBM (central broadcasting module) and the TBM (temperature budgeting module). In most embodiments, both the CBM and the TBM are capable of calculating a daily (or periodic) watering budget by comparing the historical average summer high temperature at that location and the daily high temperature readings and the time of the year. If additional sensors are provided, a $WBR_M$ may also be calculated. However, in some embodiments, the WBR (or $WBR_M$) is calculated by the CBM and broadcast to one or more TBMs (or controllers). Such TBMs (or controllers) in these instances do not have to perform the WBR (or $WBR_M$) calculation, and therefore do not require their own temperature (or other) sensors. These TBMs (or controllers) then modify their associated irrigation schedules according to the WBR (or $WBR_M$) received.

It is to be appreciated that the calculations provided by the present invention are frequently expressed as a water budget ratio (WBR). This is done to clarify that the resulting calculation is a percentage, or as commonly referred to in the industry as the "seasonal adjust" or the "water budget" feature, which is a ratio of two numbers, and to insure that the water budget is not misinterpreted as a volume of water (such as a number of gallons, cubic feet, or acre feet). In this invention, the terms "water budget" and "water budget ratio" and "seasonal adjust" may sometimes be interchanged, both meaning a percentage of the original set station run times or schedules, and not a budgeted volume of water.

It is to be appreciated that when the term "water budget" or "water budget ratio" are used, that they are not to be limited to any particular algorithm presented here, such as the temperature budgeting embodiments. Embodiments of the invention can automate the water budget feature using temperature budgeting, soil moisture data, or ET as represented by a resulting water budget bell curve particular to a certain zip code or location or region. Also, it is to be noted that the use or transmission of the WBR or WBP is a percentage (by definition) and not a transmission of ET. The temperature sensor, and optional rain, wind, humidity, solar and/or other sensors (used for $WBR_M$ calculations) may be hard wired to or incorporated integrally with the CBM microprocessor for the WBR or $WBR_M$ calculation, and the CBM then provides a percentage (water budget ratio—WBR or $WBR_M$) of summer irrigation to one or more irrigation controllers (or modules), by wired or wireless means. Each controller or module receiving the WBR or $WBR_M$ uses it to adjust the output durations, watering days, and/or watering intervals (watering schedules). These methods would normally require hardware and software changes within the controllers to accept and process the WBR or $WBR_M$. However, TBMs containing the appropriate programming may be installed with existing controllers to receive the WBR or $WBR_M$ from the CBM, and accomplish the modification of the controller's irrigation schedule(s) without having to make modifications to the controller. From programming viewpoint, using a TBM means that no user programming change is required in the controller.

A typical TBM requires no controller hardware, software, or programming changes in the existing controller, and is compatible with any new or existing 24 VAC output controller (about 90% of all controllers). With minimal adaptations, it is also compatible with DC controllers. It affects valve operation directly either at the outputs of an irrigation controller, as shown in FIG. 13, or at the valves in the field as shown in FIG. 13E and described below in example 4. A small inexpensive module is placed at each valve or set of valves, and can modify valve operating time without having to change or modify existing controllers. It is estimated that scores of millions of controllers are in current use and operating about 100 million valves in the U.S. The TBM embodiment allows every irrigation system valve and controller to be temperature budgeted without changing controllers, valves, or the wiring from the controller to the valves.

The TBM can be programmed with its zip code by any number of methods such as being pre-programmed at the factory based upon its sales destination, programmed upon receipt at the retail or wholesale location, or field programmed by means of a small display and/or adjusting switches. By way of example only, and without limiting the foregoing, one method of programming the zip code is with a dip switch labeled numerically from 0 to 9. If the zip code is, for example, 93711, the #9 dip switch is flipped on for one second and turned off, then the #3 dip switch turned on for one second and turned off, then the #7, then the #1, then #1 again. Or, five dip switches may be provided, with each switch being set to correspond to one of the digits of the 5-digit zip code. Using dip switches eliminates the need for a display or entry buttons, thereby reducing cost and size, and improving reliability. Other simple non-display data inputs are also contemplated in this embodiment. In some applications, a display may be preferred for visible ease of programming, particularly if a combination of smart technology is combined with time of use.

In a typical existing residential application, the homeowner may use an existing controller mounted in the garage. The user would normally already know the summer irrigation schedule based upon the original system design, or by experience. A temperature sensor with or without a rain switch is mounted outside the garage and the wires are routed to the TBM. The power to the TBM may be derived from the commonly existing 24 VAC transformer powering the existing controller, or the TBM may be self-battery powered. A typical residential irrigation system may have from 2 to 8 valves. The output from the controller to each valve is first wired to the input of the TBM (along with the wiring common). The output of the TBM is wired to the existing wires attached to the valves. Once these connections are made, the user programs the controller with its summer irrigation schedule during any time of the year and proceeds to operate the system as if it were summer. If no watering is desired at the time of the TBM setup, the common to the valves from the TBM could be disconnected so no actual irrigation occurs.

The homeowner may then activate the summer watering program by either programming an automatic start or performing a manually initiated semi-automatic cycle. The activated stations are each typically powered with 24 VAC, which is intercepted by the TBM. When the stations go off after the appropriate summer irrigation watering durations, the TBM microprocessor remembers the operating time of each station. Once every utilized station has been activated with its summer irrigation duration, the TBM stores that information within its memory. After this initial "training" or "learning" session, the common to the valves is reconnected for normal operation. The TBM uses the zip code information as discussed previously to calculate the STBF for that specific location. It then uses the temperature reading from its externally mounted temperature sensor to calculate its PTBF from which the WBR is calculated.

Each day, a new WBR is calculated by the TBM. Upon the next start of an irrigation cycle, as each station comes on, the TBM recognizes which station is activated from the output which is energized. Once the percentage of the summer schedule is reached, the TBM turns off the output prior to the end of its summer run time. The run time for each successive station is adjusted similarly. By this method, any existing controller, (residential or commercial) can be adapted to save irrigation water by adjustment of its output running time. Since it is recommended that deficit irrigation is preferred to over-irrigating, it is not likely that much more than 100% of summer irrigation would be required or necessary for the healthy growth of landscape vegetation.

An optional rain switch or sensor can be used to terminate the irrigation altogether with its signal to the TBM or the controller by means of a pre-determined reduced water budget percentage. An override method may also be supplied to the TBM which would allow manual operation of valves for maintenance purposes without disrupting the previously set irrigation time(s). This override can be in the form of a push-button or other switch which directs the TBM to ignore its WBR for that day or for some other suitable period of time.

No time of day or accounting for daylight saving time is required to be programmed within the TBM because it is only looking for a 24 VAC signal from the controller outputs. Only the date and month is needed for the WBR calculation, and these can be pre-set at the factory. It does not matter where within the U.S. the TBM is located since a time shift of a few hours does not affect the WBR calculation which is based on the day of the month. See FIG. 13 for a typical TBM installation. The signal from the temperature sensor to the TBM can be wired or wireless. The TBM itself is not an irrigation controller but a water budget calculator and proportional valve activator. See example 8 below for a discussion of a TBM mounted at a valve.

It is to be appreciated that in some embodiments, the temperature budgeting modules (TBMs) that are installed between existing controllers and their valves are capable of receiving the signal broadcast from a CBM. In these embodiments, instead of containing programming to calculate a WBR or $WBR_M$, these TBMs receive the WBR from a CBM, and then utilize the WBR in the same way as other TBMs described previously. These TBMs may be programmed to recognize that a broadcast of a reduced WBR (e.g., a WBR of 1% or less) means not to water on that day.

In an alternate method of modifying the irrigation schedule while using temperature budgeting, a threshold minimum water budget percentage level can be programmed into the controller, CBM, or TBM. For example, because of a non-porous soil condition, it may be preferred that deeper irrigation occurs to insure efficient watering into the vegetation root zone. Deeper watering generally requires a longer watering time. During colder months of the year, a certain day may have a temperature based calculated water budget of, for example, 12%. If the original summer run time was set for 8 minutes, the resulting irrigation would only be about 1 minute. In most cases, this is of little or no value to watering the plant root zone with low porosity soil. It may therefore be more efficient to both feeding the root zone and conserving water to set a minimum irrigation threshold of, for example, 60% of the summer station operating (run) time to allow for deep penetration. Accordingly, in these embodiments, the controller, TBM or CBM is programmed or instructed to accumulate the daily water budget percentages (e.g., the exemplary 12% daily budget above) until the 60% level is reached. The calculated water budget for each day is added until the threshold level is reached, which may result in a delay of four or five days before enabling irrigation. If the accumulation day falls upon a non-watering day in communities that have watering day restrictions, the budget is further accumulated until an allowed watering day is reached. (See FIG. 4A for the flow diagram illustrating this process.) In this manner, the same amount of the calculated watering need is supplied, but instead of watering for small percentages of time each day, deep watering occurs on an allowed day after a desired accumulation level is met, for more efficient irrigation, particularly in poorly porous soil conditions.

As mentioned previously, other embodiments combine the temperature budgeting smart water technology discussed above with the time of use method of restricting allowable watering days. The local community can choose to implement smart technology according to the present invention in numerous ways, including without limitation (i) incorporated within the controller to make it smart, (ii) added on as a TBM that can alter the outputs of any existing irrigation controller to make it smart, and/or (iii) as a CBM that communicates with one or a multitude of controllers or modules for selective or universal adjustments of remote controllers' station watering durations or watering schedules with the budget accumulation method, or by changing the watering intervals based upon the WBR.

In some fast growing communities, another significant water related issue is of great concern. Even if those communities have sufficient water supply, they may not have the pumping capacity or water delivery infrastructure to deliver that water. As a consequence, the delivered water pressure is inadequate for all water uses, including domestic and landscape needs. Those communities have adopted restrictions on landscape watering schedules such as even or odd watering days, meaning that even numbered homes may water on even days of the month, and odd numbered homes may water on odd days of the month. However, these types of watering restrictions are manually programmed into the controllers with no automation to maximize water conservation. Some other methods are to limit irrigation to certain days of the week or certain times of the day. Once again, these schedules may change during the course of the year, and no automation is provided for doing so. The result is that there is a low level of compliance to these restrictions. An automated means of municipally set watering restrictions can both be more convenient to the user (normally the homeowner), but also save more water and pumping energy, and decrease the delivery load. Decreasing the delivery load can also insure more consistent water pressure, thereby allowing for better irrigation efficiency, thereby further saving water and energy.

In larger commercial and municipal applications, central based irrigation systems are frequently used. Rain Bird® Maxicom2®, Rainmaster Evolution™, or the Toro Sentinel™ are examples of centrally controlled irrigation systems. Typically, a custom software package is loaded onto a dedicated computer at a central office and the irrigation schedules for a multitude of field (satellite) controllers are entered onto this central computer. A wireless signal (radio, satellite, pager, or the like) is transmitted to the field controllers directing them to operate the valves under their local control. Generally, all system operations can be controlled and/or monitored from the central computer. ET based data is commonly provided to those central systems by means of a local weather station or wireless ET data from an ET service provider. As an alternative to ET, embodiments of the present invention (e.g., a CBM) can provide the WBR or $WBR_M$ information to such a central computer which would then modify the irrigation schedules under its control, and periodically broadcast the updated irrigation schedules/programs to the field controllers as modified by the WBR or $WBR_M$. The CBM may be hard-wired to the computer through a USB port, RS232 input, or wirelessly provided to the PC with an interface receiver module.

In alternative embodiments, the necessary data and programming for computing the WBR may be incorporated into the central computer itself, and a communication link (wired or wireless) established to a local temperature sensor. In this way, the same central computer can receive the temperature information, calculate the WBR, and modify the irrigation schedules of the controllers under its control. If any of the optional environmental sensors (precipitation, wind, humidity, etc.) are used, the central computer may also use this information to calculate a $WBR_M$ and provide appropriate modified instructions to the controllers under its control.

With any of the herein described methods, all irrigation stand alone controller models incorporating the present invention would appear, install, and program virtually identically to their non-smart predecessor. This approach would have great advantages from a manufacturing and marketing standpoint for the manufacturers:

1. Front panel programming remains virtually identical to non-smart models.
2. Same plastic molds for enclosures and front panels and other parts the same.
3. No need to resubmit units in most cases for updated Underwriters Laboratories testing for safety.
4. Controller is the same size and shape and mounts interchangeably with previous unit, including its wiring.
5. Same programming means that manufacturer's salesmen, sales representatives, inside technical support, distributors, or contractors would not have to be retrained.
6. End users would already be familiar and comfortable with the new temperature budgeting smart models.
7. Temperature budgeted smart controllers would meet the California requirements for smart water technology by 2012.
8. Should meet the national EPA WaterSense labeling requirements.

9. Qualifies for smart controller rebates in areas where available.
10. Temperature budgeting has no monthly service fees.
11. Requires no expensive weather station.
12. Extremely cost effective to manufacture.
13. Simplest programming controller available.
14. If provided as a CBM, can provide wireless smart technology to a large number of irrigation controllers.
15. If manufactured as a Time of Use and Smart controller combination, provides various communities the choice of using one or both technologies within one enclosure within the controller, in TBM module, or as a centrally broadcast (CBM) water saving or infrastructure demand reducing means.

There may be applications where there is no convenient location for locating a temperature sensor and/or a precipitation sensor. One such example may be a street median where it is unsightly to mount a temperature sensor or precipitation sensor on a tall pole. In addition, the controller may not be equipped to receive a wireless signal from a CBM. It would be very convenient if such a field (outdoor) controller with temperature budgeting software be self-contained. There are several problems to be overcome in order to accomplish this self contained embodiment. The first is that the temperature sensor must not be exposed to vandalism. Secondly, placement of the temperature sensor must be such that it should obtain a reasonably accurate ambient temperature reading. Issues concerning the optional precipitation sensor are that it should also not be subject to vandalism, that it be exposed to precipitation, but not exposed to the irrigation sprinklers themselves for the purposes of obtaining a modified water budget ratio.

In most applications, mounting environmental sensors on a separate pole is undesirable, aesthetically unpleasing, impractical, costly, or prone to vandalism. Research and experiments have shown that mounting the temperature sensor at or near the ground inside a pedestal (metal or non-metallic), provides temperature readings that closely approximate the ambient temperature. This avoids "sun loading" effects in an enclosure such as a pedestal that can increase the temperature reading by as much as 30% during the summer and adversely affect the water budget calculations. In addition, it is possible to mount a precipitation sensor only slightly elevated above the controller enclosure, or entirely within the enclosure (See FIGS. 18A and 18B). These embodiments provide a completely self-contained (outdoor mounted) controller with smart water technology. A precipitation or other sensor(s) could be mounted securely and compactly on top of the pedestal in a sturdy metallic housing.

It is therefore an important objective of the present invention to provide simple methods, systems and apparatus for irrigation water conservation by providing automated water budgeting and/or automated time of use restrictions, alone or in combination with each other.

It is also an objective of the present invention to provide a variety of methods, systems and apparatus for irrigation water conservation that are naturally intuitive and that may be used in a variety of different configurations by people or entities in different circumstances.

It is another objective of the present invention to provide methods, systems and apparatus for conserving water by automatically adjusting irrigation schedules in response to varying climatic conditions.

It is another objective of the present invention to provide methods, systems and apparatus for conserving water by automatically adjusting irrigation schedules in accordance with pre-determined periodic percentages.

It is another objective of the present invention to provide methods, systems and apparatus for conserving water by automatically adjusting irrigation schedules in accordance with pre-determined periodic percentages together with time of use restrictions and/or current environmental data.

It is another objective of the present invention to provide methods, systems and apparatus that utilize greatly simplified local, real-time meteorological data to calculate and maintain the irrigation schedule.

It is another objective of the present invention to provide methods, systems and apparatus that minimize the margins and sources of error within the automatically and climatically adjusted irrigation schedules by limiting the number of variables and relationships necessary to calculate and maintain the schedules.

It is another objective of the present invention to provide methods, systems and apparatus that may be embodied into or used with any irrigation controller that is inexpensive to manufacture, install, operate and maintain.

It is another objective of the present invention to provide practical water conservation methods, systems and apparatus means that can potentially save more water than theoretical ET methods because of its comparative cost and simplicity.

It is another objective of the present invention to provide irrigation controllers that are capable of adjusting existing irrigation schedules according to the geographic location of the controller and a recent temperature reading, without using ET.

It is another objective of the present invention to provide add on modules that may be used in conjunction with irrigation controllers to adjust the controller's irrigation schedules according to the geographic location of the module and a recent temperature reading, without using ET.

It is another objective of the present invention to provide a central processor or system that calculates an adjustment to be made to irrigation schedules and provides that adjustment by wired or wireless means to receivers which use the adjustment to modify the irrigation schedules of the controllers they are associated with.

It is another objective of the present invention to provide both smart water technology and time of use technology within a controller, within a TBM, or within a CBM in communication with one or more controllers or modules, in order to offer communities alternative choices for the most effective means to address their particular water related problems.

It is another objective of the present invention to provide temperature budget smart water and/or time of use technology for use in central irrigation systems.

It is another objective of the present invention to provide methods, systems and apparatus for incorporating smart technology in the form of pre-calculated water budget percentage bell curves to controllers without the need for externally mounted environmental sensors.

It is another objective of the present invention to provide add-ons or plug-ins having a pre-calculated water budget percentage curve alone or combined with time of use watering restrictions.

It is another objective of the present invention to provide controllers with pre-calculated water budget percentage curves alone or combined with time of use watering restrictions.

It is another objective of the present invention to provide methods, systems and apparatus that use modules that are added onto existing controllers to implement water budgeting, smart water and/or time of use technology without requiring the replacement of such controllers.

Additional objects of the present invention shall be apparent from the detailed description and claims herein.

BRIEF DESCRIPTION OF THE DRAWINGS

FIG. 6 is a table of extra terrestrial radiation values at various latitudes.

FIG. 9A shows a third party testing report for an embodiment of the present invention (called Smart Clock) from the Center for Irrigation Technology conducted during May, 2007, based upon a test protocol developed in association with the Irrigation Association, the EPA, and various water purveyors and agencies.

FIG. 9B shows another third party testing report from the Center for Irrigation Technology for another embodiment of the present invention (called the Enercon Plus), a commercial controller mounted in an outdoor pedestal. This is a battery powered commercial controller.

FIG. 9C shows another third party testing report from the Center for Irrigation Technology for another embodiment of the present invention (called Universal Smart Module—USM).

FIG. 11A is a diagrammatic illustration of a Central Broadcast Module (CBM) with an optional rain switch mounted on the outside of a residential garage sending the WBR data to the controller in the garage.

FIG. 11B is a diagrammatic illustration of the CBM module of FIG. 11A mounted on a light, sign, telephone pole, or the like wirelessly communicating to one or more commercial or residential controllers, AC or DC powered.

FIG. 13B is a detailed view of the wiring of the TBM module of FIG. 13A.

FIG. 13C is a detailed view of the TBM of FIG. 13A.

FIG. 13D is a schematic diagram of a simplified TBM showing breaking the common

FIG. 21A illustrates a typical municipal watering restriction program.

FIG. 21B illustrates a typical time of use watering restriction program.

FIG. 28A illustrates an exemplary a computer screen for programming an embodiment of a module of the present invention using a computer, such as through a USB port or the like.

FIG. 28B is a block diagram on an embodiment of the present invention.

DETAILED DESCRIPTION

Figure 1:
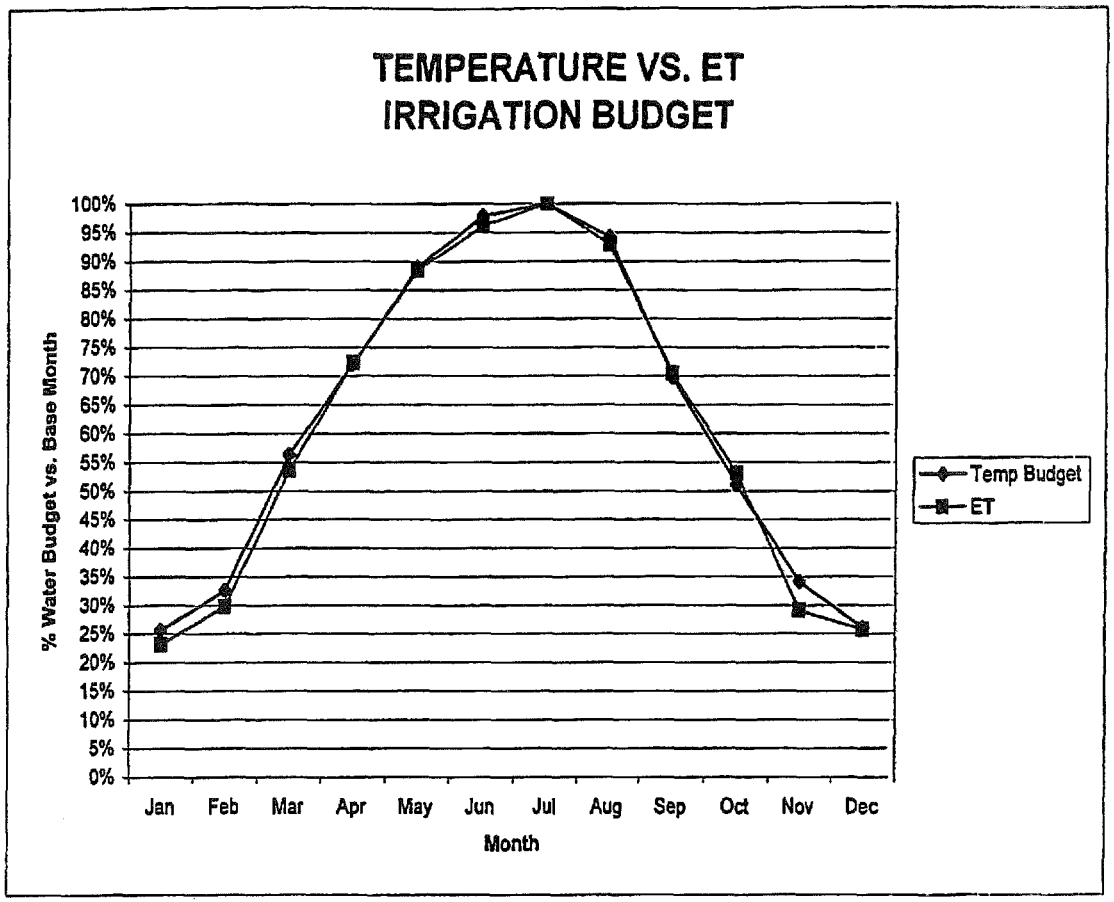
FIG. 1 is a comparison of evapotranspiration percentage values and water budget percentages based on temperatures from an analytical study for certain geographical areas of California over a five year period, beginning in 1997.

FIG. 1 compares the monthly percentage ET values obtained using the Penman-Monteith formula (currently favored by the USFAO and CIMIS) with the ratios (or percentages) obtained utilizing a formula of an embodiment described herein. Such comparison was made over a period of five years at twenty-five environmentally-diverse locations within the State of California. Both formulas used the same CIMIS data. The Pennman-Monteith formula based calculations of monthly ETo was divided by the historical summer (or baseline) ETo to obtain the percentage bell curve shown. The monthly temperature budget factors obtained using embodiments of the present invention were similarly divided by the summer temperature factor. The ETo ratio is then compared to the WBR for relative accuracy. As indicated by FIG. 1, the values obtained using formulas herein closely approximate the Penman-Monteith, generally more so than the other ET formulas as shown by Catteano and Upham. This indicates that the present invention is superior to the other ET formulas, since its simple to understand methods are ninety-five percent as accurate as the current accepted 'standard' and will save much more water than more complicated methods that are less accurate, and not as easily understood or utilized.

Furthermore, the present invention is advantageous over the Penman-Monteith, or any other ET formula, in that it achieves equivalent irrigation without relying upon the numerous variables and relationships of ET theory, or a subsequent calculation of irrigation time settings. Instead, embodiments of the present invention utilize only two variables—ambient temperature and the extraterrestrial radiation factor. Given this relative simplicity, and its intuitive approach, the present invention is much more likely to be adopted by the general public.

Another advantage of the present invention over the Penman-Monteith formula, or any other ET formula, is in terms of hardware costs. Specifically, in one alternative embodiment, only a temperature sensor is required—the existing irrigation controller, assuming that it satisfies certain minimum system requirements (such as the availability of an input port for the temperature sensor, sufficient memory to store the RA lookup table, and the ability to receive the software instructions for the present invention), may be used. This controller may be AC, DC, solar, or battery-powered. However, while temperature budgeting is preferred, water budgeting using ET are not precluded.

Figure 1A:
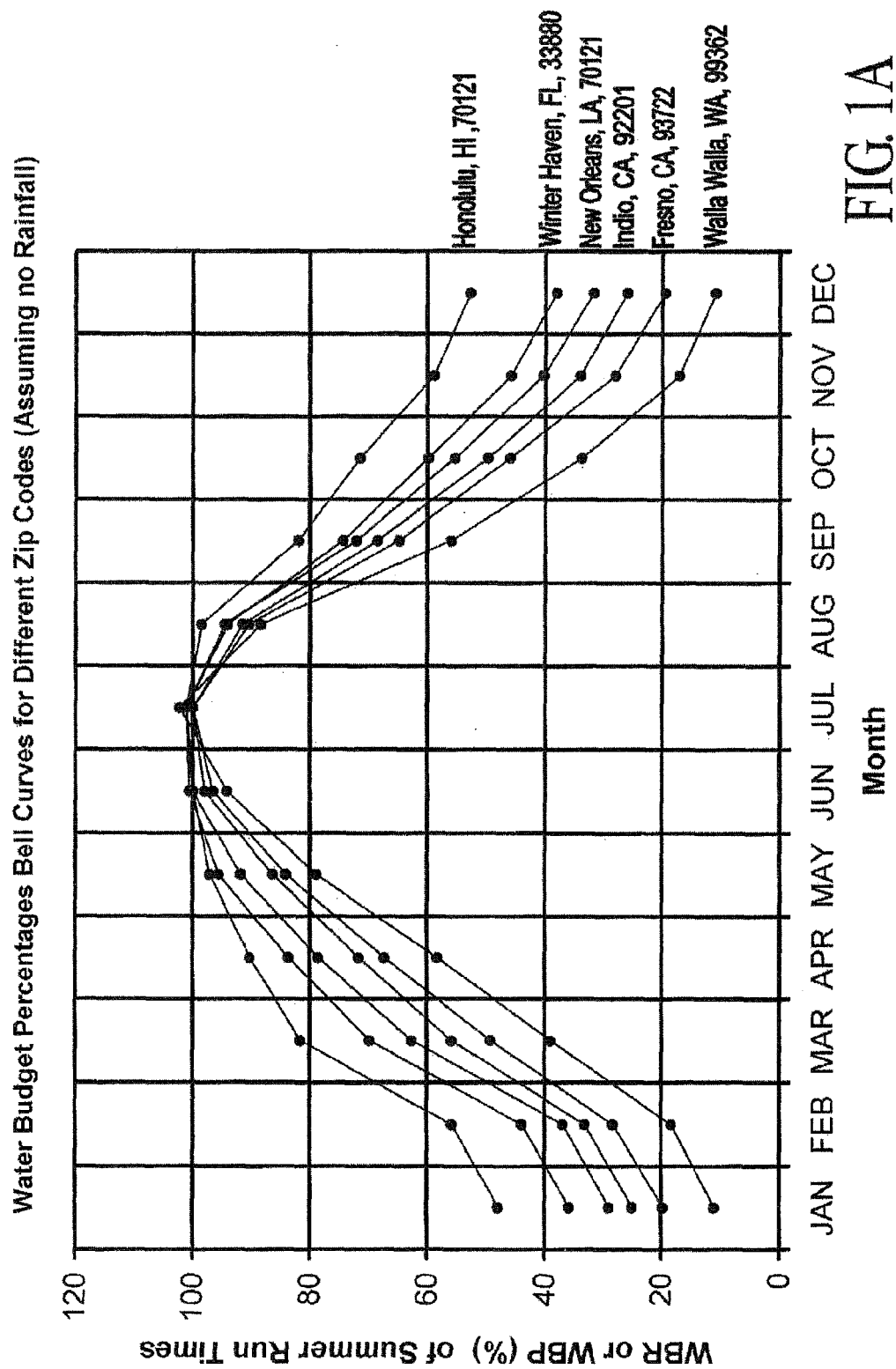
FIG. 1A shows a set of six different exemplary water budget percentage (WBP) annual bell curves associated with six different locations within the U.S.

FIG. 1A shows annual WBP bell curves for six different specific locations within the U.S. derived with a temperature based water budgeting algorithm of the present invention. From the analytical study of FIG. 1, it was determined that relative humidity and wind factors tend to cancel themselves over a period of time. The result is that the simpler temperature budgeting percentage curves are very close to ET based percentage curves. Hence, it is reasonable to assume that the various curves of FIG. 1A would be close to ET curves for their respective locations.

The bell curves at lower latitudes such as Winter Haven, Fla. (28 North latitude) or Honolulu, Hi. (21 North latitude) are flatter than those from higher latitudes such as Fresno or Walla Walla Wash. This is expected because the range of temperatures between summer and winter in Walla Walla, for example, is much greater than for Honolulu. Also, the RA factor changes throughout the year also tend to be smaller at lower latitudes, which are the main factors in temperature budgeting calculations. Specifically, we can see that the water budget percentage in Walla Walla is about 10% while in Honolulu it is about 54%. This means that if the accumulation method is used, irrigation would take place in Washington once every 10 days while it would irrigate about once every other day in Honolulu. This interval of irrigation would of course be affected by rainfall or extreme temperatures if those sensors, selected from a variety of sensors, are available to the system. Of course, in embodiments where environmental sensors are used, in the case of rain at either location, or cold temperatures in Walla Walla, irrigation would be further delayed or disabled. These additional environmental sensors would help further refine irrigation to conform more closely to daily conditions.

These water budget percentage bell curves could be used with controllers, add-on or plug-in modules, or with a central broadcasting module, or a central system. They can also be used with AC, DC, ambient light, or two wire control systems. The sensors could be hard wired or data provided by wireless means.

Figure 2:
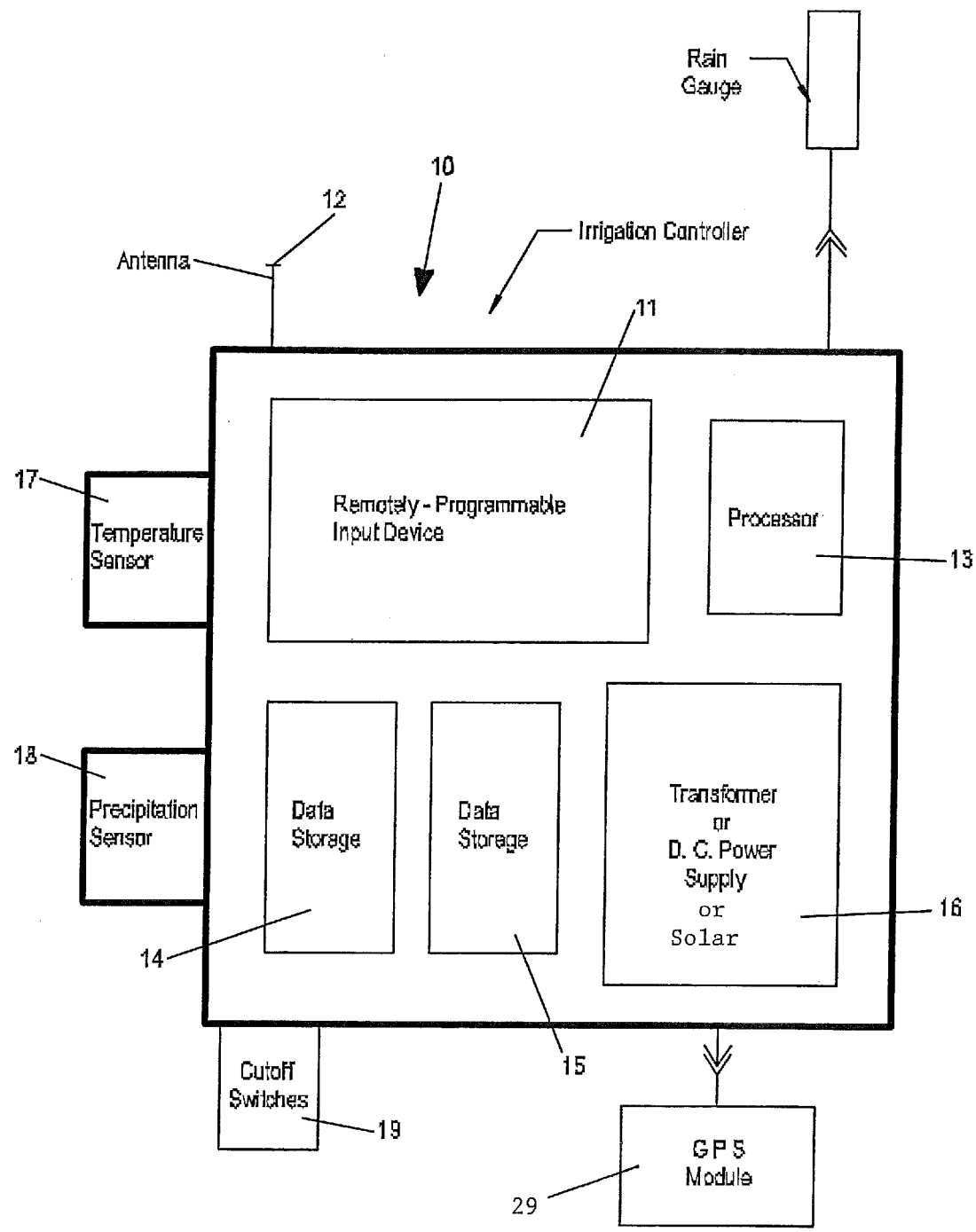
FIG. 2 is a block diagram of an irrigation controller embodying the present invention.

FIG. 2 depicts an irrigation controller 10 in one of the embodiments of the present invention. Such a controller comprises the following components: a remotely-programmable input device 11 for entering data into the controller; an optional antenna 12 for receiving data from the operator via wireless means; a microprocessor or microcontroller 13; a first data storage means 14, such as a hard drive, containing a zip code/latitude lookup table formatted in a conventional manner, an extraterrestrial radiation lookup table formatted in a conventional manner, and the formula of the present invention, all for computing and adjusting the irrigation schedule based upon the data received; a second data storage means 15, such as a hard drive, for storing and maintaining the irrigation schedule information and data received by the controller; a battery, solar panel, or AC power supply, such as a transformer, 16; a temperature sensor 17 built into the irrigation controller or externally mounted in communication with the controller; an optional precipitation sensor 18, also built into the irrigation controller or externally mounted in communication with the controller; and one or more cutoff switches 19 for controlling water output from the irrigation system. It is to be appreciated that the first and second storage devices 14 and 15 may be integrated into a single storage device, and that either this single storage device or either or both of storage devices 14, 15 may be made part of the processor 13—potentially eliminating the separate storage devices 14 and 15 altogether. An optional GPS (Global Positioning System) receiver 29 may also be attached to controller 10.

Figure 3:
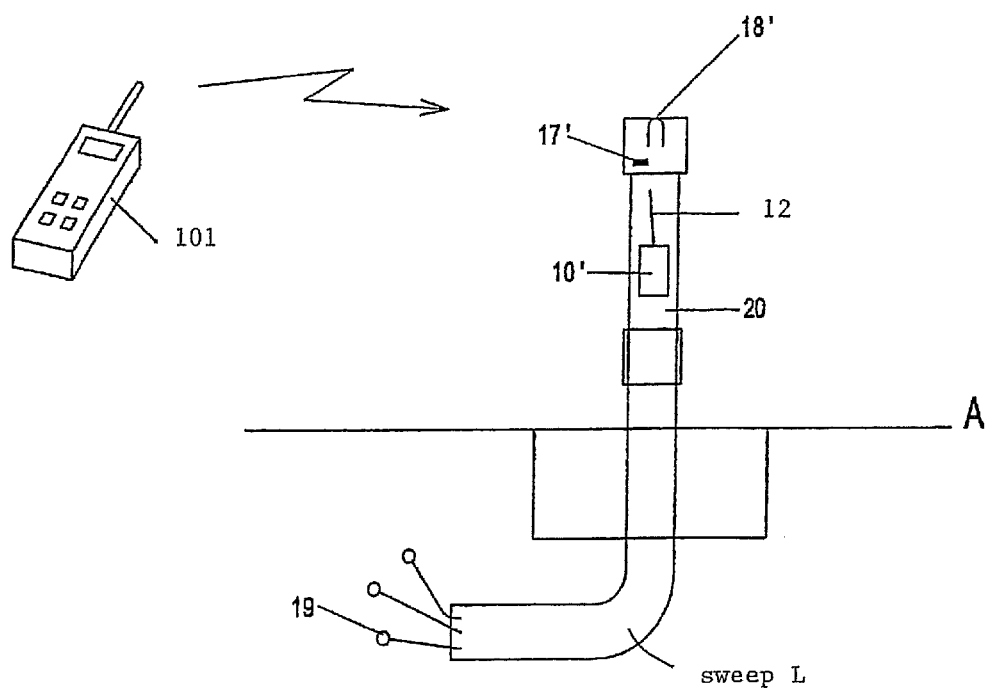
FIG. 3 is an environmental view of an alternative housing for the irrigation controller embodying the present invention.

FIG. 3 depicts an alternative housing for the irrigation controller 10' of the present invention. Here, it can be seen that the main body of the irrigation controller 10' (comprising the remotely-programmable input device 11, antenna 12, microprocessor or microcontroller 13, first 14 and second 15 data storage devices, and battery 16, none of which are depicted in this particular figure) is placed above ground level A. The temperature sensor 17' and optional precipitation sensor 18' may be incorporated with controller 10' and mounted, for example on top of the pipe as shown. Instead, these sensors are mounted above ground level A, and in communication with the irrigation controller 10' by wired means. The controller housing 20 (which may be a common PVC pipe) encloses and protects the controller 10' from the environment. The wires from the controller 10' to the cutoff switches (valves) 19 extend out of the housing 20 to the valves located in the field. It is to be understood that communications between sensors 17', 18' and the controller 10' may also be accomplished using wireless means by adding an antenna 21 to the sensors 17', 18' and the controller body 10', and placing the sensors in wireless communication with the irrigation controller 10'.

Figure 4:
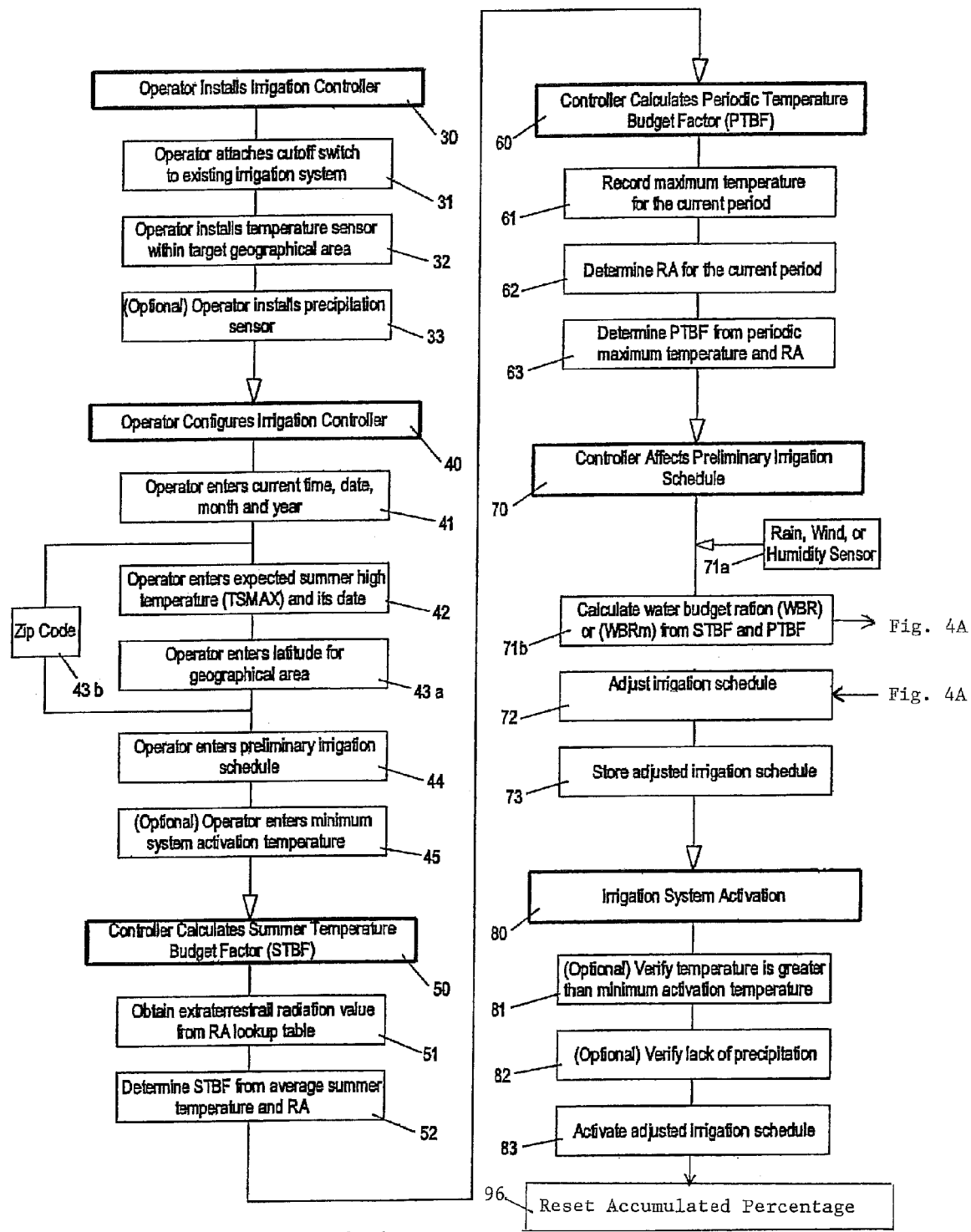
FIG. 4 is an exemplary flowchart depicting the complete and comprehensive steps of the present invention, including those steps performed manually by the operator.

FIG. 4 illustrates an exemplary method of the present invention when programming a temperature budgeting controller or TBM device comprising the following steps: first, the operator installs the irrigation controller or TBM device 10 (step 30) by attaching one or more cutoff switches 19 to an existing irrigation system (step 31) and installing temperature sensor 17 within the target geographical area (step 32). The optional precipitation sensor 18 or other sensors may also be installed within the target geographical area (step 33). These sensors are then placed in communication with the irrigation device 10.

The operator then configures the irrigation controller (step 40). In one embodiment, the operator enters the current time (e.g., time-of-day, and/or month, and/or day and/or year) (step 41). The operator also enters the expected maximum summer temperature ($T_{SMAX}$) and may enter the date of such temperature (step 42). The operator then provides the latitude for the geographical area (step 43a), if known. If the latitude is unknown, the operator may instead enter the zip code (step 43b) or some other geographical information (e.g., city, county, state, country, etc.) which the microprocessor or microcontroller 13 may use to obtain the latitude for the location from an appropriate internal lookup table. In the U.S., entering the zip code is more convenient. Outside the U.S., the user input may be made by means of a cellular telephone or pager. Alternatively, an optional GPS system could provide the controller location (zip code), and with that information the controller can automatically determine both the latitude and/or the average summer high temperature for the location. The operator also enters a preliminary (summer) irrigation schedule having one or more run times (step 44). The operator may also enter the minimum system activation temperature (step 45). All of this information may be stored within the first or second data storage means 14, 15, or in the processor itself.

In alternative embodiments, it is possible that little or no user input may be required. For example, in some embodiments, the processor may include an internal clock which already has the current date and time available, so no user input of this data may be required. In some embodiments, a default irrigation schedule may already be provided, so no user input of this information may be required. In some embodiments, a GPS system may be provided so that the user is not required to input any latitudinal information or zip code. Instead, the GPS system automatically determines the latitude and provides that information to the processor. In some embodiments, an internal table of average high temperatures according to general location may be provided, so no user input of this data may be required. It is to be appreciated that the scope of the invention includes any combination of user input and/or automatic determination of the following data items: (a) date/time, (b) irrigation schedule, (c) latitude or zip code, (d) expected high temperature and date.

In a basic example, instead of entering the local latitude and expected summer average high temperature, merely entering the zip code would perform this function.

The microprocessor or microcontroller 13 then calculates the standard temperature budget factor (STBF) using the $T_{SMAX}$ and extraterrestrial radiation (RAS) (step 50). The RAS value is obtained from the extraterrestrial radiation lookup table within one of the data storage means 14 or 15 (or processor itself) (step 51), based upon the latitude of the location and the estimated date of the expected maximum temperature. If the operator did not provide a particular date for the expected maximum summer temperature, an embodiment of the present invention will generate a RAs value by averaging the RA values for the summer months (which may be November-January in the Southern Hemisphere). The STBF is then determined using the following formula: (step 52)

$$STBF = T_{SMAX} \times RAS$$

Using a summer RA factor is preferred because it is relatively constant throughout the summer months (June, July, and August, in the northern hemisphere), and those are the months that would typically require the highest amounts of irrigation. However, it is to be understood that the present invention is not limited solely to those particular RA values, and that the RA for any month may be used. In particular, other embodiments of the invention may allow for use of an average high temperature over a period of time (e.g., annual, bi-annual, quarterly, monthly, weekly, etc.) from which a corresponding RAs value is determined and used in the formula. Another embodiment of the present invention would permit the operator to input a preliminary irrigation schedule and temperature for any time of the year, followed by the particular date such information is applicable. The date is then used by the device 10 to determine the applicable RA. Such value is likewise accurate when used with the ratio method of the present invention.

As the formula demonstrates, the maximum (standard) temperature ($T_{SMAX}$) and extraterrestrial radiation (RAS) are the only factors required by the present invention to determine STBF. The $T_{SMAX}$ directly affects the plants' water requirements. The RAS is important because evaporation is also affected by the angle at which the rays of the sun strike the Earth; such angles vary depending upon the latitude and the time of year.

The controller of these embodiments then calculates the periodic temperature budget factor (PTBF) (step 60). Using temperature sensor 17, the device 10 records the maximum temperature ($TP_{MAX}$) for a particular predefined period (step 61). These temperatures are recorded by temperature sensor 17 on a periodic basis (e.g., hourly, daily, etc.), and stored within one of the data storage devices 14, 15 (or processor itself) until the end of the period. At the end of the predefined period, the microprocessor or microcontroller 13 calculates the PTBF using the maximum temperature ($TP_{MAX}$) for the period, and the current/present extraterrestrial radiation (RA) for the same period. The RA factor can be obtained or extrapolated from the chart (based upon the particular day, week, or month, as provided by the time-keeping function of the CPU) (step 62). For a subsequent period, the recorded high temperature for the previous period is replaced with the latest measured high temperature. If this is done on a daily basis, the previous high temperature is replaced with highest temperature recorded during the past 24 hours. To conserve controller memory, the RA chart could be stored monthly in increments of two degrees of latitude, as depicted in FIG. 6. The microprocessor 13 could then determine the PTBF, as follows: (step 63)

$$PTBF = TP_{MAX} \times RAP$$

Once the PTBF is calculated, the microprocessor 13 may then affect the preliminary irrigation schedule (step 70), specifically by calculating the water budget ratio (WBR) as follows (step 71):

$$WBR = \frac{PTBF}{STBF}$$

A WBR value of one (1) indicates that the periodic TBF equals the summer TBF, in other words, that the irrigation needs for that particular period are satisfied by the initial summer-based irrigation schedule. Thus, no automated changes to the initial irrigation schedule would be needed for that particular period. A WBR value of greater than one would indicate that the PTBF was higher than the STBF, such that the irrigation needs for that particular period are greater than the irrigation needs for an average summer day. This would cause the controller to increase the irrigation schedule for the following period by a corresponding amount. A WBR value less than 1, which would be the case most of the time that is not during the summer, indicates that less irrigation is needed than the average summer day, causing a decrease in the irrigation schedule for the following period.

Figure 4A:
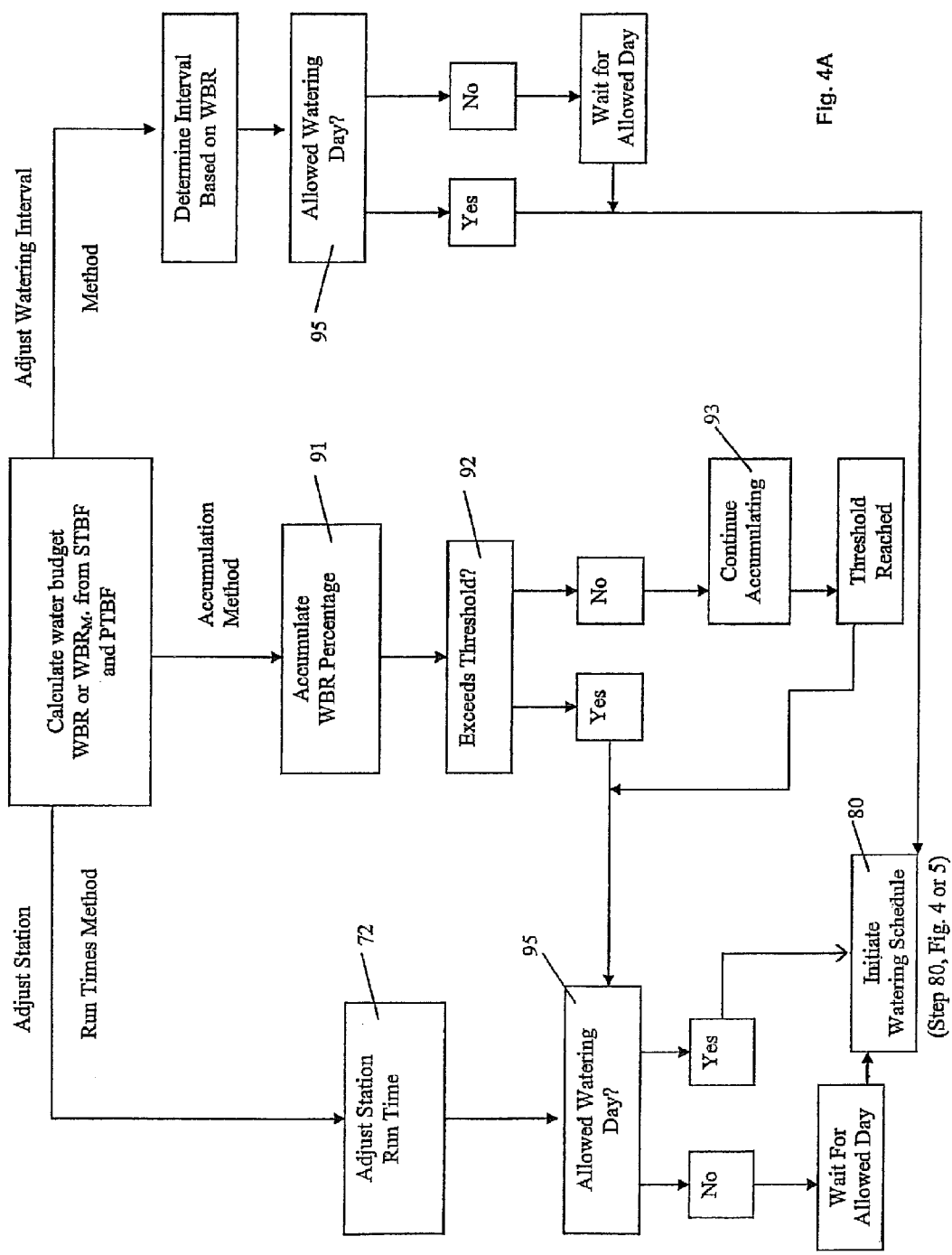
FIG. 4A is an exemplary flowchart depicting alternative implementations of a calculated water budget ratio (percentage, accumulation, and watering intervals).

If time of use (TOU) with accumulation of water budget percentages is used, or adjustment of station run times with time of use is used, the procedure starts with step 71b of FIG. 4, and proceeds as shown in FIG. 4A. Temperature budget adjusted station run times with TOU is illustrated on the left path of FIG. 4A. Here, the microprocessor or microcontroller 13 multiplies the preliminary irrigation schedule by the WBR value (step 72). This causes the irrigation schedule adjustment to be determined by the ratio of the two temperature and RA values, ensuring that the area does not receive too little or too much water. A check is then performed to determine whether watering is allowed on the current day (step 95). If not, no watering is performed. If so, watering takes place according to the adjusted irrigation schedule (step 80). This adjusted schedule is then stored upon the second data storage device 15, to be utilized for the following period (step 73).

If accumulation is used, processing continues as illustrated on the middle path of FIG. 4A. Here, the water percentage is added to any previously accumulated percentages (step 91), and compared to a pre-established threshold (step 92). If the accumulation meets or exceeds the threshold, then a check is performed to determine whether watering is allowed on the current day (step 95). If not, no watering is performed, and the accumulation carries over to the next day, and so on, until an allowed watering day arrives, whereupon watering takes place. In the interim, if there are consecutive non-watering days, additional percentages may accumulate for these days. When the watering eventually takes place, it will be according to the accumulated stored percentage, which is then reset to zero to start over (step 96). This allows for deeper watering according to the threshold established by the user on potentially fewer days. If the accumulation does not meet the threshold, then it is stored and carried over until the next day (step 93), and no watering occurs. When the next day arrives, the percentage for that day is then added to the accumulation, and so on, day after day, until the threshold is eventually met.

If the selected watering method is based upon adjusting watering intervals, the right path of FIG. 4A is followed. The calculated WBR determines the interval of days. For example, a WBR in the vicinity of 33% would change the watering interval to once every three days. A 50% WBR would result in watering every other day, and a 10% WBR would result in watering every 10 days—unless optional sensors are used indicating that it is raining, too cold, too windy, etc., in which case watering may be suspended (see Step 80 below). A check is then performed on the watering interval day to determine if it is an allowed watering day (step 95). If not, the irrigation is postponed until an allowed watering day arrives. Following irrigation, the interval is reset according to an updated WBR.

When the irrigation schedule calls for watering to take place (step 80), the irrigation device 10 may verify the temperature (step 81), using temperature sensor 17, and if provided, the precipitation, wind or other environmental sensors (step 82). If the current temperature is greater than the previously specified minimum system activation temperature, and there is no recent or current precipitation, wind or other prohibitive environmental factor (as previously defined by the operator), the device 10 activates the irrigation system (step 83) according to the adjusted/accumulated schedule. If either of those conditions fails (step 81 or 82), the irrigation system is not activated. This prevents activation of the irrigation system on very cold, rainy or windy days. Whether or not the irrigation system is activated, the device 10 also continues recording (step 61) the $TP_{MAX}$ values for subsequent PTBF calculation and schedule modification.

This method for adjusting the irrigation schedule may be used year-round, and at any geographic location. For example, the winter PTBF will typically be much lower than the STBF, resulting in a much lower WBR value. This in turn significantly decreases the irrigation duration, which is consistent with the average consumer's understanding that irrigation is not as necessary during the winter months. When the operator inputs a minimum temperature and/or utilizes the precipitation sensor, the present invention is able to significantly reduce or completely cease irrigation during unnecessary periods. In a typically wired installation from the temperature sensor and/or the rain sensor to the controller, the present invention is able to completely cease irrigation during unnecessary periods.

When optional rain, wind, or humidity sensors are used, their sensor input(s) can affect the WBR calculation (step 71a) by adding another factor to the WBR calculation: The modified WBR would be the $WBR_M = WBR \times ESF$ (External Sensor Factor). For example, if a rain switch is used, but insufficient rain has occurred to activate the rain switch or tipping rain bucket, the WBR would be unchanged: $WBR = WBR_M$ since an inactive rain or wind sensor ESF would be 1. If the rain is sufficient, or the wind exceeds a certain speed, etc., the ESF could be a very low number such as a 0.01 to effectively minimize, terminate, or inhibit the irrigation cycle.

Temperature budgeting can alter the irrigation schedule in one of at least three ways. First the summer station run times may be adjusted periodically during the year by the calculated WBR or $WBR_M$ (percentages). $WBR_M$ is the modified water budget obtained by using additional sensor data such as wind, solar radiation, wind, or rainfall, or combinations thereof. Second, an alternative method may be selected that accumulates the periodic water budget percentages to meet a minimum set watering threshold (a cumulative percentage). If the resulting threshold level falls upon a community mandated non-watering day, the periodic or daily temperature budgeted percentages continue to accumulate until an allowed watering day is reached. See FIGS. 4, 4A and 5 and example 5 for detailed sequences. A third method is to alter the interval of watering days by percentages. For example, a water budget percentage of 50% would cause irrigation every other day. A 30-35% budget would cause irrigation every third day, a 25% budget would cause watering every fourth day, and so on.

It is to be appreciated that the previous discussion of exemplary embodiments of the present invention is for illustrative purposes only, and is not meant to limit the claims herein, nor the numerous alternative embodiments that are also available. In particular, the same steps may be performed within a CBM device, or divided between performance by a combination of CBM and TBM devices.

Figure 5:
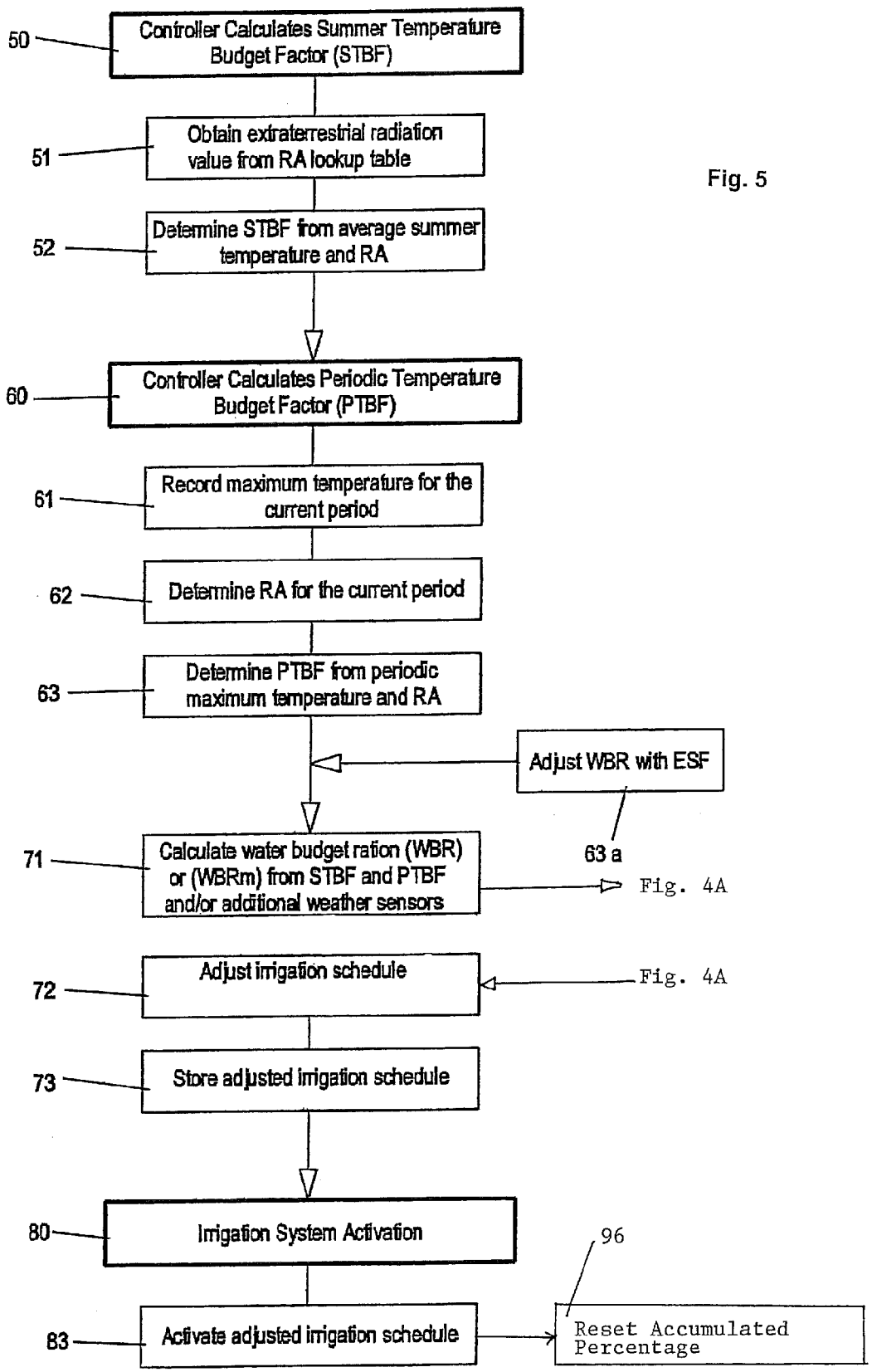
FIG. 5 is an exemplary flowchart depicting the basic steps of the present invention, particularly only those steps performed automatically by the controller embodying the present invention.

FIG. 5 depicts a portion of the method of the present invention performed by the controller, CBM or TBM device itself. From step 71b of FIG. 4, the sequence flows through FIG. 4A, then back to step 72 of FIG. 5. From this depiction, it is apparent that the present invention is able to automatically calculate and adjust the irrigation schedule in a simple manner, without resorting to the numerous and complex data and calculations found in the various ETo methods. Note that step 63a is an optional external input that can, under certain circumstances, affect the WBR with the ESF factor.

FIG. 6 is a published table of extra terrestrial radiation values at various latitudes. As indicated herein, this table is stored within the one of the data storage devices 14, 15 of an apparatus embodying the present invention, or within microprocessor or microcontroller 13.

Figure 7:
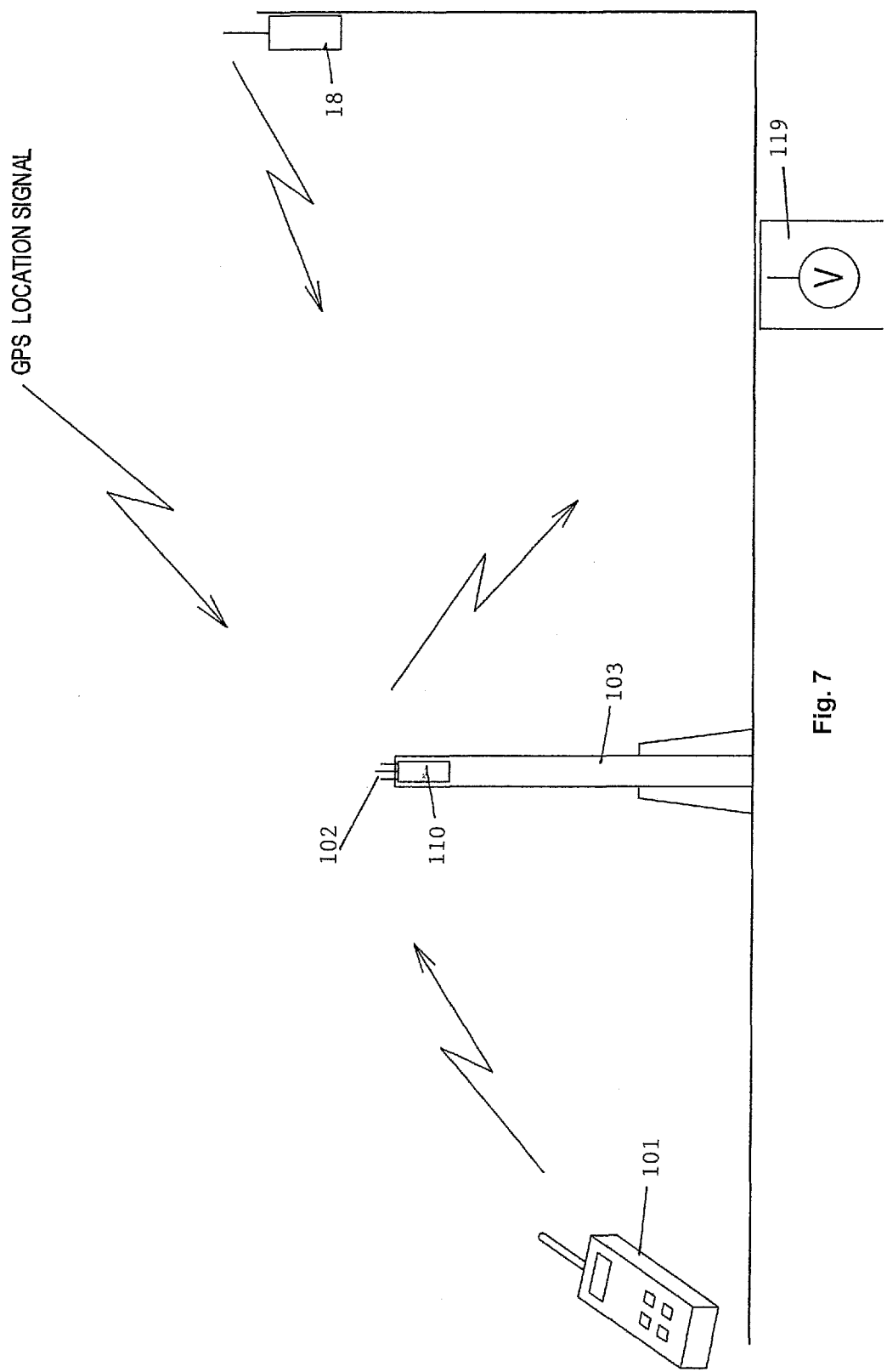
FIG. 7 is a diagram showing wireless programming, wireless rain and temperature sensor input, GPS input, and wireless control signal to valves remotely located from the controller.

FIG. 7 shows the block diagram for a wireless CBM embodiment. The programming is accomplished by means of a hand held or other remote unit 101. The controller 110 is mounted at a location such as on top of either a pipe or galvanized pole, on top of a decorative lamp post, on a wall or mounting post 103, inside a valve box, etc. The radio receiver antenna 112 is mounted adjacent to the controller. The rain switch 118 and temperature sensor 117 can either be mounted with the controller, or remotely located at a central point that can provide temperature and rain sensor data to a number of controllers in the area. The GPS data can be received by the same receiver in the controller to enable the controller to determine its zip code, thereby determining its average summer high temperature and latitude, which in turn determines the extraterrestrial radiation value for that location throughout the year. The valves 104 under control of the controller 110 receive wireless signals from the controller to turn cutoff switches 119 on or off.

Alternatively, temperature, rain and/or other sensors may be mounted remotely from the controller, and the WBR or modified WBR calculation performed at this remote location. The WBR is then transmitted by wired or wireless means to one or more controllers located within the wired or wireless range of the transmitter. If the WBR is calculated at the remote sensor(s) location, the controller(s) do not have to store or process the geo-environmental data, but merely receive this data and adjust their irrigation schedules based on this information. The remotely located apparatus that stores and processes the geo-environmental data, senses temperature and/or rain (or other environmental conditions), calculates the WBR, and transmits the WBR is referred to as a CBM (Central Broadcast Module).

Figure 8:
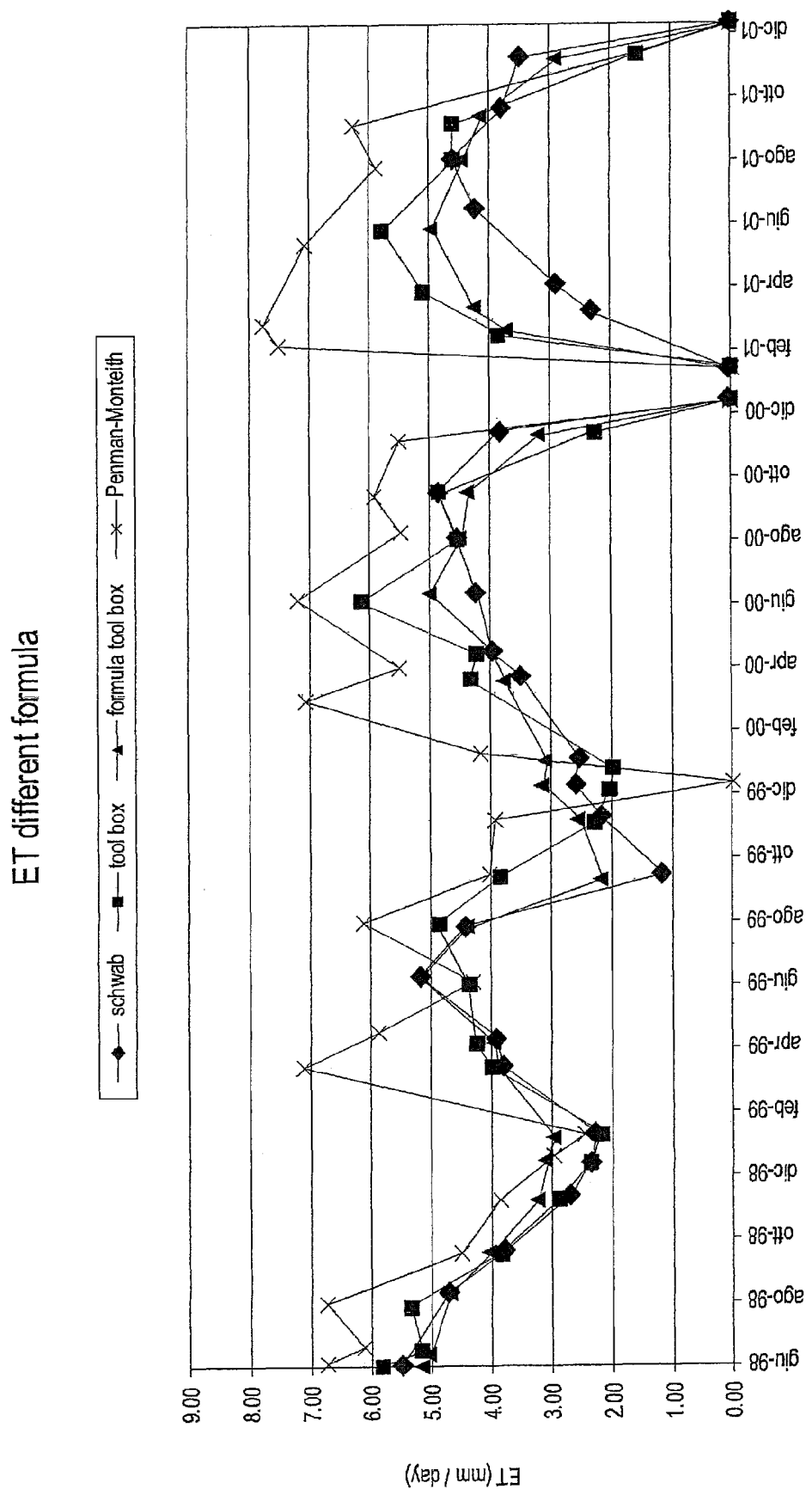
FIG. 8 is a chart comparing the theoretical ET calculations of four ET formulas as compiled by Cattaneo and Upham.

FIG. 8 shows the comparison of four different recognized ET formulas as compiled by Catteano and Upham—The Schwab, the tool box, the formula tool box, and the Pennman-Monteith. This comparison was done with the same data over a four year period from 1998 to 2001 and is depicted in 2 month increments. The difference is that each formula uses different meteorological parameters. As can be noted, the most recognized Pennman-Monteith formula varies by as much as 70% from the other three equations at certain times of the year, bringing into question which ET formula (if any) is correct.

FIGS. 9A-9B show the official posted Irrigation association SWAT test results from May 2007 for two different model embodiments of the present invention based upon the SWAT (Smart Water Application Technology) testing posted onto the Irrigation Association (IA) website. FIG. 9C is from a similar test completed in April 2010 of an add-on embodiment. The test results confirm the near congruence of the analytical study bell curves depicted in FIG. 1 herein of a temperature budgeting generated water budget or seasonal change percentage bell curve to the ET percentage bell curve based upon the same CIMIS data. The summary reports identify the key parameters of irrigation adequacy and scheduling efficiency expressed as irrigation excess. Irrigation adequacy is an indication that the vegetation is receiving adequate watering during the test period, and irrigation excess is the amount above that necessary for healthy plant growth. The results indicate 100% adequacy and an average excess of 0.2% for embodiments of the present invention for the Smart Clock. The Enercon Plus results show 100% adequacy and an average excess of 1%. FIG. 9C shows a 99.9% average adequacy and an average 2.2% excess for the Universal Smart Module embodiments, which are add-ons, well within the accepted range of performance. It is important to note that the results of these tests (two controllers and one add-on) all closely approximate the Pennman-Monteith based ET watering requirements using CIMIS data at the same location.

Figure 10B:
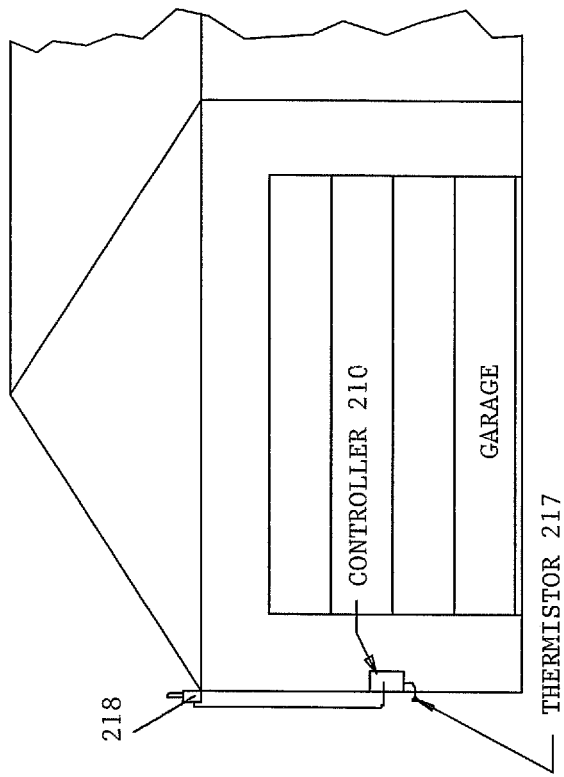
FIG. 10B is the embodiment of FIG. 10A with the optional rain switch wired to the same controller in the garage.
Figure 10A:
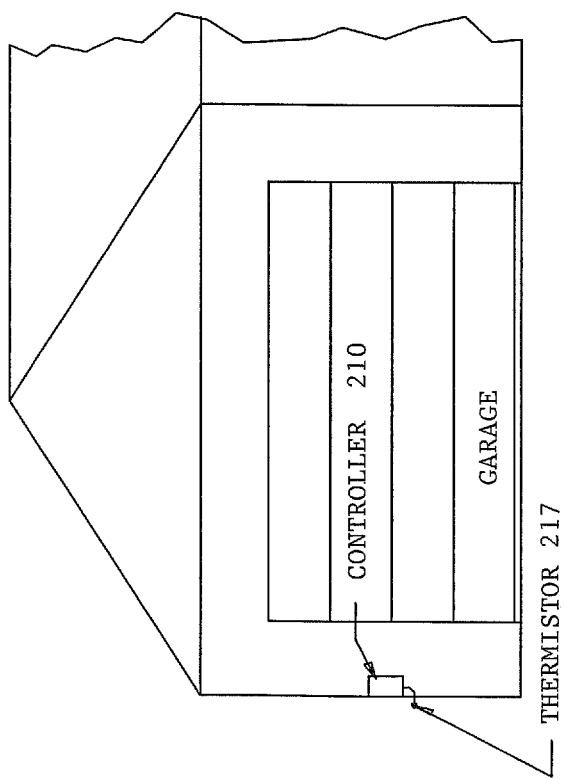
FIG. 10A is a diagrammatic illustration of a simple embodiment of the present invention including a temperature sensor (a thermistor bead, for example) mounted outside a garage hard wired to a controller inside the garage providing the controller with temperature data.

FIG. 10A illustrates a very simple embodiment of the present invention. An AC powered irrigation controller 210 is mounted inside a residential garage. A temperature sensor bead, which could be a simple thermistor 217, is mounted directly outside the garage wall where it can obtain a good ambient temperature reading. It could also be mounted at the eave of a garage away from sun loading effects of the garage wall. This temperature sensor directly communicates with the controller providing the controller with periodic or constant temperature readings from which the controller can calculate the WBR. In this simple embodiment, only an inexpensive temperature sensor with a two conductor cable is the hardware is needed. The AC controller software needs to be modified to accommodate the average summer high temperature and the extraterrestrial radiation values with which to calculate the WBR.

FIG. 10B illustrates the same general setup as shown in FIG. 10A, with the addition of an optional rain switch 218. While the rain switch is not an integral part of this invention, it is recommended for optimum water conservation. Other environmental sensors may also be implemented in these embodiments, as desired by the user.

FIG. 11A shows an embodiment of a CBM 150 with the optional rain switch or measuring sensor 118 with wired communication to a controller 110. In residential applications, the CBM would be typically mounted on the eave of a garage and hard wired to the controller inside the garage. The advantage of this method is that the controller software changes would be minimal to accommodate the WBR or $WBR_M$ data without the need for zip code or latitude or average summer high temperature data memory storage requirements. The CBM provides the information necessary to automate the manual water budget feature already present in most controllers. This version of the CBM typically only communicates with a single controller in a garage in residential applications.

FIG. 11B shows the CBM mounted in a convenient location where it has access to a good ambient temperature reading. The CBM would typically (but not necessarily) be battery powered with a transmitter and antenna in addition to a microprocessor or microcontroller with data storage and the ability to calculate the WBR. The WBR data is periodically transmitted (wired or wirelessly) to one or more controllers 110 and used to automatically adjust its water budget.

Figure 12:
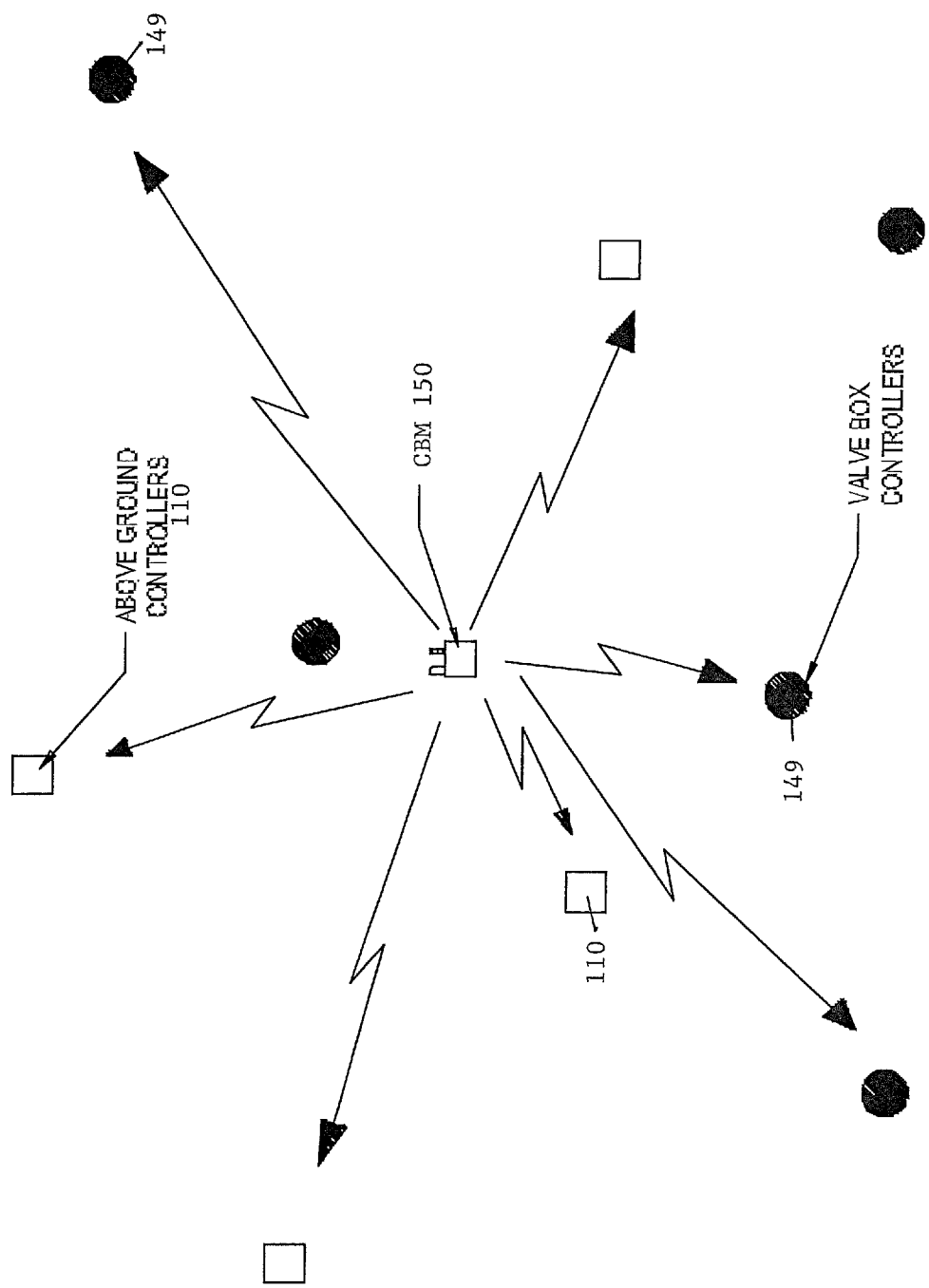
FIG. 12 illustrates a remotely located CBM that transmits the wireless or wired WBR or $WBR_M$ data to a number of remotely located receivers/controllers that can be AC or DC, solar, or ambient light powered.

FIG. 12 demonstrates a broader embodiment of the present invention. Here, a CBM 150 is mounted in a park, school, or apartment complex, for example at an elevated location such as a pole or on top of a building. It records ambient temperature and may also include a rain, wind, humidity, solar, or other sensors which are used to calculate a $WBR_M$ which can then be transmitted to a number of controllers or modules (TBMs) 110 remotely located within radio or other wireless communication range of the CBM 150. This method can be used to broadcast the WBR signal to battery powered valve box controllers 149, above ground battery or solar or ambient light powered controllers, or AC powered controllers. The CBM in this embodiment becomes the central control unit that provides the adjustment factor (WBR or $WBR_M$) for the watering duration times or schedules for the controllers or modules. No weather sensor data is directly wirelessly sent to the controllers or modules 110, 149. The CBM merely transmits a percentage (the water budget ratio—WBR) to the field remote or slave controllers. In a broad embodiment of FIG. 12, the CBM is located in a large area (parts of a city, for example) that adjusts the irrigation settings for many residential and/or commercial controllers or TBMs, and has the ability to turn off irrigation systems if the $WBR_M$ indicates a low percentage. It is to be appreciated that each of the controllers and/or modules 110 need not have their own temperature sensors, nor their own programming to calculate a WBR, but need simply have a means (wired or wireless) to receive the WBR or $WBR_M$ from the CBM.

Figure 13A:
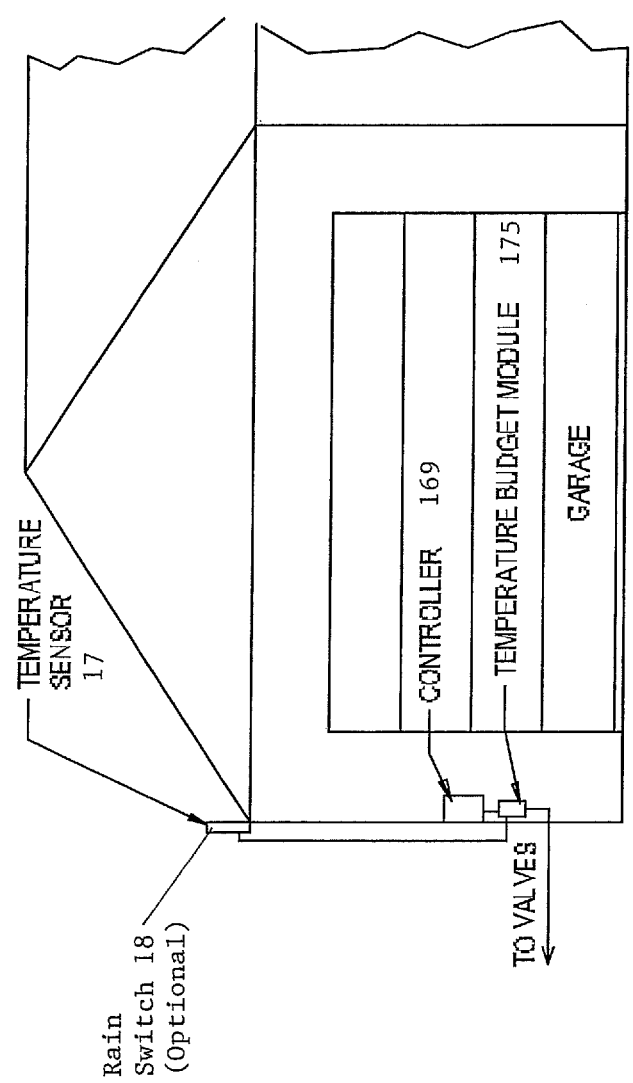
FIG. 13A is a diagrammatic illustration of a typical residential application with one embodiment of a TBM connected to an existing AC powered controller.

FIG. 13A shows an existing AC powered residential controller 169 inside a garage. The temperature and optional rain switches 17, 18 are mounted outside the garage on an eave, for example, and their signal wires come into the garage to a temperature budget module (TBM) 175 which is connected between the controller station outputs and the field wires leading to the switches or valves. Each controller station output is subjected to the WBR or $WBR_M$ produced by the TBM. The power to the cutoff switches or valves (e.g. 24V AC) is turned off when the WBR time is attained for each station. This method allows the use of any existing irrigation controller without the objectionable service fee normally required for ET based systems such as provided by AccuWater, ET Water Systems, HyroPoint's Weather TRAK, or Irrisoft's Weather Reach.

FIG. 13B shows detail of an embodiment of the TBM of FIG. 13A illustrating a typical setup of an AC controller with four station outputs and their common. The controller outputs are inputted to the TBM 175 where they are monitored by the TBM microprocessor. In this version, each output is independently enabled by the TBM and shut off when the WBR is reached, allowing multiple simultaneous valve operation.

FIG. 13C is a detailed view of an embodiment of the TBM of FIG. 13A or 13B showing exemplary programming dip switches and exemplary output LEDs which may indicate, for example, the on/off status of each valve.

FIG. 13D illustrates an alternative version of a TBM that may be used when only one valve is to be operated at a time. When the WBR is reached on a station, the common line is opened, discontinuing irrigation with that valve. This would, of course, also discontinue operation of any other valves if they were in operation. Upon the completion of the summer run time for this station, the common is closed, allowing the next station to operate until its calculated WBR is reached, at which time the common is again opened, and so on, with the rest of the outputs. This simplified method is not recommended where multiple programs are active because the opening of the common would interfere with other valves in operation. However, most residential controllers would normally have only one station active at a time due to their limited water supply and pressure. This simpler design costs less to manufacture and is easier to install. The optional rain switch would be placed in series with the module. In case of rain, all outputs could be further shortened, or disabled with the $WBR_M$ calculation.

Figure 13E:
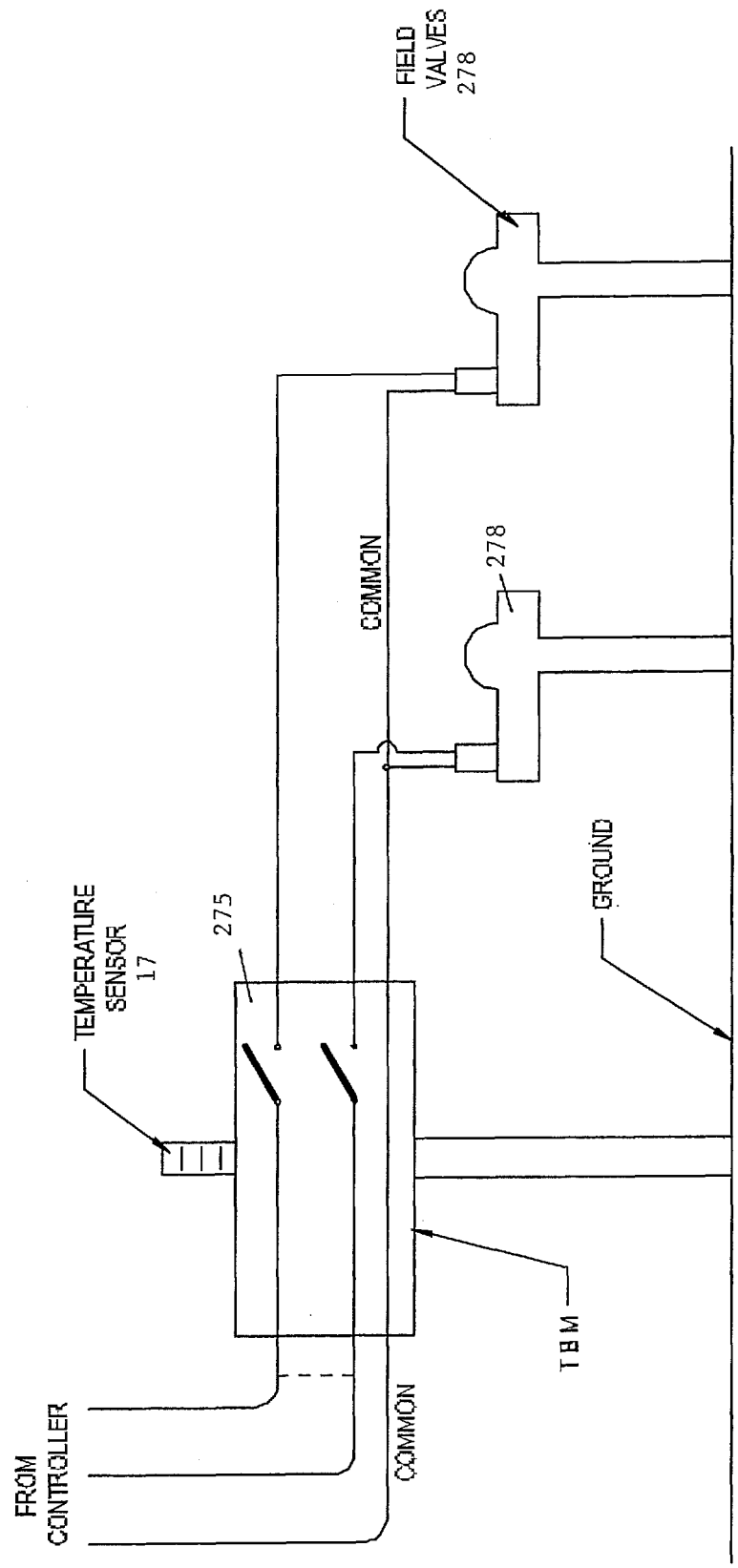
FIG. 13E is a schematic diagram of an exemplary TBM mounted between the controller and the valves with independent control of individual valves.

FIG. 13E shows an embodiment of a TBM 275 mounted remotely from a controller, at a valve 278 or a bank of valves (two valves are shown). In the preferred embodiment of such a valve-mounted TBM, the TBM is battery powered. Technology developed by this inventor allows a single 3.6 volt lithium battery to operate such a module for the life of the module (10 years) without need for replacement. The TBM may be pre-programmed with its local zip code based PRISM data providing it with its latitude and average summer high temperature. This allows the TBM to calculate its STBF. With its self-contained temperature sensor 17, and its periodic temperature readings, and its internal calendar (which determines the varying RA factor throughout the year), the PTBF is calculated. The module is therefore capable of calculating a daily WBR. Following a "training" or "learning" cycle described previously, upon the receipt of a 24 VAC valve output from the controller, the TBM determines when the WBR percentage of irrigation time is reached, and terminates the irrigation of that valve. Multiple valves can be independently budgeted in this manner.

Figure 14A:
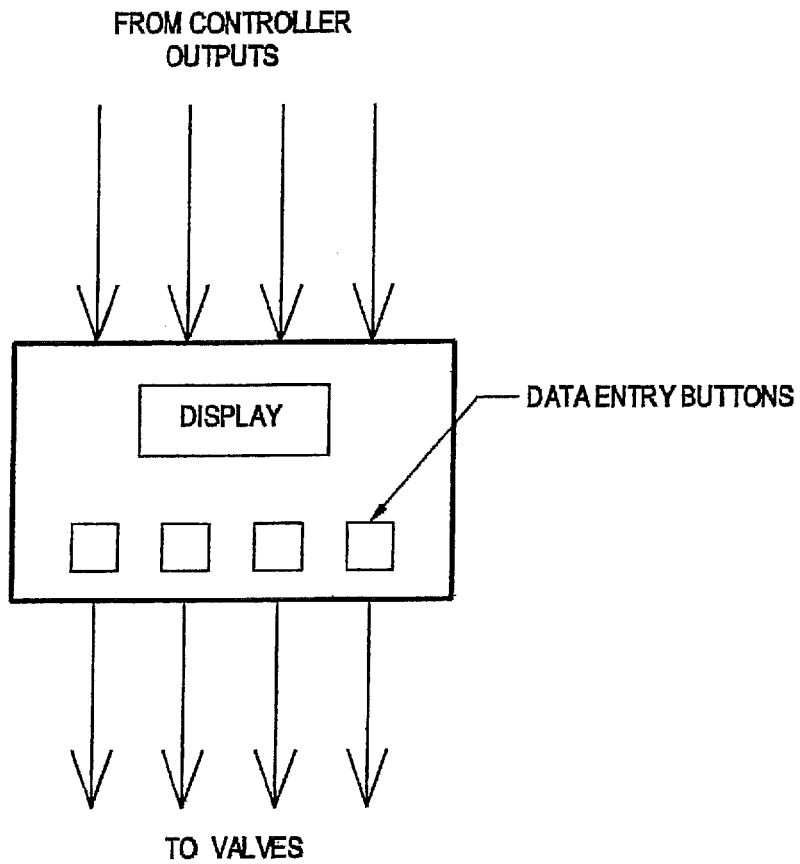
FIG. 14A illustrates an alternative embodiment of the present invention having display and data entry switches.
Figure 14B:
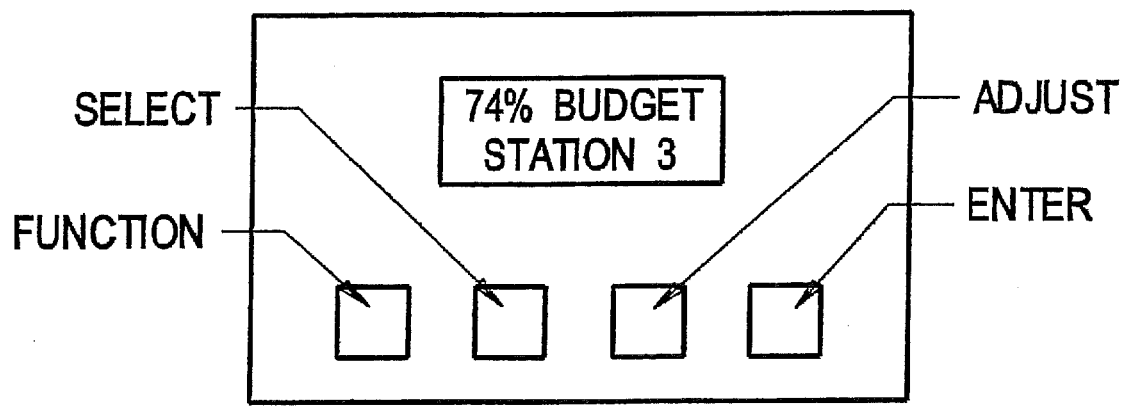
FIG. 14B illustrates an alternative embodiment of the present invention having display and data entry switches.

FIG. 14A illustrates an exemplary installation of a temperature budgeting module (TBM) on the wires leading from an existing controller to its valves. The TBM may be provided with its own temperature sensor, and be capable of calculating a WBR that is used to modify the outputs from the controller. Alternatively, the TBM may be provided with other environmental sensors in order to calculate a $WBR_M$. In other embodiments, such a TBM may not have any sensors, but will have a communication link (wired or wireless) to a CBM which provides the WBR or $WBR_M$ to the TBM. The WBR or $WBR_M$ is used to modify the outputs from the controller to the valves. FIGS. 14A and 14B also illustrate exemplary embodiments of displays and user input interface for the TBM.

Figure 15A:
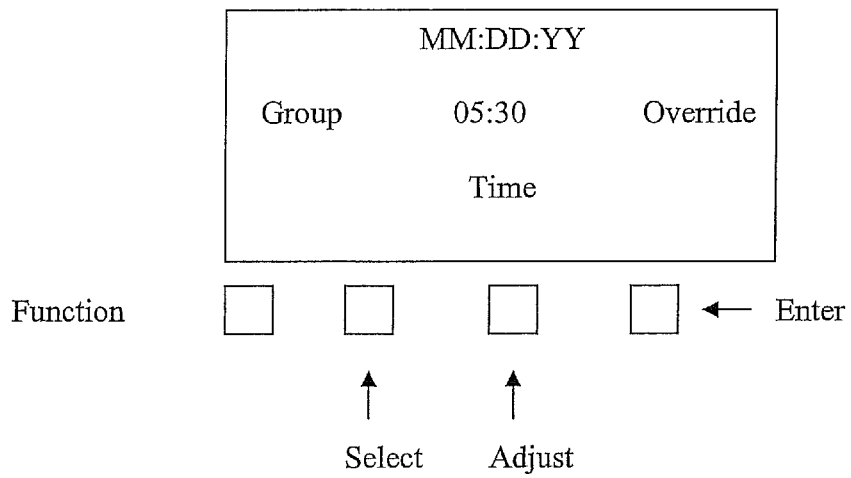
FIG. 15A illustrates an exemplary display on either a CBM, TBM, or controller for a basic time of use function either incorporated within a controller or in an external module.

FIG. 15A shows an exemplary display for a basic TOU module embodiment. The TOU system can also be incorporated directly into a controller to work with the smart water system selected by that manufacturer or model. The watering group is entered which can be an even or odd street address, or a watering group such as A-F as used by the SNWA, or the like. The display can be pre-programmed with the calendar (MM:DD:YY) which can account for daylight saving time and leap year. The time of day is also programmable. The local watering day limitations can be pre-programmed into the module by region of the country, or input if necessary. The exemplary module of FIG. 15A is programmed by means of data entry switches such as: Function, Select, Adjust, Enter, and/or other similar inputs. This data may also be provided wirelessly to the module or controller by means of a remote or hand held programmer, eliminating the data entry switches.

In some embodiments, an internal switch either allows irrigation to occur or disables it by cutting off the common electrical wire to the solenoid valves. In some embodiments, an override capability is provided for emergency use or for maintenance. Installation and programming of these embodiments is relatively simple. In residential applications, one or more screws hold the module in place on a surface such as the wall of a garage next to or near the irrigation controller. The existing common wire lead to the solenoid wires is disconnected from the controller output terminal and replaced by one of the wires from the TOU module (either wire if a relay is used). The second wire from the TOU module attaches to the common wire to the valves that was disconnected from the controller output. In this way, the TOU module is located on the common line and has the capacity to act as a switch to open or break this line. Basic programming includes entering the local designated watering group (i.e., local TOU restriction data), the time of day and date.

Figure 15B:
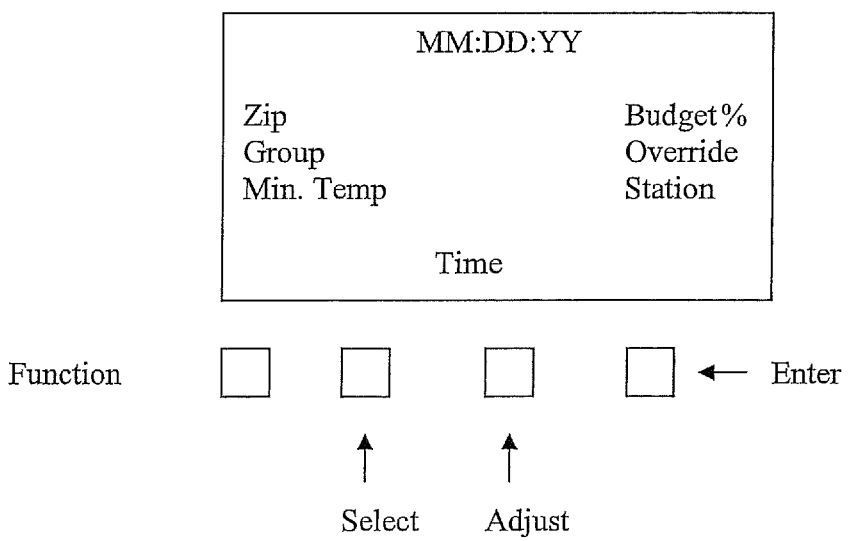
FIG. 15B illustrates an exemplary display for a combined module with time of use and basic smart technology incorporated either within a controller or in an external module.
Figure 15C:
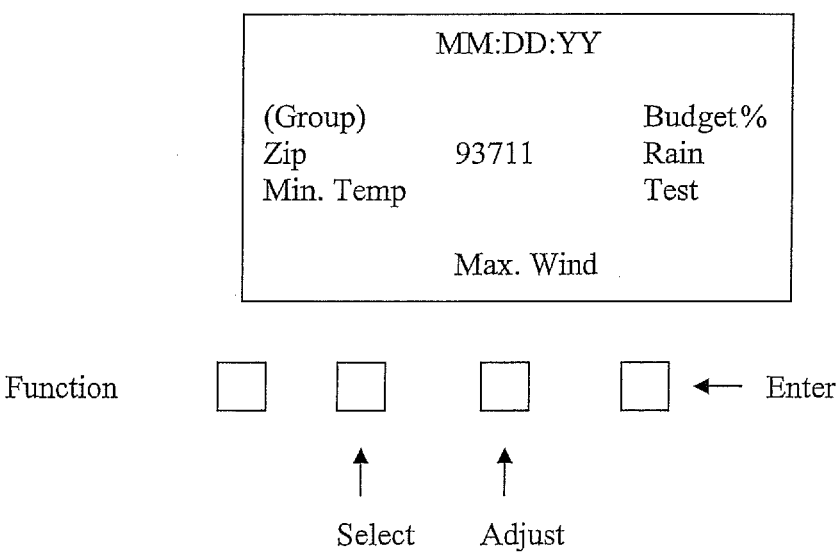
FIG. 15C illustrates an exemplary display for a more sophisticated time of use or smart controller combination incorporated either within a controller or in an external module.

FIG. 15B shows an exemplary display for TOU and/or smart water operation in either a controller or a TBM. If location information (such as a zip code) is entered and a temperature sensor is provided, at a minimum the unit can act as a smart module because the location information allows the unit to determine geo-environmental data (latitude and average summer high temperature) for that location. The attached temperature sensor provides current temperature data from which the WBR is calculated. If additional sensors are attached, such as a precipitation sensor, or wind sensor, a $WBR_M$ may be calculated as shown in FIG. 15C. In a TBM, the monitored station outputs are modified based upon the WBR. When used as a combination of TOU and smart module, in some embodiments, the daily WBR may be accumulated until a threshold is reached which would allow the next irrigation cycle to occur. If the threshold is reached on a non-watering day, the WBR is further accumulated until an allowed watering day is reached. On that day, the system is allowed to irrigate based upon the accumulated percentages. In alternative versions, the specific method of smart watering may be selected from modifying the station run time, to accumulating the water budget percentages until a pre-programmed threshold is reached, or altering the watering interval based upon a WBR percentage. For example, if the WBR percentage is 20%, watering occurs once every 5 days.

FIG. 15C shows the display of an exemplary CBM, TBM, or controller with combined temperature budgeting smart technology and time of use with additional optional inputs such as wind sensor input, rain sensor input, and minimum irrigation temperature input. The local zip code is shown in the display. Entering the zip code alone allows use of the smart technology alone. Entering the watering group alone allows use of the unit strictly as a time of use module or controller. Entering both indicates using the device both as a smart device and a time of use unit. The optional sensor inputs can further modify or interrupt the irrigation cycle.

Figure 16:
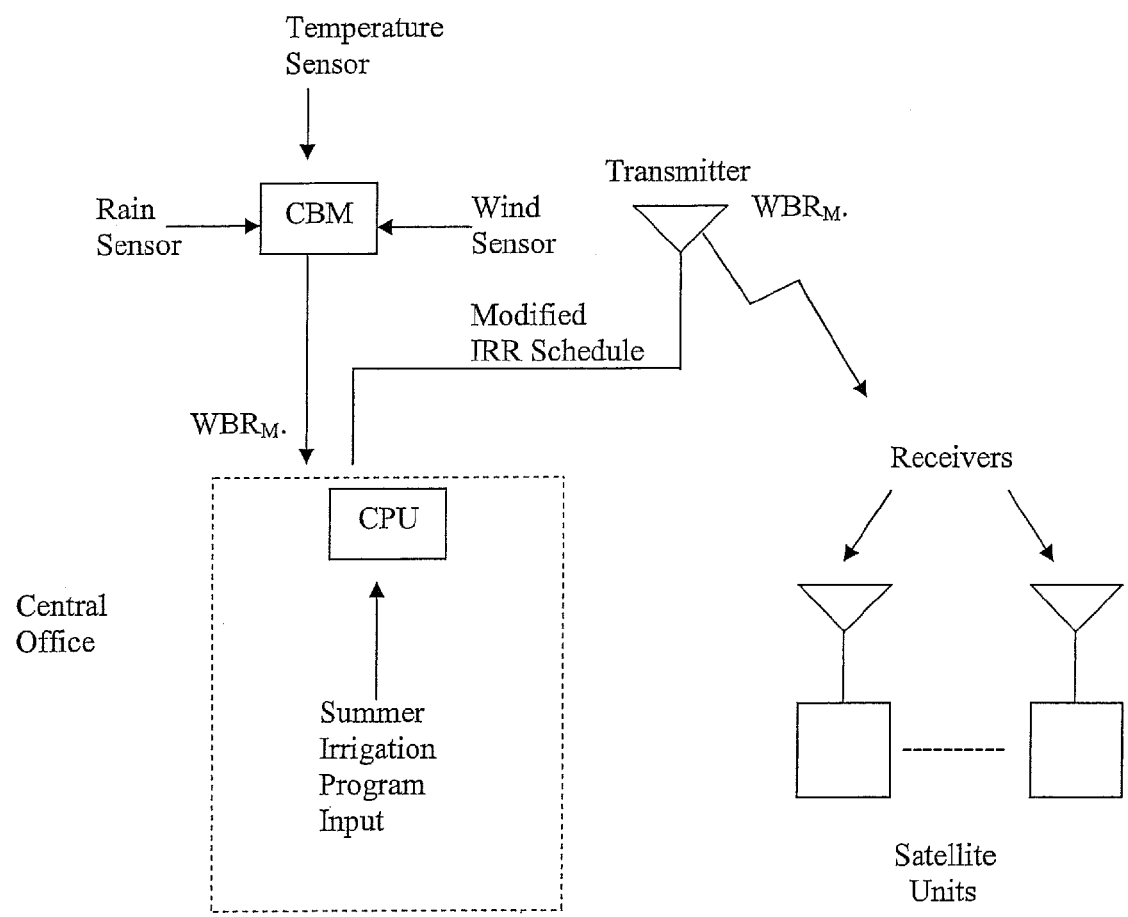
FIG. 16 illustrates an exemplary central irrigation system with water budgeting or modified water budgeting with sensor inputs broadcasting to a number of field or satellite controllers.

FIG. 16 shows an exemplary central irrigation system. A typical central municipal irrigation system may be located in an office. A common computer is loaded with an irrigation program that can be used to program or monitor a multitude of irrigation field or satellite controllers. These field controllers can be slave units or stand alone units that can operate as independent controllers. The custom irrigation software loaded into the CPU can program hundreds of satellite controllers. The information required to program each controller is inputted into the CPU such as assigning stations to programs, programming watering days for each program and start times, programming the station run times for each station, etc. Such systems may be adapted for use with the present invention. For example, a CBM can be located external to this office (e.g. on the roof or the like), with temperature and optionally other sensors exposed to the environment. The CBM is pre-programmed with location information (such as the zip code), or this information can be programmed from the office CPU, and provided and by wired or wireless means to the CBM. The CBM then calculates the WBR and provides this information to the CPU. The CPU irrigation schedules are modified by that WBR in any of the ways previously defined, and the modified information is broadcast to one or more of the satellite controllers. Thus a modified signal (according to the WBR) may be wirelessly transmitted to the satellite units. Each satellite unit can be addressed for individual control, addressed in groups, or universally addressed to provide a universal command to all field controllers such as during rainfall or high wind conditions or cold temperatures to curtail or shut down the system during these undesirable irrigation conditions.

Alternate methods allow for incorporating the temperature budgeting system into the CPU. Entering location information (such as the zip code) into the CPU provides the data needed for calculating the STBF. The externally mounted sensor(s) are connected directly t the CPU, and provide the temperature or other data used to calculate the PTBF, and then the WBR or $WBR_M$ within the CPU irrigation program. The temperature budgeted signal is then transmitted to the field controller units.

Figure 17:
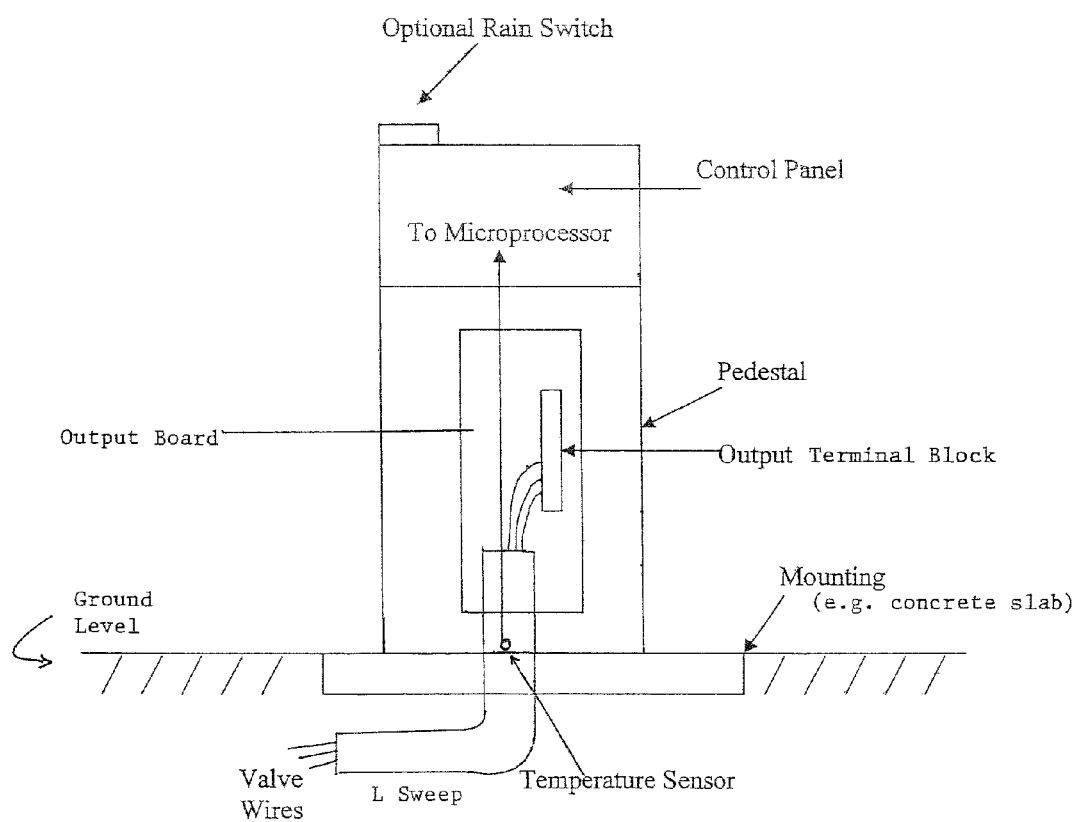
FIG. 17 illustrates an exemplary irrigation controller in a pedestal with an exemplary mounting of the temperature sensor within the pedestal and a rain switch mounted on top of the pedestal.

FIG. 17 shows an exemplary placement of a temperature sensor at or just below ground level. In this example, a 4-inch deep area is prepared on the ground and a sweep "L" normally made of PVC pipe brings the wiring to the valves to the controller output board terminals. The temperature sensor is dropped out of the control panel down inside the sweep L pipe to ground or just below ground level, providing some protection while also allowing exposure to the air. The temperature readings taken at this location will closely approximate ambient temperatures throughout the day and the year. An optional rain sensor or other sensors may be mounted, for example, on top of the pedestal exposed to precipitation in such a manner that they are both sturdy and limited in exposure to minimize the likelihood of vandalism. This embodiment allows for a WBR or $WBR_M$ to be calculated by the microprocessor or microcontroller within the device.

Figure 18A:
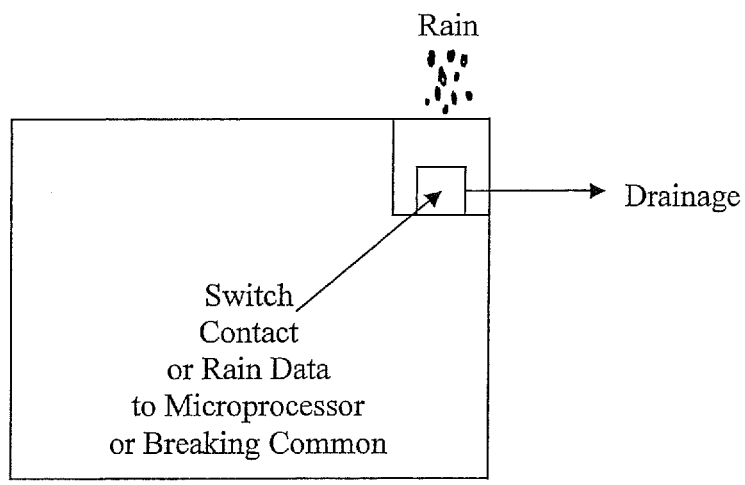
FIG. 18A shows detail of an exemplary rain switch or sensor mounted internally within an outdoor irrigation controller enclosure.

FIG. 18A shows detail of an exemplary precipitation sensor mounted within the enclosure of an irrigation controller. In this example, the switching compartment is completely within the enclosure, whether it is a pedestal or a standard outdoor enclosure mounted on an outdoor surface such as a wall or post. An opening at the top of the enclosure allows the precipitation to enter the sensor compartment. If hygroscopic material is used (such as that commonly used with rain switches), the precipitation soaks the hygroscopic material which causes it to expand. The top of the material is stopped by the screen on top of the enclosure. Upon pressing upon this solid upper surface, the material expands downwardly. A switch is mounted below the hygroscopic material. At some determined mechanical point of this expansion related to the amount of rainfall, the switch contact is activated to either open or close the contact. Such a signal may be used to either break the common output line, or transmitted directly to the controller microprocessor for modifying the water budget calculation as described elsewhere herein. The resulting modified water budget is used to alter the irrigation schedules as described elsewhere herein. Alternately, a precipitation sensor that can measure the actual rainfall may send rainfall amount data to the microprocessor which can then also modify the $WBR_M$, thereby altering the irrigation schedules. The internal compartment should be sealed or isolated from the control unit to protect it from the moisture. A drainage opening can be provided at the rear or the side of the controller to allow the excess water to drain. Perforations can also be provided at the side of the controller enclosure to allow the hygroscopic material to "breathe" so that it may dry out in a timely manner to allow resumption of irrigation.

Figure 18B:
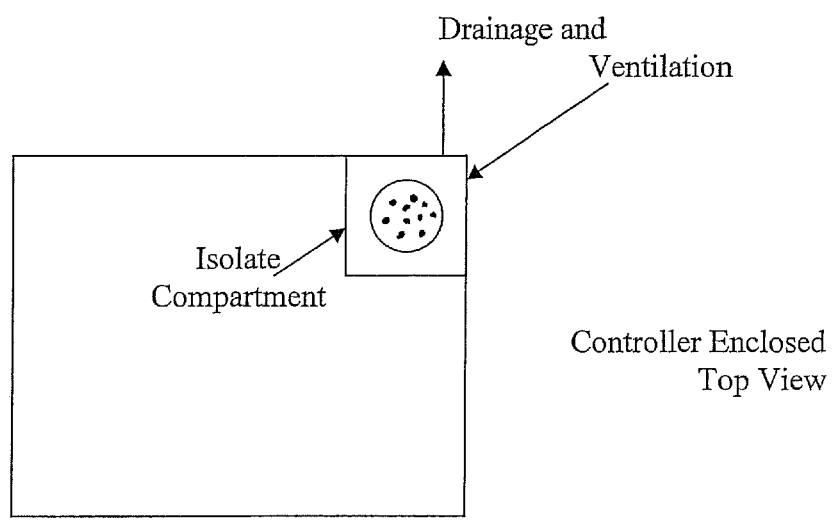
FIG. 18B is a top view of a rain switch or sensor enclosure of FIG. 18A.

FIG. 18B shows a top view of an exemplary controller with a precipitation access area, and side drainage and ventilation holes. One assembly method calls for manufacturing the enclosure with pre-drilled precipitation access on top of the enclosure. One or more of the sides may also be provided with ventilation and drainage holes. The switch or sensor is mounted within a small enclosure and mounted internally inside the controller case. It can be held in place with internal nuts and bolts and sealed with a gasket or "O" ring, or the like. The data wires from the rain switch/sensor in these embodiments are sealed and come out of the bottom or side of the small enclosure. The leads can go to the controller microprocessor for calculating the modified water budget, or if used conventionally, the switch contacts may be used to break the common line to the irrigation solenoid valves.

Figure 19A:
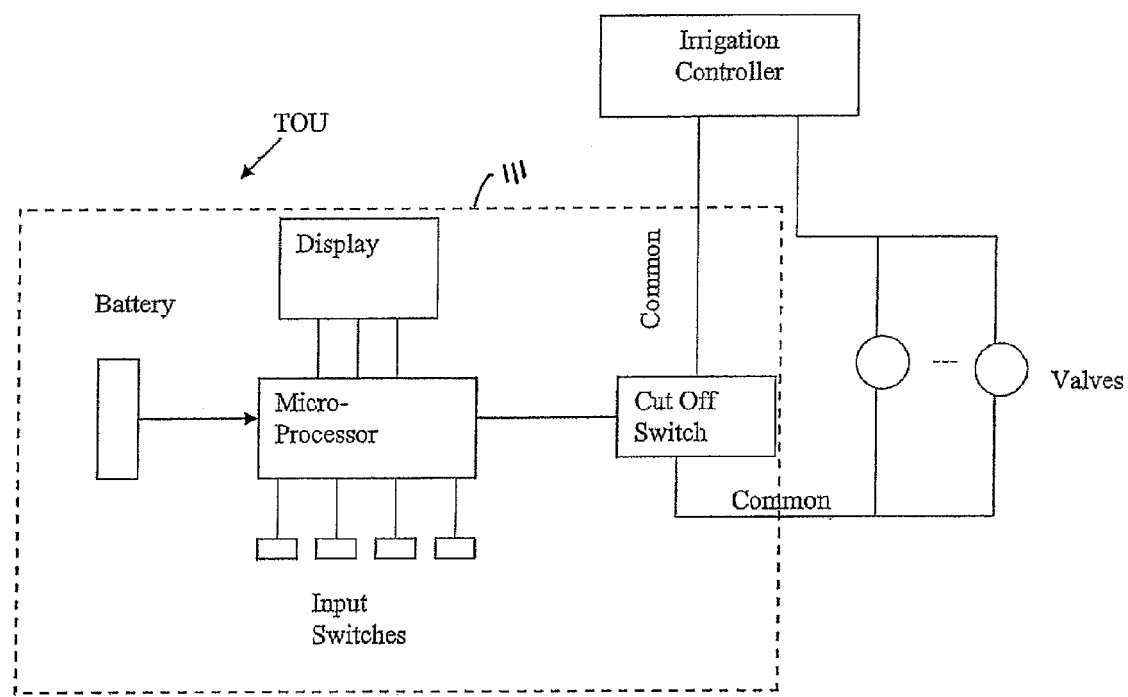
FIG. 19A illustrates TOU typically mounted and wired near an existing irrigation controller.
Figure 19B:
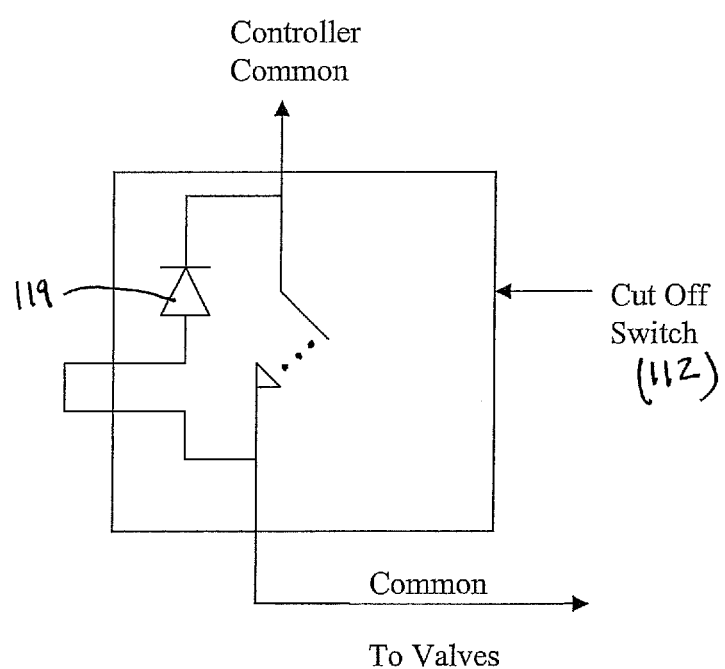
FIG. 19B is an exemplary illustration of how the cutoff switch of 19A might be modified to work with a battery powered controller. This cutoff switch configuration can also be used with a TBM or combination of TOU and TBM.

FIG. 19A is an exemplary time of use (TOU) module 111 that may be mounted near an existing irrigation controller. In this exemplary illustration, module 111 is self-powered with its own battery, but it could obtain its power from the nearby normally AC powered controller. Being self-powered has the advantages that it is electrically safe, does not require an electrician to install, and it is immune to power outages an surges because it is isolated from both the primary power and the secondary power. The module 111 is provided with any locally mandated restricted watering schedules stored within its microprocessor or microcontroller, and opens the cutoff switch 112 whenever irrigation is not to occur. The cutoff switch 112 may be a triac, a transistor, a relay, or the like. A relay is preferred for total isolation and its adaptability for DC powered controllers as shown in FIG. 19B. An override button or switch or programming capability allows for emergency valve operation or for routine maintenance to insure proper irrigation system operation.

FIG. 19B is a diagram of an exemplary cutoff switch (such as switch 112) that could be used in a battery powered controller, or in a TBM or a TOU module 111 operating with a battery powered controller. For example, if the SNWA restricted watering schedule shown in FIG. 21 is used, it does not allow irrigation during the summer between 11 AM and 7 PM. An AC powered controller provides continuous 24 VAC power to operate valves. When the cutoff switch opens with an AC system, the valve no longer receives power an the valve shuts off. In contrast, a battery powered controller provides a positive pulse to open a valve and a negative pulse to close it with no power between them. Without the diode circuit of FIG. 19B, a DC powered latching solenoid could not open or close when the switch is open. If a valve were to be on when the cutoff switch opens, it would have no way to close, resulting in a flooding situation and much wasted water. The diode 119 would allow an open valve to close and no other valve to open since it would be back-biased when a positive valve opening pulse arrives. When a closing negative pulse arrives to close a valve, the diode 119 becomes forward biased, allowing the valve to close.

Figure 19C:
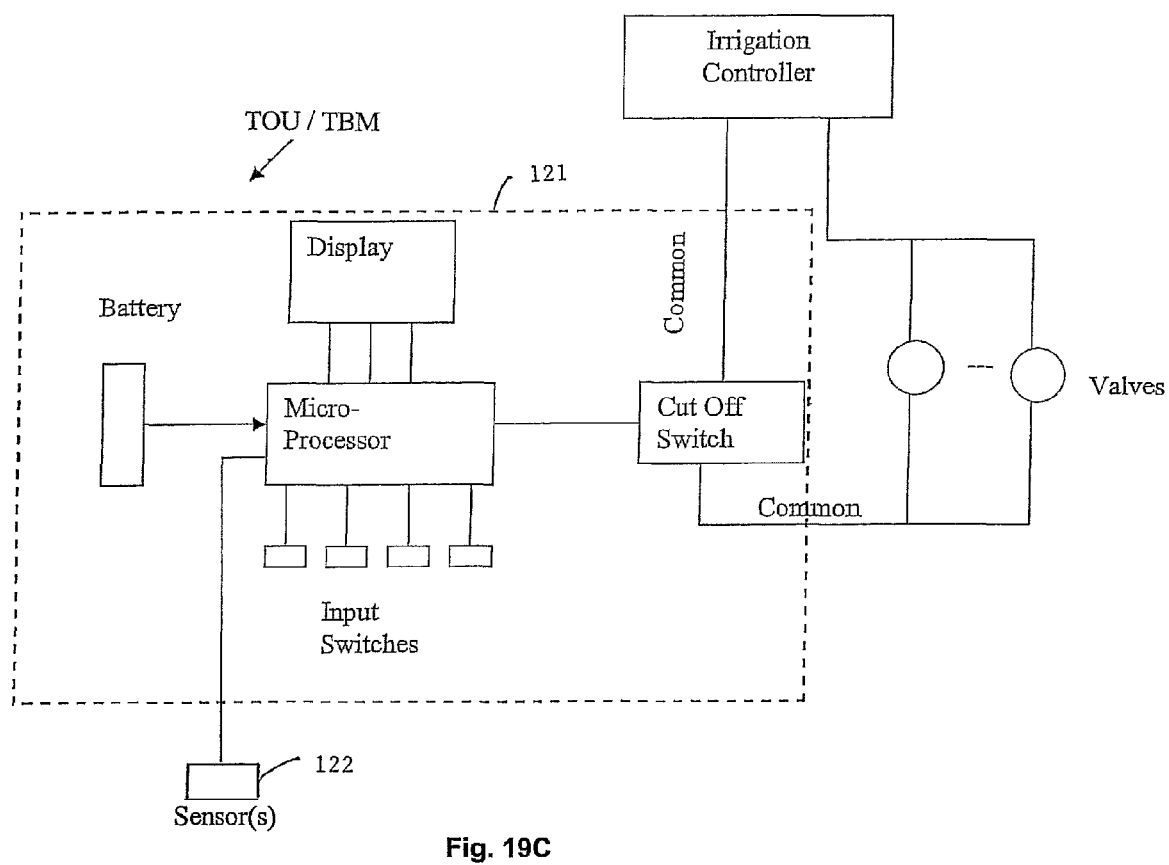
FIG. 19C illustrates an embodiment of a combination time of use (TOU) and temperature budgeting module (TBM) that may be mounted near an irrigation controller.

FIG. 19C is an embodiment of a combination time of use (TOU) and temperature budgeting module (TBM) 121 that may be mounted near an irrigation controller. It may be self-powered with its internal battery or its power may be supplied from the nearby normally AC powered irrigation controller. Module 121 may be supplied with one or more locally mandated watering schedules such as the SNWA schedule shown in FIG. 21. In addition, it may have programming to calculate the WBR using the temperature budgeting method with one or more environmental sensors, or one or more water percentage selectable percentage bell curves from which the WBP is extrapolated, or combinations of all three methods. Regardless of any of the three selectable modes of use, the installation and wiring is virtually identical as an add-on. The module is normally mounted near or within an existing controller and breaks the common line. If used in its temperature budgeting mode, the temperature sensor 122 can either be mounted externally, or if within a pedestal, mounted within the pedestal as shown in FIG. 17. If a rain sensor 122 is used, it can also be mounted internally in the pedestal mounted controller as shown in FIGS. 18A and 18B, or externally mounted exposed to precipitation. If mounted externally to the controller, the sensors, which are not limited to rain and temperature, may be wired or wireless.

The exemplary module of FIG. 19C therefore has three possible modes of use: as a TBM, TOU, or simply as a pre-programmed automatic water budget adjustment device suitable for year round operation. Depending upon its water availability and pumping and delivery conditions, the water district can then instruct the user to either comply with the local watering restrictions by entering their watering group, even or odd street address, or enter their zip code for temperature budgeting, or merely select their designated water budget percentage curve. In any case, the module and wiring are virtually identical. If used in its accumulated temperature budgeting mode, the module accumulates the periodic (preferably daily) water budget percentages until the threshold is reached and closes the cutoff switch within the module to allow irrigation. In any of the three versions, the controller is programmed with its summer irrigation schedule. Similarly in all three versions, a rain or other sensor may be used to interrupt irrigation by being either directly wired into the microprocessor as shown, or by breaking the common line in series with the module. The temperature sensor may be used to perform the WBR calculation, or merely as a low temperature cutoff. It too may be wired directly into the module microprocessor, or break the common line if it is a mechanical temperature sensor that opens a circuit when the ambient temperature falls below a certain point. Finally, a soil moisture sensor may also be used to either break the common line. Some soil moisture sensors are also mechanical switches, while some more sophisticated ones can provide data directly into the microprocessor to modify the operation of the cutoff switch.

Figure 20:
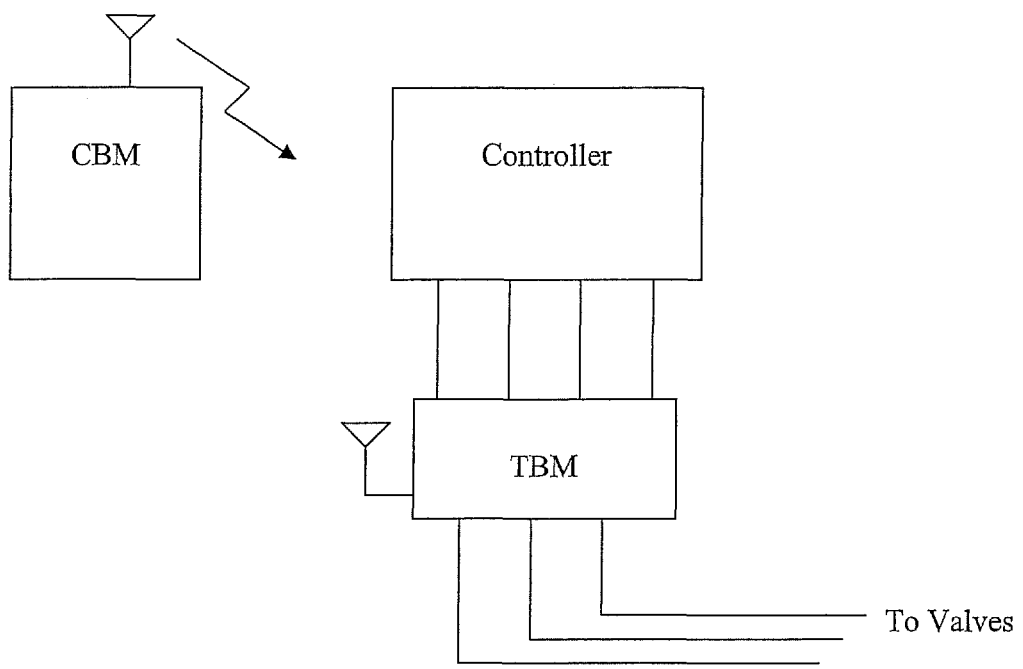
FIG. 20 shows a CBM wirelessly communicating with a TBM.

FIG. 20 shows an exemplary CBM wirelessly communicating with a TBM associated with a controller. In most embodiments, the CBM provides one or more TBMs with the WBR or $WBR_M$. The TBM in this embodiment requires no stored geo-environmental data or weather sensors, which simplify its installation and reduces its manufacturing cost. The CBM may communicate with one or more TBMs.

FIG. 21A is a reproduction of a recent SNWA "Drought Watering Restrictions" schedule for Clark County, Nev. It has divided the 500,000 residences and commercial areas into six watering groups A-E. All groups may water every day during the summer (May 1-end of August) but not from 11:00 am to 7:00 pm. In the spring and the fall, the different watering groups can water three times a week on their designated watering days at any time of the day. In the winter, each group can only water one day a week. It is inconvenient for most homeowners to manually change their watering schedules four times a year in addition to changing their controller settings. The TOU modules by themselves or in combination with temperature budgeting or any other smart technology can alleviate these responsibilities by including programming and data storage to receive such a watering schedule which would eliminate watering fines by complying with the local watering restrictions. Other communities or water districts may have different watering restrictions depending upon the local water availability and ability to pump and deliver that water which may be input into a TOU module.

FIG. 21B shows that from May 1-October 1, watering is prohibited from 11:00 am to 7:00 pm. FIG. 21B also shows that the user should manually adjust their controller on September 1, November 1, March 1, and May 1. A warning is also posted that watering outside the allowed watering times or assigned days may result in a water waste citation. The TOU embodiments of the present invention would automate those restrictions. Indications of 600 TOU units recently installed are that watering restrictions compliance has risen from 30% to nearly 100%.

Figure 22:
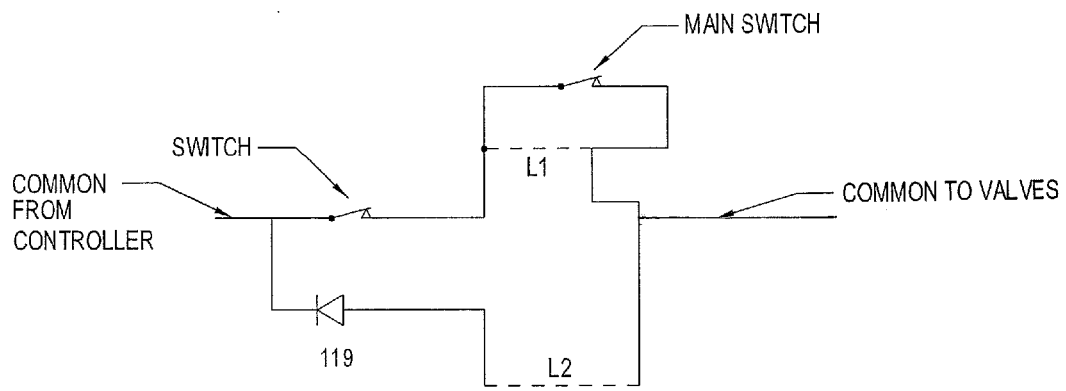
FIG. 22 is a block diagram of an embodiment of an add-on module accommodating a rain switch and its suitability for use with an AC or DC powered controller.

FIG. 22 shows an extension of FIG. 19B. FIG. 22 first shows an embodiment of the invention used with a DC controller by adding diode 119 to block the latching signal to the solenoid that turns on the valve but allows the valve latching solenoid to close because it can still receive the negative release signal. FIG. 22 also shows how a rain switch can be added to the module. One way is to provide a loop L1 out of the module that is left intact when no rain switch is used. When an external rain switch is used in the normally closed contact position as shown, the loop is cut and the two leads are connected to the rain switch leads. No polarity is required. An alternate way is to provide the rain switch signal directly to the microprocessor which can then determine the extent of irrigation shutdown time depending upon the rain switch contact, or the signal from a tipping bucket which can be substituted for the rain switch. The tipping bucket sends pulses to the microprocessor which can then determine the length of time that the module will not allow irrigation to occur. For an AC controller, a second wire loop L2 or some other connection extending out of the module is cut. By cutting L2, the AC signal out of the controller is not half wave rectified and the switch contact either allows irrigation or does not depending upon its contact positioning.

Figure 23:
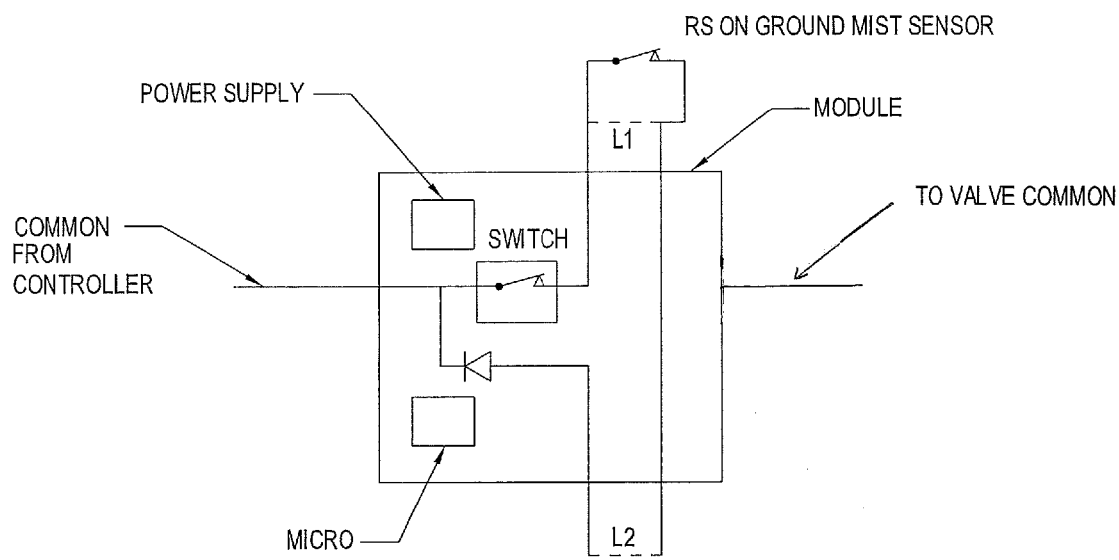
FIG. 23 is a block diagram of an embodiment of a water budgeting module of the present invention.

FIG. 23 shows an input line from a module labeled "common from controller" that goes to the controller common. The line marked "to valve common" goes to the valve common. Loop L1 is cut and the rain switch is attached to the L1 cut lines. If the controller is battery powered, line L2 is left intact. If an AC controller is used, L2 is cut. A microprocessor is provided with the periodic water budget data. A power supply is also provided which can be a battery, solar, ambient light, or AC power supplied from the controller. The switch can be a mechanical or solid state switch and is either in the open or closed state depending upon the water budget stored within the microprocessor. Alternately, the rain switch signal from L1 can go directly into the microprocessor which can then determine how long the switch can remain open based upon the amount of rainfall data provided by the rain switch or tipping bucket.

Figure 24:
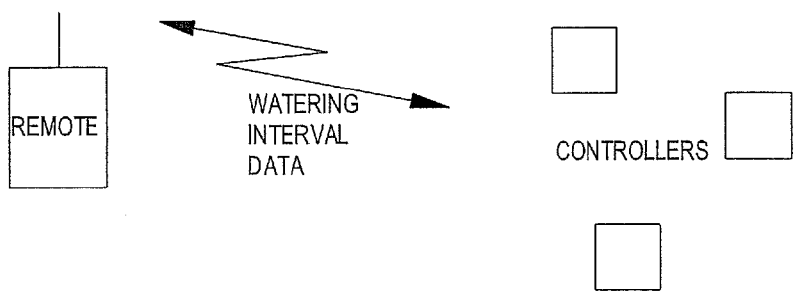
FIG. 24 illustrates an embodiment of a remotely located module providing rain data and periodic water budget data to one or more irrigation controllers.

FIG. 24 shows a remote module located in an area where several controllers (AC or DC powered) are located. This exemplary module includes a rain sensor or switch, a microprocessor, a power supply, and a transmitter. The microprocessor is provided with daily or periodic water budget data, or location information, or both. On a periodic basis, the microprocessor provides data to the transmitter which is also turned on by the microprocessor. The transmitted data is received by either the controller or add on module equipped with a receiver. That information is used by the controller or module to determine the watering interval.

Figure 25A:
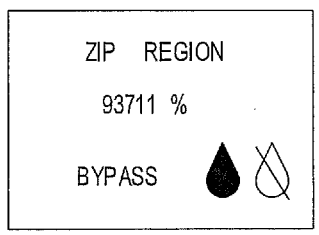
FIG. 25A illustrates a display of an embodiment of the present invention.
Figure 25B:
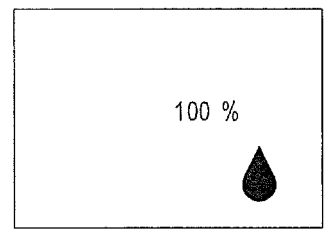
FIG. 25B illustrates a display of a very simple embodiment of the present invention.

FIG. 25A illustrates an exemplary display of a basic bell curve embodiment. The user simply enters either his location with the zip code (i.e. 93711) entry or region. The accumulated percentage is displayed, and when the threshold it is reached (typically 100%), a cutoff switch such as that shown in FIG. 19C is closed. A solid water drop may be used to indicate an allowed watering period, as shown in FIG. 25B. A bypass feature is also available in embodiments of the invention.

Figure 26:
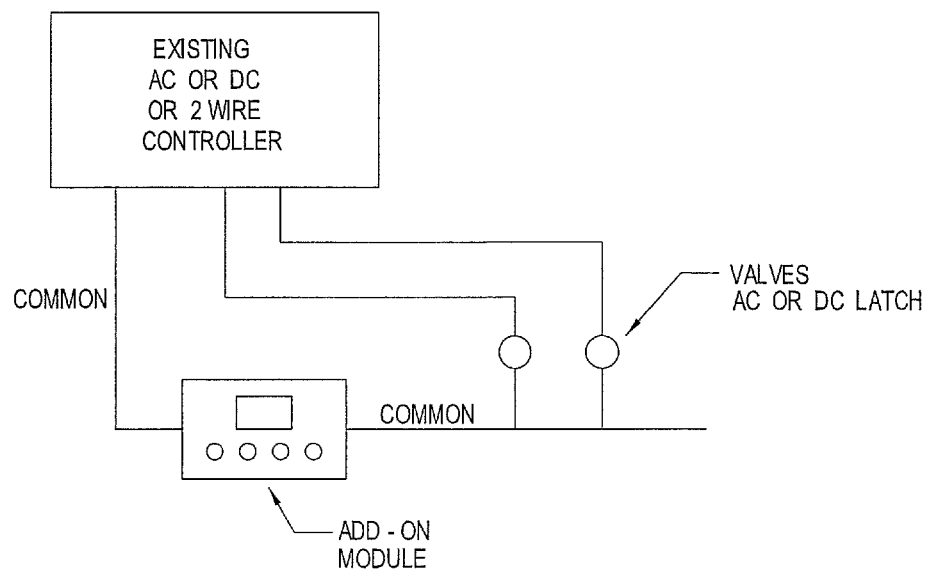
FIG. 26 is a block diagram of an embodiment of a module attached to the common line of an existing controller.

FIG. 26 shows how a simplified add-on is easily connected to the output of an existing controller to just break the common line. The controller operates as it would with its summer schedule, but as the weather and time of the year change, depending upon location, the module accumulation takes longer to reach its threshold, thereby increasing the watering interval. As mentioned previously, a blocking diode can be used inside the module to make the module compatible with a battery powered controller.

Figure 27:
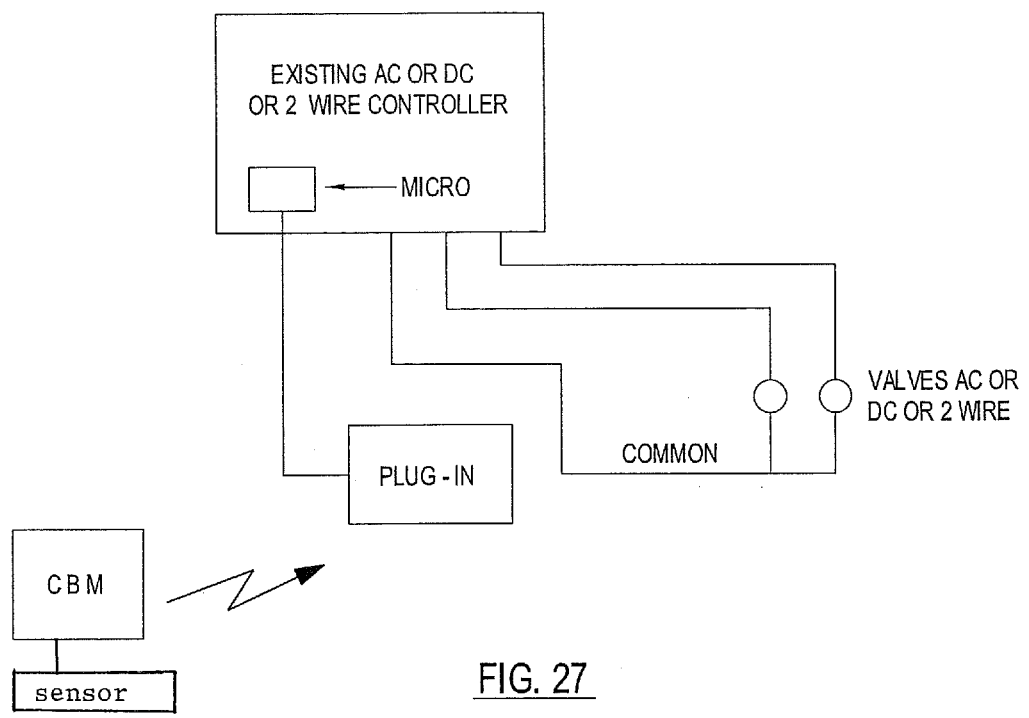
FIG. 27 is a block diagram of an embodiment of an exemplary add-on module of the present invention.

FIG. 27 shows a plug-in version of an exemplary add-on module. In this particular illustrated embodiment, the plug-in device provides the water budget percentage into the controller microprocessor. The percentage used can come from temperature budgeting calculations obtained from environmental sensors as described herein, or from historical ET or soil moisture data for that location. The environmental sensor may include rain, temperature, relative humidity, solar radiation, wind, soil moisture or soil temperature, or combinations thereof. Once the water budget percentage data of the preferred summer peak irrigation schedule is provided, the existing AC or DC or two wire controller then can either perform a daily watering based upon the daily water budget percentage, or accumulate the daily percentages until the threshold is reached. As noted elsewhere herein, the environmental sensor data can be provided by wired or wireless means. The sensors can be as simple as being capable of shutting down irrigation when for example it is raining, or delay irrigation for a certain period of time after the rainfall. Likewise, a temperature sensor can shut down irrigation when the ambient temperature reaches a minimum ambient temperature for freeze protection. Alternately, the sensors can adjust the historical water budget curves by adjusting the run times or watering intervals. The illustrated exemplary plug-in may also be provided with one or more restricted watering schedules for that location to automatically alter the watering schedules originally provided within the controller in order to comply with local requirements.

The advantage of accessing the controller microprocessor directly, specifically the seasonal or water budget feature of a controller, is to provide a relatively simple method of altering the station run times, watering intervals, or allowed watering times without major changes to the existing controller software and hardware. Certain models of irrigation controllers have input ports which can accept plug-ins compatible with specific to certain brands or models. Relatively minor changes to the existing controller software can accept the plug-in data. Environmental sensor data can be provided to the plug-in, and can be hard wired or provided wirelessly to the plug-in. In addition, the sensor data and/or water budget percentage factor and/or local watering restrictions can be broadcast wirelessly from a CBM or a central location to a multitude of plug-ins throughout the local area, community, or water district.

In some embodiments of the present invention, a computer (PC or Mac) is used to provide data for the plug-in or add-on module. In these embodiments, a web site may be accessed by the user, and instead of programming the plug-in or add-on directly, the water budget percentage information and/or watering schedule information is downloaded with the use of the user's personal computer. An exemplary procedure for such a download is set forth below.

In these embodiments, the plug-in or add-on module is supplied with a port, such as without limitation, a USB connection. The module is connected to the computer using this port and is ready for programming. The manufacturer's web site is accessed and the user clicks on, for example, a product programming link. Upon accessing this link, a screen similar to FIG. 28A appears. The current date and time are programmed into the screen as shown. The time could be changed if the module is to be deployed at a location with a different time zone than the download location.

Next, module location information is provided. In this example, the local zip code is entered; however, any suitable location information may be used such as a city name, longitude/latitude, or other geographic identification. The geographic identifier is used to determine what local historical environmental data is to be used by the module. This information may comprise latitude, RA factors, average summer high or low temperatures (e.g. 30-year averages used by weather services), average rainfall, average wind, average solar radiation, average relative humidity, average soil temperature, average relative humidity, average ET, or other average historical daily, monthly or other periodic data, or any combination of the above. Additional information may be provided such as the irrigation zone, the minimum irrigation temperature, and the irrigation delay after rainfall in days or hours.

From the selected historical information a water budget percentage curve is determined for that location as described in the present application. This local water budget percentage data is then communicated to the module. If the module is an add-on, it is then connected in series with the common line of the irrigation controller. In this example, each day the water budget percentage curve determines if it is a watering day. A display indicator such as that shown in FIG. 25 can then indicate to the user the accumulated percentage. Upon reaching or exceeding the threshold percentage, the module allows irrigation for a specified period of time, preferably a 24 hour period, although a longer or shorter time period may be used. If a temperature or rain sensor is used, the minimum irrigation temperature feature can be enabled. If a rain sensor is used (recommended), and rain is detected, irrigation can be interrupted for a specific number of days and hours.

Figure 28:
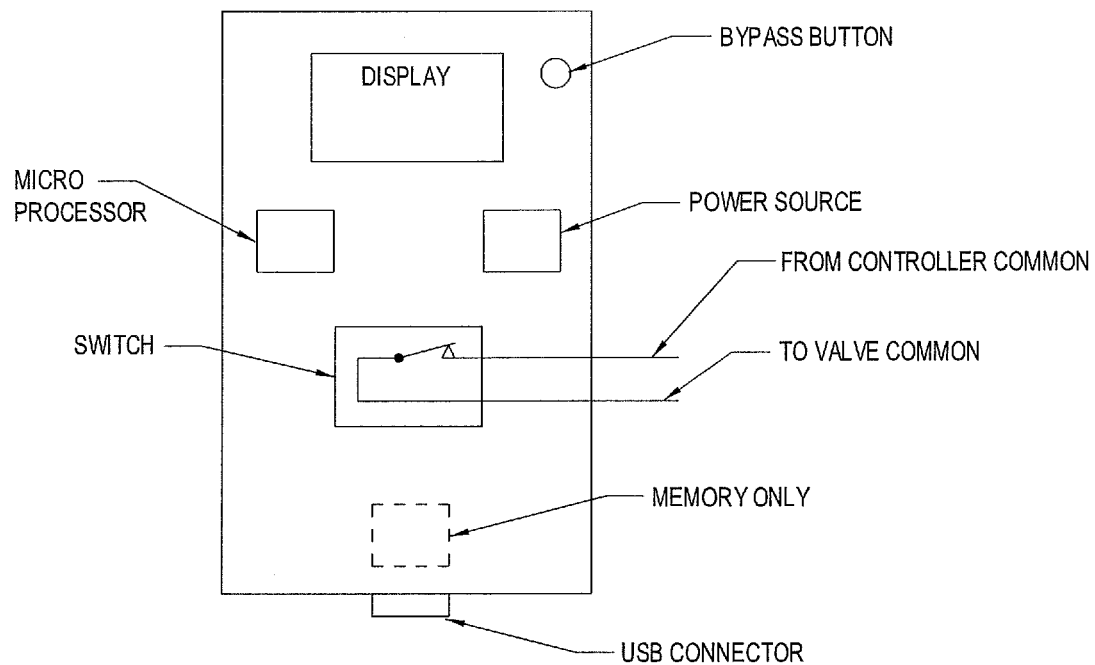

In some embodiments, the module may be used to automatically comply with local watering restrictions. The user may input these restrictions for the location where the module is to be used. In the example of FIG. 28A, and without limitation, the various seasons of the year may be selected. The calendar designation for the seasons the year need not necessarily coincide with the actual seasons. Different parts of the U.S. or world climates will vary, requiring different days of the season. For simplicity and without limitation, the watering periods in the example of FIG. 28A have been identified as spring, summer, fall, and winter. After each season is selected, the user enters the local definition of that season. In the example of FIG. 28A, "spring" has been defined as April 1 through June 30. As noted in the SNWA schedule of FIG. 21A, for example, "Spring" is defined as March-April. It is to be appreciated that different water districts may have different restrictions and designations. For example, if the local watering restrictions are based on even/odd watering days, that information may be entered for the location where the module will be used; if specific watering days of the week are prescribed seasonally, those may be entered; if there are times of day that watering is not allowed, that information may be entered; and if any other local parameters are used, they may be entered. Any other seasonal watering schedules (e.g., Summer, Fall, Winter) may be similarly entered. Upon completion of entry of the watering schedules, these are downloaded into the module which may then be placed on the common line of the controller to its valves, in order to interrupt operation of the valves during non-allowed watering times of the day or non-allowed watering days. As with other embodiments, these restrictions may be used by the module alone or in combination with the water budget percentages and/or with one or more environmental sensors.

An advantage of these embodiments is that all of the average local historical water budget percentage information does not have to be stored into the module—only the water budget percentage curve to be used by the module. Similarly, not every watering schedule needs to be stored. These embodiments provide a convenient way to program modules, and re-program them if necessary, should the local watering schedules be changed, or if the user wants to use different environmental data for the water budget percentages, Any new watering restrictions may be posted onto the water district's web site or the module manufacturer's web site to allow easy modification of the module programming. Another advantage of these embodiments is that the modules can be programmed for smart watering using the water budget percentages, adherence to restricted watering schedules, or both. A simple switch can be provided in the module to select smart watering or restricted watering, or both. Another advantage of these embodiments is that one or more environmental sensors may be provided to further modify or alter irrigation. These embodiments allow implementation of various methods of water budgeting such as temperature budgeting, soil moisture, or ET—where ET is not transmitted to the module, or calculated within the module.

While these approaches can be used with add-on or plug-in modules, the add-on embodiments have the additional important advantage that they are compatible with all controllers—any brand, model, or number of stations, AC, DC, solar, ambient light, or two wire system—because they are designed to simply break the common line to all valves. For reprogramming, the module may be simply unplugged from the common line, reprogrammed, and the reinstalled.

In some embodiments, one or more sets of water budgeting percentages may be derived by calculating a percentage for each day of a time period based on that day's average historical environmental measurement in comparison to a maximum or minimum average historical environmental measurement for the time period, with the periodic adjusting taking place on a daily basis. These average historical environmental measurements may be: average RA, average high air temperature, average low air temperature, average rainfall, average wind, average solar radiation, average relative humidity, average high soil temperature, average low soil temperature, average soil temperature, average soil temperature, and/or average ET.

In some embodiments, more than one set of water budget percentages may be provided to the controller, add-on or plug in, and one of these sets is selected to be used for a geographic location. In addition, one or more restricted watering schedules may also be provided to the controller, add-on or plug-in, with one of these restricted schedules also being selected for use at a geographic location. Some of these embodiments may include a visual display, a reset function, and/or an override function. If one or more environmental sensors are used, they may sense ambient temperature, precipitation, soil moisture, wind, solar radiation, relative humidity, and/or soil temperature.

FIG. 28B illustrates is one possible physical embodiment of FIG. 28A. This embodiment is an add-on or plug-in module which may have the following components: a display, a microprocessor, a power source, a switch, a USB port, and a bypass button. The display is not necessary for the operation of the module, but is convenient for the user to confirm that proper programming has been installed, to observe what the accumulated percentage is, and to check whether the output is on or off. The bypass button is also optional but recommended to allow the user to override the module and allow watering to take place before the accumulation has reached the threshold, and/or if is not a watering day if the restricted watering schedules are implemented.

As described above, in some embodiments, the module may be provided void of any data. The user accesses a web site such as that shown in FIG. 28A and programs all the information required through the USB or other connection to the module. The microprocessor within the module receives the data which can then be confirmed on the display. The internal power source will typically be a lithium battery. A switch is controlled by the microprocessor which interrupts the common line from the controller to the one or more valves when watering is not allowed or insufficient accumulation has occurred.

There are at least two power source options for these devices. One is that the module is self powered with a battery and does not require external power. Another is that a small lithium battery maintains the data, time and date for memory retention purposes; however, the power to operate the display and the switch may be supplied from the nearby irrigation controller (not shown).

In the simplest physical embodiments, no external sensors are used and the historical data stored in the computer for that location is provided to the module in the form of water budget percentages. In other embodiments, a rain sensor may be provided which can interrupt or delay irrigation. Similarly, a temperature sensor can be provided to interrupt irrigation when the temperature falls below a minimum level (e.g. near freezing, such as 34° F.). In more sophisticated versions, various sensors can be provided to adjust the water budget percentages rather than interrupt the irrigation cycle.

In other embodiments, the data from the computer screen is stored into a transfer device such as a memory stick. The memory stick can then be plugged into a controller with a USB or other suitable port, and the controller itself is updated with historical data and/or water percentage bell curves and/or watering restrictions suitable for that location. No power source is required in this case because no real time and date information is required to be continually updated. The irrigation controller already has time and date information. No microprocessor is required because no time keeping, calculation, or switch operation is required—the controller does this. No common line connection is required because there is no switch. No bypass button is required because the device is just a memory device. A commonly available memory stick may be used to transport the information from the computer to the controller. The following examples are provided for illustrative purposes only and without limiting the appended claims.

EXAMPLE 1

By way of example and without limiting the scope of the claims herein, in an exemplary embodiment of the present invention, a module is added to a battery powered valve box controller. In these embodiments, the controller is typically located inside a valve box and is rarely if ever provided with a temperature or rain sensor outside the valve box because of the inconvenience and potential vandalism or damage potential of placing sensors outside a valve box. Normally, with the currently available technology, the controller is programmed with its summer schedule from experience or published guidelines and perhaps adjusted just once or twice a year. This practice wastes a lot of irrigation water, particularly during the spring and fall months as discussed herein. The controller has one or more latching solenoid valves connected by a common wire and separate hot wires to each latching solenoid. Interruption of the common line would not allow a valve to come on when a positive pulse is sent by the controller if the water budget percentage threshold has not been reached. However, if a valve is already on, the shutoff negative pulse cannot reach the valve either because the common line is broken. A diode with the orientation shown across the contact in FIGS. 19B and 22 would allow the shut down signal to reach the latching solenoid and close the valve.

If a rain switch is available, loop L1 is cut and the rain switch wires are connected to them electrically in series with the switch contact. Alternately, the rain switch wires could be connected to the L1 loop wires, but internally to the module, the rain switch or sensor (tipping bucket) information provided directly to the module microprocessor. The microprocessor could then decide based upon its programming how long to keep the switch contact open.

In these examples, any battery powered controller (valve box or field stand alone commercial controller) can alter its watering interval depending upon the time of the year. The summer irrigation run times would be run, almost daily during the summer, and at longer intervals during the other times of the year depending upon the water budget bell curve used (see FIG. 1A). Other than in Hawaii where the year round temperatures do not vary appreciably, or Alaska, this method is a simple viable way to provide an externally automated water budget feature. To account for these variations, several water budget curves could be pre-programmed to account for most locations.

If there are limitations on allowed watering times of the day, the controller may be programmed to initiate and end its irrigation cycles within those times of day.

In a specific exemplary application without limiting the scope of the claims herein, the summer schedule may be programmed into a four station valve box battery powered irrigation controller by a qualified licensed landscape contractor in, for example, Anaheim, Calif. The module of the present invention may be attached to the common line between the controller and the common line of the valves. In July, the temperature budgeting bell curve of FIG. 1 determines that irrigation calls for 100% irrigation on July 12. During that day, the module switch stays closed allowing irrigation to occur according to the summer irrigation schedule. If each day of that week is 100%, the controller will allow full irrigation every day of that week if the controller is programmed to water every day.

During the month of October of that year, the bell curve of FIG. 1 shows an average irrigation water budget of 35%. The module in this example would then allow irrigation to occur approximately once every 3 days because it would take three days typically for the water budget percentages to accumulate to the threshold level of 100%. On that third day, the normal summer irrigation schedule would be allowed to run. During December, the daily percentage would drop to 20%, so in this example, the watering interval would be approximately once every 5 days (20%×5=100%).

If optional local watering restrictions are provided, and the threshold is reached on a day when watering is not allowed, then running of the irrigation schedule would be delayed until an allowed watering day.

If an optional precipitation or other environmental sensor is provided, if a condition is identified (e.g. it is raining, or the temperature is below freezing), then running of the irrigation schedule would be further delayed until the condition has passed.

In some embodiments, a display may be provided showing one or more of the following: current date, current time, whether watering is currently being allowed or not, accumulation toward threshold, current sensor (e.g. temperature) input, etc. In some embodiments a reset switch and/or a manual override input (e.g. switch) may also be provided.

It is to be appreciated that different bell curves would be applicable to other parts of the country or the world and would provide different variations of run times or watering intervals.

EXAMPLE 2

In many situations, the available controller is AC powered, whether residential or commercial. Because AC power is used, in these situations, loop L2 in an add-on module of the present invention may be cut because there is no polarity with an AC controller and it is not desirable to have a half wave rectified voltage operating a 24 VAC solenoid valve With L2 cut. (See FIGS. 22 and 23.) A module of the present invention accumulates the estimated water budget percentages of the bell curve and allows watering when the threshold is reached. If a rain switch or other environmental sensor is used, and an environmental condition is detected that would prevent watering, then loop L1 is cut and the sensor or switch itself is connected to break the common line in series with the contact. Alternatively, the environmental data may be provided to the module microprocessor which controls breaking the common line. If there are limitations as to the allowed watering times of day, the controller should be set to initiate and end its irrigation cycle within those allowed times.

EXAMPLE 3

By way of another example and without limiting the scope of the claims herein, in some situations, the water budget periodic percentages may be combined with a precipitation sensor (tipping bucket, rain switch, etc.) and provided in a module that is mounted remotely as shown in FIG. 24. The periodic percentages are added together until the threshold is reached and a turn on signal is wirelessly transmitted to one or more controllers. When the "turn on" signal is reached, the receiver installed outside the controller or internal to the controller (which may be AC, DC, solar, ambient light, or otherwise powered) may be instructed to initiate or allow irrigation during that day or 24 hour period. If the precipitation sensor identifies that it is raining or recently rained, then providing the "turn on" signal would be delayed until that condition no longer exists. If the day to "turn on" the controller is a non-watering day, then the "turn on" signal will be delayed until an allowed watering day. If watering is not allowed during certain times of the day, the controller start times should be set to start and complete irrigation during the allowed times of day.

EXAMPLE 4

By way of another example and without limiting the scope of the claims herein, simple exemplary embodiments of the present invention include pre-programmed annual bell curves or portions thereof appropriate to a particular location, along with the current date and time. For example, an irrigation controller may be pre-programmed with these periodic water budget percentages (WBPs). Alternate methods provide means for downloading the bell curve specific to the location from a PC, memory stick or the like. The date, zone or zip code for the specific bell curve are then directly programmed on the PC and transferred to the module by means of a USB port or the like. Programming in the controller or module then accumulates the WBPs until a threshold is reached, at which time watering is allowed unless delayed by an optional environmental sensor or by optionally included local watering restrictions. If sensors are used, the temperature and/or rain shutdown period can also be pre-programmed through the PC.

The advantages to using a pre-set water budget percentage bell curve in a module are as follows:

1. There is no user programming required, eliminating any possibility of programming error.

2. It is extremely simple to install (e.g., a module may be placed on the common line, in order to break it when appropriate).

3. With the extremely low power required by the microprocessor, no display or temperature sensor, a single battery can power the module for the life of the unit.

4. With no display, no battery to change, or external buttons, the unit can be encapsulated which is ideal for under ground valve box installation.

5. With no access to the module microprocessor from the controller or the secondary, there is no possibility module failure due to power surges or outages.

6. The module is electrically safe to handle.

7. With its extreme simplicity, low component count, and small size, it has a very low manufacturing and retail cost, but great reliability.

8. The module can provide instantaneous water savings and infrastructure pumping cost savings due to its low cost, easy installation, universal applicability to any AC or DC controller, and zero programming.

9. It addresses the existing millions of controllers which would otherwise take years to convert to smart technology.

10. The industry and users are familiar with the water budget feature already available in most existing irrigation controllers. Explaining that this add-on merely alters the irrigation interval based upon an estimated daily water budget percentage would be easy to explain.

EXAMPLE 5

This example assumes that the operator has already determined the preliminary irrigation schedule using any number of commonly available methods, such as personal experience, or from the system designer historical ET or soil type, precipitation rate, slope, and precipitation rate.

Assume for the purpose of this example that an irrigation controller embodying the present invention is to be installed in Fresno, Calif., at 10:15 a.m. on Feb. 15, 2004. This can be a residential AC powered controller, or a commercial AC, DC (battery), solar, or ambient light powered controller. The operator installs the controller and enters the current time, date, month and year. (S)he then enters the local zip code. The display appears as follows:

Current Time/Date: 10:15 AM Feb. 15, 2004
Controller location zip code: 93711

The controller determines from the zip code that the local latitude is 36 N. From its lookup table, it determines that the July RA factor at that latitude is 16.7. From the PRIZM data, the microprocessor or microcontroller determines that the average July high temperature in Fresno for the last 30 years is 96 F. This makes an STBF of 16.7×96=1603.

Assume that the date is now November 2. The recorded high temperature for the previous period (twenty-four hours herein) was 52° F. The controller lookup table based upon the local zip code indicates that the Fresno RA on this particular day is 7.7. This means that the PTBF is 400 (the temperature of 52° F., multiplied by the RA of 7.7). Dividing the PTBF by the STBF provides a WBR value of approximately 0.249. The irrigation duration for this particular period will be decreased to approximately 1.5 minutes of water (the 6 minute initial irrigation schedule, multiplied by the WBR value of 0.249=1.49 minutes of water), thrice per day.

The operator could also program the controller to suspend irrigation if the temperature at the beginning of an irrigation cycle is below the specified minimum temperature, or (if a precipitation sensor is included) if precipitation exists during, or before, an irrigation cycle. For example, assume that precipitation exists during the second watering irrigation time above. The precipitation sensor detects the existence of such precipitation, and communicates such existence to the controller, causing the controller to cancel the previously scheduled second watering duration of 1.5 minutes. Further assume that the minimum temperature is set at 35° F. Further assume that, at the beginning of the third irrigation time above, the current temperature was 34° F. This would cause the controller to cancel the previously scheduled third watering duration of 1.5 minutes.

EXAMPLE 6

In this example, there is no user input to the controller(s) in terms of the zip code, nor is there a requirement for the controllers to store any historical geo-environmental data. Without the need for storing this significant additional data, there generally will be no need for hardware changes such as additional memory storage, nor significant software changes since most controllers already have a manual water budgeting method in use. This example discusses two versions of this application. Both calculate the WBR remotely and transmit it to controllers in the field. In the case where the rain/temperature module is battery powered, it can use technology developed by the present inventor to conserve battery energy, or the battery life can be augmented by means of a small solar panel at the sensor.

The CBM includes a microprocessor or microcontroller with adequate data storage, a wireless transmitter (most likely radio, but other wireless means are suitable), and a temperature sensor. A rain switch is not an integral part of this invention, but effective to maximize water conservation. Typically, this assembly is mounted on a light pole or on top of a building such that it can transmit readily and reliably to every controller within its perimeter. The area covered could be a school, park, golf course, apartment complex, or a series of street medians. The controllers could be valve box controllers with the capability of wireless programming, or above ground controllers mounted on walls, posts, residential AC powered units inside garages, or in a pedestal with an external antenna.

In one embodiment, the CBM containing the WBR calculating microprocessor or microcontroller is pre-programmed with the local geo-environmental data (latitude, and average summer high temperature). This can be accomplished in a number of ways. One way is by downloading the latitude and average high temperature from a hand-held wired or wireless unit with its stored zip codes as described previously. Another way is by means of a set of dip switches on the CBM. These switches (or sets of switches) can be set with the current month or calendar (for the RA factor); additional dip switch(es) may set the latitude; and/or other(s) may provide the average summer high temperature. The temperature sensor monitors the ambient temperature periodically and reports the recorded high temperature of a previous time frame (e.g. over the last 24 hours) to the WBR microprocessor. The extraterrestrial radiation (RA) factor for that particular day is multiplied by the high temperature recorded during the previous time frame and divided by the STBF. This results in the WBR. If it has rained of sufficient amount to activate the rain switch, that information is also supplied to the microprocessor. The remote WBR or $WBR_M$ is transmitted to the controllers within the applicable area. In one embodiment, the controllers receiving this $WBR_M$ data could be addressed individually for separate controller recognition. The controllers receive and process the $WBR_M$ to determine whether to budget or suspend their individual irrigation schedules.

In a broader version of this second example of an application of a remotely and centrally calculated WBR, a city or community could broadcast a universal WBR signal to every controller in its area. Every controller with wireless reception capability could receive this information and determine whether to be water budgeted and/or shut down in case of a rain event, or a low temperature condition, or an excessive wind condition. As an analogy, there are currently capabilities to shut air conditioners within zones in cities to help control the peak hours of air conditioning demand to preserve the capabilities of the power grids. Similar to air conditioning controls, areas of cities could be transmitted the WBR and/or rain shut down commands.

The CBM itself could be programmed by using a hand held wireless programmer, or by manual data entry means such as with the dip switches previously described. The CBM in effect becomes the central controller with self-contained geo-environmental data and temperature, rain, humidity, or wind sensors or the like, that provides information to its field satellite "slave" controllers which use that information to determine if and when and how much to irrigate. Once again, it is to be appreciated that in these embodiments, no sensor data such as a rain switch or wind switch contact change is directly transmitted to controllers. The sensor data is provided to the CBM microprocessor by hard wire connection within the sensor module, and is used by the central processor to calculate a WBR or $WBR_M$ factor. That CBM becomes in effect a central controller that disseminates a water budget ratio in the form of a percentage of irrigation run times, watering intervals, or accumulated water budget percentages to its satellite controllers.

This simple, intuitive, cost-effective, user-friendly approach encourages significantly higher long-term consumer participation, making it possible to save most of the wasted landscape water and subsequent runoff, which in California would be over one million acre feet. The additional infrastructure and environmental benefits of this water conservation have previously been enumerated by the EPA, as described herein.

It is to be appreciated that in alternative embodiments, one or more (or all) of the temperature, precipitation, and rain sensors may be physically separated from the controller itself, and may communicate with the controller via wire or wireless or radio communications.

It is to be appreciated that in alternative embodiments, user input to the controller may be provided directly through a keypad or other input device on the controller, or by using a wireless or radio programming device with the controller having a receiver/transmitter to accept and report such input.

EXAMPLE 7

This example deals with a residential application. The exemplary controller in this example is AC powered and the output to the valves is 24 VAC, although other controllers may be used in an analogous fashion. The controller can be any existing pre-installed conventional one (not having "smart" technology, existing or new). The temperature sensor and optional rain switch are mounted on the eave of the garage and the wires come into the garage as shown in FIG. 13A. The controller may be programmed with its summer irrigation schedule any time of the year for the purpose of this initial temperature budgeting setup. If the TBM is self-DC powered (batteries, solar, etc.), the local zip code and day of month and month may be entered into the TBM by one of any several means already discussed (e.g. dip switches) for convenience, such that the TBM may be pre-programmed with this information prior to the time of installation. If the TBM is not DC powered, it may receive its power from the 24 VAC transformer normally supplied with the controller so that the zip code and month and day information may be supplied to the unit after power up. Once programmed, an internal EPROM memory retains the programmed information in case of power failure. In the case where the TBM is powered with the controller AC, loss of power for short periods of up to one day would not significantly affect the WBR calculating ability of the TBM since the STBF is fixed for a particular zip code, and the RA factor used with the PTBF calculation does not vary significantly from day to day. However, prolonged lack of power would be detrimental since it would result in the inability to update the WBR based on recent temperature readings that could vary significantly from one day to the next.

To install this exemplary embodiment, the wires from the output of the controller to the valves are disconnected from the controller outputs. The controller outputs are instead connected to the TBM inputs using wires, a cable w/connector, or the like, plugged into the controller outputs. The previously disconnected valve wires, including the common, are connected to the outputs from the TBM. Ordinarily, no watering will be wanted during set up, so the common wire to the field from the TBM is disconnected (or not yet connected). The summer irrigation program already in the controller is activated and each station output (e.g., 24 VAC signal) is monitored by the TBM and their times recorded in the TBM microprocessor or microcontroller memory—the TBM "learns" the irrigation schedule. If this is done with the common line disconnected after the module, no watering occurs during the "learning" phase. Upon completion of the summer irrigation cycle, the installer or homeowner reconnects the common to the valves. The TBM monitors the temperature from the temperature sensor and performs the PTBF and WBR calculations. Upon the next start of an irrigation cycle, each station output is monitored. When the WBR (percentage) of duration time is reached for each station, those stations are turned off by the TBM (e.g. by opening the line to the valve, or opening the common).

Since the summer schedule is normally the highest percentage during the course of the year, the WBR will almost always be less than 100% of the summer duration. A WBR over 100% may cause an overlap over another operating station. It may or may not be hydraulically efficient to have more than one valve on at a time. If this is not desirable, for example if the water supply or pressure is inadequate to support two valves at a time, the TBM may be programmed to limit the WBR to the 100% allocated. If an overlap is acceptable, where the TBM has 24 VAC available to it from the controller power supply, the TBM may extend the time while the overlapping station goes on as directed by the controller. This independent monitoring and activation of individual stations allows for multiple programs to run concurrently.

Simplified versions of the TBM are also envisioned. While independent enabling outputs in the module allow for multiple program operation, this practice is not normally done in residential applications for the reasons cited above of limited water supply and operating pressure. In the cases where there are no simultaneous valve operations, the TBM can be simplified as follows: the outputs from the controller are still monitored. However, instead of enabling the individual output means, such as triacs or relays, when the WBR time duration on a station is reached, the common line is opened, terminating (all) valve operation. Once the 100% station duration is reached, the common is reconnected, allowing the next valve in sequence to operate until its WBR time duration is reached, and so on, until all the stations have completed their irrigation durations. See FIG. 13D. This design costs less to manufacture and has improved reliability due to its significantly decreased component count.

To allow for manual testing of certain valves for maintenance purposes, a TBM bypass means may be provided to allow fully timed manual activation without disrupting the maintenance function. Upon reversing the bypass, the WBR monitoring is resumed.

There are several advantages to temperature budgeting with a TBM over ET add on modules:
1. Since the TBM is pre-programmed with its calendar, programming the TBM may be as simple as entering the local zip code.
2. The TBM is compatible with all existing and new 24 VAC output controllers, of which there are an average of one million new sold annually, and about 13.5 million residential controllers in use in the U.S.
3. The TBM is very inexpensive to build, flexible, and qualifies for most government water conservation rebate programs.
4. There are no electrical safety issues with the TBM since it works with class 2 circuits which are considered safe by Underwriters Laboratories standards.
5. The TBM is easy to install and maintain.
6. There are no service fees associated with the TBM, which is a major drawback of other ET "add on" systems.

EXAMPLE 8

Other embodiments of the temperature budgeting methods and apparatus are suitable for all applications: residential, commercial, or turf. In these embodiments, the irrigation schedule of any valve may be adjusted without making hardware or software changes to the controller in use. The valves, solenoids, and the wiring going to the valves are also largely unaffected, except for the installation of the TBM near the solenoids. Exemplary versions of the embodiments of the invention for these methods are described below, and shown in FIG. 13E.

In these embodiments, a TBM is housed in an outdoor (weather proof) enclosure. A temperature sensor is housed within a case in a manner ventilated to provide an accurate ambient temperature reading, in communication with the TBM. Ordinarily, the TBM is battery powered (because of its remote location near the valves), although other empowering means are possible such as a solar panel, or water flow or wind generated power—or AC, if available. Having an internal battery allows the module to be pre-programmed with its calendar and its local zip code and minimum irrigation temperature for convenience prior to installation. Or, the module may be provided with a means for programming the local zip code with, for example, dip switch(es), wireless programming, etc. As an example for entering the zip code via dip switches, dip switch could be set for zip code programming and the zip code entered as follows: (a) flip the numbered position on the dip switch corresponding with the first digit of the zip code to the "on" position for one second, then off; (b) flip the second digit of the 5 digit zip code for to "on" one second then off; (c) continue until all 5 digits are entered; (d) return the zip code programming dip switch to its "off" position. The 5 digit zip code is now programmed into this module. As described above, the zip code allows the unit to determine the local latitude and average summer high temperature for that location. The calendar day and month may be pre-programmed at the factory, or at the time of installation. A deviation of a few hours from the actual time will not significantly affect the RA factor daily selection.

If a minimum irrigation temperature is desired, it may be programmed wirelessly, as above, with a second dip switch that is labeled, for example, "min in temp," or by other local means. For example, the same 10-position dip switch used to program the zip code may now be used to enter the minimum irrigation temperature, in conjunction with a mode switch (which could be a toggle or second dip switch) indicating whether the input is a zip code, a minimum temperature, or something else. Thus, if the desired minimum temperature is 36 F, in one embodiment a mode switch is set to indicate that the input is a minimum temperature; then the "3" switch on the 10 position switch is set to "on" then "off", followed by the same with the "6" switch.

Once the module is pre-programmed, it can be mounted on the valve(s) themselves, or separately such as on a short post or stake above ground next to the valves. If vandalism is a concern, the TBM can be mounted inside a cage that is commonly used to protect the controllers or backflow preventors. The wiring from any AC powered controller to the valves is interrupted by the module. Modules for any number of stations can be made available. One module can handle from one station to 8 for typical residential applications, or virtually an unlimited number for larger commercial applications. The common line and each of the solenoid lines from the controller are inputted to the module, and then output to the valves as shown in FIG. 13E. The microprocessor or microcontroller monitors the power (e.g. 24 VAC) from the controller output and "learns" the summer programmed run time for each station the first time each output is energized, as described previously. Starting with the next start of each station, the WBR is calculated and limits the timing of each station based upon that day's WBR.

The TBM itself may be modular. A base unit may incorporate the microprocessor or microcontroller with its PRISM data, zip code entry means, its temperature sensor, and battery. To this base unit, small modules may be plugged in to accommodate any number of individual modules which simply consist of output relays or triacs with their driving circuits and output indicator LEDs. These outputs may be plugged into their base or mother board. In these embodiments, the customer orders exactly the number of stations needed without unnecessary cost for unused stations.

For an example of temperature budgeted watering with one of these embodiments of the TBM, assume that the summer time for station 1 is 10 minutes, for station 2 (on a drip system) is 1 hour, and station 3 (on bubblers) is 14 minutes. If the WBR for that day is calculated at 80%, then station 1 valve will be cut off by the module after 8 minutes of watering, station 2 after 48 minutes, and station 3 after about 11 minutes. With independent station output control, any number of stations can be operated simultaneously if the water supply and pressure permit it. This is one of the limitations of currently available ET add-on modules for most commercial applications in that the common to all valves is cut off at one time.

If a minimum irrigation temperature is programmed, the microprocessor in the TBM checks the current or latest temperature reading to verify that it exceeds the set temperature. If it is below that temperature, it disables all the outputs and no irrigation occurs. If this feature is not programmed or the temperature is above the minimum point, it proceeds with its WBR function.

In a slight variation of this remote TBM method with respect to minimum irrigation temperature, the TBM may be programmed to inhibit irrigation if the maximum temperature of the previous day does not reach a set point. This implies that it was not warm enough to allow for a significant amount of evaporation and plant transpiration to warrant irrigation. This is common in winter in some parts of the country that allows for the shutting off of irrigation for weeks at a time.

An override may be provided in the TBM to allow for manual operation of valves for maintenance purposes. A reset mechanism may also be provided in the TBM to clear the microprocessor memory of the zip code, minimum temperature, etc.

EXAMPLE 9

In this example, a temperature budgeting controller is programmed with its summer irrigation schedule. Because of the soil conditions, slope, and type of landscape vegetation, it is desirable in this example to only irrigate when an adequate minimum amount of irrigation water can efficiently water the plant root zone. This level is determined by experience to be, in this example, 60% of the normal summer station run time. So, the controller (or a CBM in communication with the controller, or a TBM in communication with the outputs from the controller) is programmed not to water if the water budget is less than 60%. Then the winter season arrives, and on a given day, it is not raining, and the temperature, for example, is above a set minimum operating temperature of 35 degrees Fahrenheit. The given day's calculated water budget is 10%. Since this is below the 60% threshold, no watering occurs that day. The next day, the budget is 14%, the following day 18%, and on the fourth day it is 20%. The total after four days is 62%. This exceeds the 60% minimum threshold. If there are no watering day restrictions in that community, (such as in the Los Angeles Metropolitan Water District) on the day the threshold is met (in this case, day four), the irrigation will now be permitted to occur (at 62% of the normal station run time), and the water budgeting accumulation will reset to zero. If the day the threshold is met (day four, in this example) is a non-watering day, the percentages continue to accumulate until an allowed watering day is reached. On the next such day, irrigation will then be permitted using the accumulated percentage of the normal station run time, and the accumulation will be reset to zero and start to accumulate for the next irrigation cycle. In this manner, the appropriate amount of water is supplied for the particular soil conditions on a permitted appropriate watering day.

EXAMPLE 10

A Central Broadcast Module (CBM) may be placed in a central location in a new housing development tract, a park, a large school, or in a city, or the like. The CBM calculates the WBR and may have additional sensor inputs which allow it to modify the WBR as discussed herein such as wind sensor input, a rain sensor (such as a tipping bucket that measures rainfall), etc. Numerous remote controllers (or TBMs) are provided in residences, parks, schools, street medians, and/or other locations throughout the city, each having wireless communications means compatible with the CBM. The controllers or TBMs may all be addressed at the same time, or they may be individually addressable, or they may be addressed in different groups of controllers (e.g. programmed to respond to a given signal, different groups of controllers on the same radio frequency, and other groups on other frequencies, etc.). On a normal day, the WBR may be transmitted periodically (preferably daily) to these field controllers or TBMs. The controllers or TBMs can be AC, DC, solar, or ambient light powered, above the ground or inside valve boxes or inside garages in residential applications, or the like. During normal days, the WBR received by the controllers or TBMs from the CBM or central irrigation system computer will be used to either adjust the station run times, alter the watering intervals, or accumulate to alter one or more irrigation schedules within the controllers. Based upon the selected method, the field controllers or TBMs (or selected ones, or selected groups thereof—depending upon the established addressability) will water with the temperature budgeted "smart" water technology.

If sufficient recent rainfall has occurred, the broadcast WBR may be modified to transmit a very low number, such as a percentage that is below 1%, that is understood by the controllers or TBMs as a signal to shut down irrigation for that day. Upon the automated resetting of the rain sensor (if such a device is used), the irrigation cycles resume based upon the standard water budget calculations. A similar modification to the broadcast WBR may be used in case of excessively windy days, or any other abnormal conditions such as near freezing conditions.

In alternative embodiments, the CBM may be provided with a minimum water budget percentage (described in example five above), and accumulate percentages for a number of days until the minimum percentage is reached before broadcasting a signal to the controllers or TBMs to irrigate (i.e., a percentage of less than 1% is broadcast on the days before the accumulation reaches the minimum threshold). These embodiments may also take into account allowed watering days, such that the CBM broadcasts a signal (such as a percentage less than 1% that is understood as a no-watering signal) and continues accumulation until an allowed watering day, whereupon the accumulated percentage is then broadcast to the controllers or TBMs. If the power or communications fail, the controllers or modules will irrigate according to the last WBR received and will be updated when power returns or communications are re-established.

The advantages to this approach are as follows:
1. Insures controller shut down when irrigation is unnecessary or ineffective such as a rainy or very windy day where most the sprinkler water would be blown onto the sidewalks or streets and running off.
2. In city owned landscaping, such as offices, parks, street medians, etc., the invention eliminates the requirement for city maintenance personnel to manually shut down the controllers, only to return one or a few days later to turn them back on.
3. Automatically saves water.
4. In the case of residential controllers, relieves the homeowners from the responsibility and inconvenience of remembering to shut down the controllers and then turn them back on on allowed watering days.
5. Since the controllers will preferably be programmed with a zip code, as described herein, the city may provide an override signal to certain zip codes to selectively and temporarily shut down certain parts of the city in case of drought created conditions or water delivery limitations Sometime in the near future, assuming that Bill 1881 is implemented, the State of California will require all irrigation controllers to be "smart." Effective Jul. 1, 2007, the Metropolitan Water District (MWD) of Los Angeles no longer rebates controllers that are not officially posted on the IA web site as having been successfully SWAT tested. Furthermore, nationally, the absence of a "WaterSense" label by the EPA will inhibit the sale of irrigation controllers throughout the U.S. For these reasons and for the purposes of the necessity of promoting water conservation, irrigation controller manufacturers are or will soon have to change the designs of dozens of their controller models to some form of "smart" controller. In spite of strong encouragement by water agencies (such as providing 100% price rebates), participation in the installation and use of ET based smart controllers has been minimal. The MWD of Los Angeles reports less than 0.2 percent participation in their 100% rebate program. The SNWA reports less than 0.1% participation. Other water districts report similarly weak participation. The reasons for this minimal participation are as follows:
1. For areas that have no rebates, homeowners do not want to spend hundreds of dollars for a new controller.
2. Homeowners do not want to pay monthly ET based service fees for some of the ET based controllers.
3. Homeowners do not want to learn to program a difficult controller, nor pay for water audits to and assistance in programming their new controller.
4. Some ET controllers require weather stations, which are either too expensive, or impractical to install.
5. Contractors do not have the time to learn to program the dozens of new controllers on the market, nor can they afford the callbacks to re-explain or reprogram the newly installed ET controllers.
6. With this minimal response to new ET controllers, controller manufacturers do not want to completely redesign their entire controller line.

The CBM offers a solution to most of the above listed resistance in the following manner:
1. The CBM may be provided with the zip code information, and calculates the WBR and $WBR_M$. This data is no longer required to be included within individual controllers themselves with the use of the CBM.
2. Virtually every irrigation controller has a manual water budget function whereby the user can manually change the station run time for all stations by a fixed percentage. The present invention automates that method with smart water technology.
3. Using the CBM would require some minor internal changing of the software and hardware of the controller, but in terms of user interface and front panel programming, the controller would look, install, and program identically to the controller they were using previously. This means that the only likely additional input required from the user would be the entry of location information such as the zip code—to match up with the broadcast from the CBM (broadcasts may be for specific zip codes or areas of the city). Such smart controllers would be useful in communities participating in a voluntary but automated shutdown of irrigation when it is raining or during extreme drought conditions.
4. The contractors would be already familiar with the installation and programming of this new controller since it would be virtually identical to the non-smart version 5. The cost of the new controller would be minimally more than the old controller because only a simple receiver would be required for wireless reception. In many instances, controllers are already equipped with radio receivers used with their remote maintenance hand held units. The CBM transmitter could be easily designed to interface with the existing controller receiver
6. The controller would qualify for rebates in most water districts because it is smart
7. The controller should qualify for the WaterSense label.
8. The controller manufacturers could keep the same molded plastic or metal housings
9. There would be little or no training required for the manufacturing, marketing, or for the irrigation distributors.
10. Very little inventory change would be required by the manufacturers.
11. Years of engineering and development time and cost would be saved by the manufacturers.
12. Instructions for installing, programming, and using these new controllers would be minimally greater than for the existing controllers (just enter the local zip code) making them extremely user friendly.
13. It would be a simple task for a centrally located CBM with AC power to transmit over a large area to effectively shut down irrigation not only during rainy, windy, or cold days, but in case of a drought emergency by sending either a city-wide or a zip code or address selective signal for inhibiting irrigation.
14. A controller that is nearly as accurate as an ET based controller, reasonably priced, requires no weather station, has no service fees, and intuitively simple to program, implemented over a large area such as a city, will save much more water than one that cannot accomplish the above.

EXAMPLE 11

In embodiments made for communities that have watering day schedules (such as Clark County, Nev.) or communities that are promoting smart water technology, embodiments of the present invention may provide both smart technology and time of use within the controller, CBM, or TBM capabilities. In these embodiments, instead of broadcasting the shut down signal from a central location in the city, the time of use watering schedules (which may be season dependent) are pre-programmed within the irrigation controller and/or the CBM or TBM. By virtue of the entry of a zip code or other location parameter, the controller or TBM already knows the part of town where it is installed, and can be provided with the watering day schedule(s) for that location. Alternatively, the CBM may have this schedule, and simply broadcast a low water budget ratio signal (e.g. 1% or less). The controller or TBM is programmed to recognize that a WBR or $WBR_M$ below a certain value is to indicate that an inadequate amount of irrigation would occur because it would be of little or no value due to the time of year or the soil condition, the controller would terminate or not allow irrigation under these conditions. Note that no specific sensor data or rain shut down signal is sent to the controller, and that the irrigation is not shut down as is commonly done with rain switches by cutting off the controller output common to the valves. The built-in watering schedule determines whether or not it is a watering day for that zip code or that part of town and controls whether or not irrigation is to occur. Watering may then be allowed based upon the reaching of the set threshold water budget percentage, as described in example five above, or by means of proportionally reducing or increasing the station run times.

Alternately, depending upon the special conditions or limitations of the community, it may be more effective because of user participation to allow the use of the controller or TBM either as only a time of use unit that inhibits irrigation during published days of the week or times of the day depending on the time of the year, or as only a smart controller with the temperature budgeting technology.

EXAMPLE 12

In some embodiments, the calculated water budget ratio or the percentage (ratio) from the selected water budget bell curve may be used to establish a watering interval. In these embodiments, the calculated ratio is converted into a number of days between 1 and 10. For example, a ratio of 20% converts to 5, so that the watering interval is 5 days; a ratio of 25% converts to 4, resulting in a watering interval of 4 days, and so on. Converted ratios are rounded to the closest whole number, for example a ratio of 30% will result in a watering interval of 3 days, but a ratio of 28% will result in an interval of 4 days.

In use, once the ratio is converted into a watering interval, these embodiments of the present invention prevent watering until the watering interval is reached. So, using the 20% figure above, this establishes a watering interval of 5 days. No watering is allowed until the fifth day following the day the ratio was established. When that day is reached, watering according to the full watering schedule is allowed to take place. Ratios calculated during the interim days are ignored. It is to be appreciated that if the watering day determined by the interval occurs on a day when watering is not permitted (e.g., the fifth day is a no-watering day), watering is prevented from day to day, until a day is reached when watering is permitted. Once the watering occurs, a new water budget ratio is then determined, and a new watering interval is established.

In the above example, if watering occurred on the fifth day, then on the sixth day a new ratio would be calculated and a new interval established. If that ratio is 31%, then the new interval is 3 days, and watering is prevented until that day is reached. Then, as above, that day is checked to determine if it is a no-watering day, watering is prevented until an allowed watering day is reached, watering eventually takes place, then a new watering interval is established, and so on.

EXAMPLE 13

The simplified embodiments using bell curves (or portions thereof) specific to particular geographic regions can be combined with time-of-use in a manner similar to the temperature budgeting technology previously described. As shown in FIGS. 19A and 19C, a module may be installed on the common line between the irrigation controller and the valves. Hence the wiring is identical for both the simplified WBP bell curve embodiments and the time of use embodiments. In this example, entering the zip code or selecting the region specific bell curve will determine the irrigation days upon accumulation of the daily WBP percentages, altering the watering intervals during the course of the year. If the municipal watering restriction mode is selected, the module will automatically only allow irrigation on certain days of the week and certain times of the day depending upon the time of the year. In its simplest mode, the time, date, and location are pre-programmed into the module as described previously. The existing controller is programmed with its summer schedule, and the user then simply selects use of the module as a bell curve accumulation water budget device or as a time of use device. The module can be battery powered or powered from the 24 VAC from the existing controller. No sensor is necessary, but rain or temperature sensors are optional, as well as other sensors, as previously described. In operation, the daily WBP percentages are used to determine whether watering is appropriate on a given day or time; however, if the local restrictions prohibit watering on that day or time, this prohibitory information known (because it is part of the pre-programming), and the embodiment simply delays watering until an allowed date/time.

EXAMPLE 14

An existing battery powered controller may be installed inside a valve box, above or below ground level. It is programmed with its summer (peak) irrigation schedule which is typically every day during the summer at this desert location The add-on module is programmed either with the local zip code, or a stored temperature budgeted bell shaped percentage curve is selected. The module itself is battery powered and is pre-programmed with the current date. Based upon the date of the year and location, the water budget is taken off the bell curve each day. When the threshold is reached (preferably 100%), the contact within the module is closed allowing the controller to irrigate with its summer run time(s). Depending upon the time of the year, and location, the watering interval may vary from every day to once every 10 days (if the daily percentage averages 10%).

Other embodiments provide for the controller or module to be housed in its own enclosure that is provided in near proximity to an A/C power source, and to the switches or valves to be operated. The temperature sensor and optional precipitation/humidity sensors may be mounted on the enclosure, or provided nearby in wired or wireless communication with the unit. A typical application of such an embodiment is a residential controller installed inside the garage. In this case, the temperature sensing probe can be routed out of the garage in the same manner as the valve wiring and exposed to the ambient temperature. One or more additional optional sensors (e.g., a precipitation sensor) can also be mounted outside the garage such as on an eave.

EXAMPLE 15

In this example, a remote device (CBM) is provided with a set of water budget percentage curves and a transmitter or transceiver. One or more irrigation controllers, add-ons or plug-ins with complimentary receivers or transceivers are within the wireless transmission range of the CBM. The signal provided from the CBM may be one way, or confirmed by means of a reply if transceivers are used. The CBM should include a set of water budget percentages (WBP) or curves. The CBM may also be provided with a rain sensor and/or a temperature sensor and/or other environmental sensor(s). The water budget percentage curve in the CBM for the location is selected from the set of curves by means of location identification such as zip code or other region designation. The preferred daily water budget percentage (WBP) is broadcast from the CBM to one or more irrigation controllers or modules (plug-ins or add-ons) associated with each controller. If a sufficient amount of precipitation has occurred and recorded by a rain tipping bucket or other rain or precipitation measuring device, an irrigation "shut down" or watering time adjustment signal is provided to the controllers, plug-ins or add-ons. Similarly, if the ambient temperature falls below a certain point, a low temperature signal may be sent to the various receivers. The receiving units may also be identified by means of different addresses to prevent accidental false or spurious receptions. Local watering restrictions may also be provided in the CBM and a "no watering" signal may be broadcast to the controllers or modules to prevent watering during restricted times.

In a specific example, and without limiting the appended claims, a set of controllers may be programmed with summer irrigation schedules suitable for their landscaping using personal experience, or one of several irrigation programs and guidelines. The selected water budget percentage curve in the CBM shows a 30% water budget for a particular day. If the accumulation method is used, no enabling irrigation command is issued. After three more days without rainfall, the accumulation reaches 120% which exceeds a threshold of 100%. The CBM then sends an enabling signal to the remote controllers, plug-ins and/or add-ons, and the respective controllers proceed to irrigate according to their irrigation station run times. If during irrigation the temperature falls below 34 degrees, or the programmed minimum allowed irrigation temperature, or a sufficient amount of precipitation has been reported to the CBM, then a "shut down" signal may be sent out. The receiving controllers, plug-ins and/or add-ons receive the shut down signal. The external add-ons break the common line, the plug-in reports a shut down signal to the controller which then shuts down. If the shut down is received directly by the controller, any ongoing cycle is terminated or not allowed to start. If the signal is received by an add-on, the common line may be broken, disabling power to the AC solenoids. If the shutdown signal is received by the plug-in, it is forwarded to the controller through the controller microprocessor input port which shuts down irrigation. If the controller is DC powered, the diode in the add-on allows a shut down signal to be processed to the latching solenoid, but turn on signals are blocked not allowing a valve to open.

It is to be appreciated that the same CBM may broadcast different water budget percentages, and/or "water" signals, and/or "no water" signals to different or various addressable controllers; and that the same CBM may broadcast different local watering restrictions to different or various addressable controllers. For example, and without limitation, a local water district may allow even numbered street addresses to water on even numbered calendar days, and odd numbered street addresses to water on odd numbered calendar days. In such an example, and without limitation, the CBM may implement these restrictions by broadcasting "no watering" signals to the addressable controllers at even numbered street addresses on odd calendar days.

Other Potential Uses for the Present Invention

The Southern Nevada Water Authority (SNWA) includes Clark County, Nevada and includes Las Vegas. About 500,000 households comprise the area controlled by SNWA. For about 4 years, SNWA has instituted watering restrictions during various times of the year with six designated watering groups, A-F. These "Drought Watering Restrictions" are set forth in FIG. 21. After about 4 years of public education and levied fines for violators of these watering restrictions, SNWA is reporting about 30% compliance to these watering restrictions. This approach has saved a reasonable amount of water. The SNWA total annual water requirement is approximately 300,000 acre feet for residential and commercial use. For about two years, SNWA has encouraged the use of smart controllers by providing up to 50% rebates on the purchase and installation of smart controllers. Fewer than 200 rebates have been processed during this period out of the possible 500,000 potential users of smart controllers. When SNWA's allocation of water is inadequate, their cost to obtain private water is about $11,000 per acre foot. This cost per acre foot is far in excess of other non-desert communities. SNWA recently approved relaxation of watering day restrictions for customers who use smart controllers which are more expensive and much more complicated as we have previously discussed.

The present invention would satisfy the smart controller requirements in either a controller with smart water temperature budgeting technology, a TBM that works with any existing controller, or a CBM that can handle a multitude of controllers. The time of use module would automatically limit the watering to the prescribed day(s) of the week, and would satisfy the watering restrictions and eliminate unnecessary fines. However, this invention would be of greatest value to the SNWA region or other similar regions if the customer could select from either the smart technology or the time of use method, or both simultaneously in areas that have not relaxed the watering day restrictions. In these cases, the embodiment selected could, in some aspects, accumulate the water budget percentages and allow watering on the allowed days, saving both water and the infrastructure pumping and delivering demands. SNWA estimates that if a majority of their customers used either method, about 10% of the entire water needs of Clark County would be saved, or about 30,000 acre feet. In a year when 15,000 acre feet of water needs to be purchased from private entities to satisfy the water needs, this would save one hundred and sixty five million dollars in the cost of water alone, not counting the energy (pumping and delivery) costs. Offering customers a choice of simple smart technology such as offered by the current method, or an easily programmed time of use which are mostly or entirely subsidized by SNWA would strongly encourage residents of Clark County or any other area with similar water related issues to comply.

Additional Potential Uses of the Present Invention

In many communities and municipalities, commercial controllers are scattered throughout the city in parks, street medians, schools, etc. These controllers are programmed from a central system in an office downtown. The central CPU has a custom program that can command these 1000 controllers remotely by radio, pager, or cell phone, satellite, or the like. Each controller can be addressed individually. The irrigation schedules are typically entered on the CPU and downloaded into the field or remote controllers. Each controller is equipped with a wireless transceiver that is compatible with the central system transceiver. The CPU continuously monitors each controller. An ET obtained from a weather station located near the CPU typically provides ET data that is used by such systems. As an alternative, water budgeting information can be provided by the present invention in numerous ways.

For example, a CBM may be mounted on the roof of the CPU office that can send the daily WBR or $WBR_M$ to the CPU that can then in turn transmit this information to the remote controllers at a cost of a fraction of a weather station. The controllers in the field do not need any modifications since they are "slaves" responding to the CPU. The only requirement is to make the signal from the CBM accessible to the CPU. During rainy days, the $WBR_M$ is a low water budget that is used by the CPU to signal the controllers to suspend irrigation. With these methods, no rain or wind switches or any other sensors need to be installed at each controller. Labor is saved because the field controllers do not have to be reprogrammed during or after rainfall, or during cold or windy days. The CBM could be hardwired or transmit the daily WBR to the CPU.

It is apparent from the foregoing that temperature budgeting offers a multitude of embodiments and methods of water conservation in a simple cost effective method can save much more water than any other method, including theoretical ET calculations.

There are currently no means to automatically alter the watering durations or intervals to save water with the hundreds of thousands of installed existing valve box battery powered controllers. The present invention, with or without a wired or wireless rain switch or one or more additional environmental sensors, offers simple methods and apparatus to adjust the irrigation intervals or station run times with no programming required. The date, time, and bell curve (or portion thereof) are pre-programmed into the module. In its simplest form, no display is provided, and being battery powered itself, does not depend upon the limited power from the battery powered controller. With such a configuration the modules can be sealed or encapsulated and installed within the valve box which may be below ground level. The only step required is to connect the module in the common line from the controller to the valves, observing the polarity of the wire that says "to controller common" and "to valve common". Attaching a rain switch or sensor is optional and provision for that connection have been provided for with loop L1 as shown in FIGS. 22 and 23.

Of course, the present invention can be used with above ground battery powered or non AC powered controllers as well as any AC powered controller, stand alone or as part of a central system. This can be accomplished at less than 10% of the cost of a new smart ET based controller.

It is to be understood that variations and modifications of the present invention may be made without departing from the scope thereof. It is also to be understood that different combinations of the various features of the several embodiments disclosed herein may be provided in permutations and/or combinations different from and in addition to those described in the particular exemplary embodiments herein, all within the scope of the present invention. It is also to be understood that the present invention is not to be limited by the specific embodiments disclosed herein, but only in accordance with the appended claims when read in light of the foregoing specification.

What is claimed is:

1. An irrigation system comprising an outdoor located ground mounted enclosure, a controller having an irrigation schedule provided inside said enclosure, and an air temperature sensor located near ground level inside said enclosure in communication with said controller, wherein said controller has programming for smart water technology to use data from said temperature sensor to automatically adjust said irrigation schedule.

2. The irrigation system of claim 1 wherein said smart water technology is selected from the group of water percentage budgeting based, evapotranspiration based, soil moisture based, solar radiation based, and combinations thereof.

3. The irrigation system of claim 1 wherein said smart water technology is water percentage budgeting.

4. The irrigation system of claim 1 further comprising programming for automated non-watering times restrictions, and a user selection between said smart water technology and said automated watering restrictions.

5. The irrigation system of claim 1 further comprising at least one additional environmental sensor selected from the group of precipitation, solar radiation, relative humidity, wind, and combinations thereof.

6. The irrigation system of claim 1 further comprising at least one non-watering times restriction and programming in said controller to prevent watering when not allowed according to an implemented non-watering times restriction.

7. The irrigation system of claim 6 wherein said non-watering times restriction is selected from the group of restricted times of the day, restricted days of the week, restricted days of the month, seasonally variable restrictions, and combinations thereof.

8. A method of automatically adjusting an irrigation schedule in a controller comprising the steps of:
   a. providing said controller inside an outdoor located ground mounted enclosure, wherein said enclosure includes an air temperature sensor located therein near ground level in communication with said controller;
   b. said controller automatically periodically comparing current local environmental data obtained from said temperature sensor to stored local geo-environmental data to determine a water budget percentage; and
   c. said controller automatically periodically adjusting said irrigation schedule according to said water budget percentage.

9. The method of claim 8 wherein said irrigation schedule comprises at least one station run time, and said step of adjusting said irrigation schedule according to said water budget percentage comprises changing at least one station run time.

10. The method of claim 8 wherein said stored local geo-environmental data comprises evapotranspiration data.

11. The method of claim 8 comprising the additional step of said controller automatically preventing watering according to an automatically implemented governmental non-watering times restriction.

12. The method of claim 11 comprising the additional step of automatically changing the watering restriction to be implemented.

13. The method of claim 11 wherein said non-watering time restriction is selected from the group of restricted times of the day, restricted days of the week, restricted days of the month, seasonally variable restrictions, and combinations thereof.

14. The method of claim 11 comprising the additional step of accumulating said water budget percentages until watering is allowed according to said watering restrictions.

15. A method of automatically adjusting an irrigation schedule in a controller comprising the steps of:
   a. providing said controller inside an outdoor located ground mounted enclosure, wherein said enclosure includes an air temperature sensor located therein near ground level in communication with said controller;
   b. providing said controller with smart water technology selected from the group of automated water percentage budgeting, evapotranspiration, solar radiation and soil moisture based; and
   c. said controller automatically adjusting said irrigation schedule according to said smart water technology using data from said temperature sensor.

16. The method of claim 15 wherein said irrigation schedule comprises at least one station run time, and said step of adjusting said irrigation schedule according to said smart water technology comprises changing at least one station run time.

17. The method of claim 15 comprising the additional step of said controller periodically comparing current local environmental data from said temperature sensor to historical local geo-environmental data to determine a water budget percentage, and said step of adjusting said irrigation schedule uses said percentage.

18. The method of claim 17 wherein said historical environmental data comprises evapotranspiration data.

19. The method of claim 17 comprising the additional step of accumulating said water budget percentages until watering is allowed according to an automatically implemented governmental non-watering times restriction.

20. The method of claim 15 comprising the additional step of said controller automatically preventing watering according to an automatically implemented governmental non-watering times restriction.

21. The method of claim 20 wherein said non-watering time restriction is selected from the group of restricted times of the day, restricted days of the week, restricted days of the month, seasonally variable restrictions, and combinations thereof.

22. A method of automatically changing an irrigation schedule of a controller at a location comprising the steps of:
   a. providing said controller inside an outdoor located ground mounted enclosure at said location, wherein said enclosure includes an air temperature sensor located therein near ground level;
   b. providing a separate module wired to said controller;
   c. providing said module with historical environmental data for said location;
   d. providing current environmental data to said module from said temperature sensor;
   e. said module periodically comparing said current local environmental data to said historical environmental data to determine a water budget percentage; and
   f. said module automatically causing adjustment to said irrigation schedule according to said water budget percentage.

23. The method of claim 22 wherein said irrigation schedule comprises at least one station run time, and said step of adjusting said irrigation schedule according to said water budget percentage comprises changing at least one station run time.

24. The method of claim 22 wherein said historical environmental data is selected from the group of evapotranspiration, precipitation, ambient temperature, wind, solar radiation, relative humidity, extraterrestrial radiation, and combinations thereof.

25. The method of claim 22 further comprising at least one additional environmental sensor in communication with said module, said additional environmental sensor being selected from the group of precipitation, solar radiation, wind, relative humidity, and combinations thereof.

26. The method of claim 22 comprising the additional step of providing said controller with data from at least one additional environmental sensor selected from the group of precipitation, solar radiation, relative humidity, wind, freeze and combinations thereof.

27. The method of claim 22 comprising the additional steps of:
   a. providing said separate module with governmental watering restrictions; and
   b. allowing irrigation by said controller based upon said water budget when allowed by said watering restrictions.

28. The method of claim 27 wherein said governmental watering restrictions are selected from the group of restricted times of the day, restricted days of the week, restricted days of the month, seasonally variable restrictions, and combinations thereof.

29. A self-contained irrigation system comprising:
a. an outdoor located ground mounted enclosure;
b. an irrigation controller with a microprocessor located within said enclosure programmed with an irrigation schedule and stored local geo-environmental data;
c. an air temperature sensor located near ground level within said enclosure in communication with said microprocessor;
d. programming in said microprocessor to determine a water budget percentage by comparing current local environmental data from said sensor to said stored local geo-environmental data; and
e. said microprocessor having programming to adjust said irrigation schedule according to said water budget percentage.

30. The irrigation system of claim 29 wherein said irrigation schedule comprises at least one station run time.

31. The irrigation system of claim 29 wherein said stored local geo-environmental data comprises a member selected from the group of: evapotranspiration data, temperature data, precipitation data, rain data, wind data, relative humidity data, solar radiation data and combinations thereof.

32. The irrigation system of claim 29 further comprising at least one additional environmental sensor selected from the group of: precipitation, solar radiation, relative humidity, wind, freeze and combinations thereof.

33. The irrigation system of claim 29 further comprising at least one governmental watering restriction provided to said controller, and programming in said controller to automatically prevent watering according to an implemented governmental watering restriction.

34. The irrigation system of claim 29 further comprising at least one non-watering times restriction and programming in said microprocessor to prevent watering when not allowed according to an implemented non-watering times restriction.

35. The irrigation system of claim 34 wherein said non-watering times restriction is selected from the group of restricted times of the day, restricted days of the week, restricted days of the month, seasonally variable restrictions, and combinations thereof.

36. A method of affecting the operation of an irrigation controller having a microprocessor comprising the steps of:
a. providing said controller inside an outdoor located ground mounted enclosure, said controller being in communication with an air temperature sensor located inside said enclosure near ground level for providing current temperature data to said controller;
b. providing said microprocessor with historical geo-environmental data;
c. said microprocessor periodically determining a water budget percentage by comparing said temperature data to said historical geo-environmental data; and
d. affecting the operation of said controller based upon.

37. The method of claim 36 wherein said historical environmental data comprises a member selected from the group of: evapotranspiration data, temperature data, precipitation data, rain data, wind data, relative humidity data, solar radiation data and combinations thereof.

38. The method of claim 36 comprising the additional step of providing said controller with data from at least one additional environmental sensor selected from the group of precipitation, solar radiation, relative humidity, wind, freeze and combinations thereof.

39. The method of claim 36 comprising the additional step of said controller automatically preventing watering according to an automatically implemented non-watering times restriction.

40. The method of claim 39 wherein said non-watering time restriction is selected from the group of restricted times of the day, restricted days of the week, restricted days of the month, seasonally variable restrictions, and combinations thereof.

41. A method of automatically adjusting an irrigation schedule of a controller comprising the steps of:
a. providing said controller inside an ground mounted outdoor located enclosure, wherein said enclosure includes an air temperature sensor located therein near ground level in communication with said controller;
b. providing said controller with smart water technology;
c. instructing said controller to automatically adjust said irrigation schedule according to the smart water technology of said controller using data from said temperature sensor.

42. The method of claim 41 comprising the additional step of said controller automatically preventing watering according to an automatically implemented non-watering times restriction.

43. The method of claim 42 wherein said non-watering times restriction is selected from the group of restricted times of the day, restricted days of the week, restricted days of the month, seasonally variable restrictions, and combinations thereof.

44. The method of claim 41 wherein said smart water technology is selected from the group of water percentage budgeting, evapotranspiration, soil moisture based, solar radiation, and combinations thereof.

45. The method of claim 41 wherein said smart water technology is water percentage budgeting based on temperature budgeting.

46. The method of claim 41 comprising the additional step of providing said controller with data from at least one additional environmental sensor selected from the group of precipitation, solar radiation, relative humidity, wind, freeze and combinations thereof.

47. An irrigation system comprising:
a. an irrigation controller provided inside an outdoor located ground mounted enclosure, said controller having an input port;
b. a separate module in communication with said controller through said input port; and
c. an air temperature sensor located inside said enclosure near ground level in communication with said module; wherein said module is provided with stored geo-environmental data, and has programming to determine a water budget percentage by comparing current data from said sensor to said stored geo-environmental data, and programming to communicate said water budget percentage to said controller through said input port.

48. The irrigation system of claim 47 further comprising at least one additional environmental sensor selected from the group of precipitation, solar radiation, relative humidity, wind, freeze and combinations thereof.

49. The irrigation system of claim 47 further comprising at least one governmental watering restriction provided to said module, and programming in said module to automatically prevent watering according to an implemented governmental watering restriction.

50. A self-contained outdoor smart irrigation system comprising:
a. a controller having an irrigation schedule provided in an outdoor located ground mounted enclosure;
b. an air temperature sensor located within said enclosure near ground level;

c. a microprocessor in said controller capable of determining a water budget percentage by comparing stored geo-environmental data to data from said sensor;
d. said microprocessor capable of adjusting said irrigation schedule based on said water budget percentage.

51. The irrigation system of claim 50 further comprising at least one watering times restriction and programming to automatically implement at least one watering times restriction and prevent watering according to said implemented restriction.

52. The irrigation system of claim 51 wherein said at least one watering times restriction is selected from the group of restricted times of the day, restricted days of the week, restricted days of the month, seasonally variable restrictions, and combinations thereof.

53. A method of automatically adjusting an irrigation schedule in a controller provided inside an outdoor located ground mounted enclosure, said enclosure having an air temperature sensor provided therein near ground level in communication with said controller comprising the steps of:
   a. said controller automatically preventing watering according to an implemented governmental watering restriction;
   b. said controller periodically comparing current temperature data from said sensor to stored local geo-environmental data to determine a water budget percentage; and
   c. said controller periodically adjusting said irrigation schedule according to said water budget percentage when allowed according to said implemented watering restriction.

54. A self-contained irrigation system comprising:
   a. an irrigation controller mounted within an outdoor located ground mounted enclosure, the controller having self-adjusting technology;
   b. an air temperature sensor located near ground level inside said enclosure, and at least one additional environmental sensor mounted within or upon said outdoor enclosure; and
   c. a microprocessor within said controller that uses data from said temperature sensor to automatically adjust an irrigation schedule of said controller.

55. The irrigation system of claim 54 wherein said microprocessor is capable of using data from said sensor to automatically determine an irrigation schedule of said controller.

56. The self-contained irrigation system of claim 54 wherein said additional environmental sensor is selected from the group of precipitation, solar radiation, relative humidity, wind and combinations thereof.

57. The self-contained irrigation system of claim 54 powered by AC, DC, battery, solar, or ambient light.

58. The irrigation system of claim 54 further comprising at least one non-watering times restriction and programming in said microprocessor to prevent watering when not allowed according to an implemented non-watering times restriction.

59. The irrigation system of claim 58 wherein said non-watering times restriction is selected from the group of restricted times of the day, restricted days of the week, restricted days of the month, seasonally variable restrictions, and combinations thereof.

60. A self-contained irrigation system comprising:
   a. a self-adjusting irrigation controller with a microprocessor provided within an outdoor located ground mounted enclosure;
   b. an air temperature sensor located near ground level within said enclosure in communication with said microprocessor;
   c. said controller microprocessor being capable of adjusting at least one irrigation schedule based on data from said temperature sensor.

61. The self-contained irrigation system of claim 60 further comprising at least one additional environmental sensor selected from the group of precipitation, solar radiation, relative humidity, wind, freeze, and combinations thereof.

62. The irrigation controller of claim 60 further comprising self-adjusting technology selected from the group of evapotranspiration based and water budget percentage based.

63. The irrigation controller of claim 62 wherein said self-adjusting technology is capable of changing one of the group of: station run times, cycle start times, watering days, watering intervals, and combinations thereof.

64. The irrigation system of claim 60 further comprising at least one non-watering times restriction and programming in said microprocessor to prevent watering when not allowed according to an implemented non-watering times restriction.

65. The irrigation system of claim 64 wherein said non-watering times restriction is selected from the group of restricted times of the day, restricted days of the week, restricted days of the month, seasonally variable restrictions, and combinations thereof.

66. A self-adjusting outdoor irrigation system comprising:
   a. a controller provided within an outdoor located ground mounted enclosure;
   b. a microprocessor in said controller programmed with an irrigation schedule and historical geo-environmental data for said location; and
   c. an air temperature sensor located near ground level within said outdoor enclosure and at least one additional environmental sensor for providing current environmental data to said microprocessor,
wherein said microprocessor is capable of automatically adjusting said irrigation schedule according to a comparison of said current environmental data and said historical geo-environmental data for said location.

67. The irrigation system of claim 66 wherein said historical geo-environmental data is selected from the group of evapotranspiration data, temperature data, solar radiation data, wind data, precipitation data, relative humidity data, and combinations thereof.

68. The irrigation system of claim 66 further comprising at least one irrigation shut down sensor.

69. The irrigation system of claim 68 wherein said at least one irrigation shut down sensor is selected from the group of precipitation, freeze, wind, relative humidity, and combinations thereof.

70. The irrigation system of claim 66 wherein said additional environmental sensor is selected from the group comprising of solar radiation, precipitation, wind, relative humidity, and combinations thereof.

71. The irrigation system of claim 66 further comprising at least one non-watering times restriction and programming in said microprocessor to prevent watering when not allowed according to an implemented non-watering times restriction.

72. The irrigation system of claim 71 wherein said non-watering times restriction is selected from the group of restricted times of the day, restricted days of the week, restricted days of the month, seasonally variable restrictions, and combinations thereof.

73. A self-adjusting irrigation controller comprising:
   a. an outdoor located ground mounted enclosure;
   b. an air temperature sensor located within said enclosure near ground level; and
   c. a microprocessor in said controller located within said enclosure that is capable of automatically adjusting an irrigation schedule based upon data from said temperature sensor and historical geo-environmental data programmed into said controller microprocessor.

74. The controller of claim 73 wherein said historical geo-environmental data is selected from the group of evapotranspiration data, temperature data, solar radiation data, wind data, precipitation data, relative humidity data, and combinations thereof.

75. The controller of claim 73 further comprising at least one additional environmental sensor selected from the group of solar radiation, wind, relative humidity, precipitation, and combinations thereof.

76. The controller of claim 73 further comprising programming that is capable of automating a water budget percentage feature of said controller.

77. The controller of claim 73 further comprising a power source selected from the group of: AC, DC, battery, solar and ambient light.

78. The controller of claim 73 further comprising at least one irrigation shut down sensor selected from the group of precipitation, freeze, wind, relative humidity, and combinations thereof.

79. The controller of claim 73 wherein the automatic adjustment of said irrigation schedule comprises adjusting at least one station run time.

80. The controller of claim 73 wherein the automatic adjustment of said irrigation schedule comprises adjusting watering days.

81. The controller of claim 73 further comprising at least one non-watering times restriction and programming in said microprocessor to prevent watering when not allowed according to an implemented non-watering times restriction.

82. The controller of claim 81 wherein said non-watering times restriction is selected from the group of restricted times of the day, restricted days of the week, restricted days of the month, seasonally variable restrictions, and combinations thereof.

83. A method of providing self-adjusting irrigation technology in an outdoor located ground mounted enclosure without remotely located environmental sensors comprising the steps of:
  a. providing an irrigation controller within said enclosure, said controller having programming for self-adjusting irrigation;
  b. placing an air temperature sensor near ground level within said enclosure in communication with said controller; and
  c. said controller periodically using data from said temperature sensor to implement said self-adjusting irrigation technology.

84. The method of claim 83 comprising the additional step of placing at least one additional environmental sensor within or upon said enclosure in communication with said controller.

85. The method of claim 84 wherein said at least one additional environmental sensor is selected form the group of solar radiation, relative humidity, wind, precipitation, freeze, and combinations thereof.

86. The method of claim 83 wherein said self-adjusting technology is selected from the group consisting of: evapotranspiration based and water budget percentage based.

87. The method of claim 83 comprising the additional step of said controller automatically preventing watering according to an automatically implemented non-watering times restriction.

88. The method of claim 87 wherein said non-watering time restriction is selected from the group of restricted times of the day, restricted days of the week, restricted days of the month, seasonally variable restrictions, and combinations thereof.

89. A self-contained irrigation apparatus located within an outdoor located ground mounted enclosure comprising:
  a. an irrigation controller within said enclosure, said controller further comprising a microprocessor with a water budget percentage feature and an irrigation schedule;
  b. a separate module programmed with historical geo-environmental data for said location also located within said enclosure in communication with said controller microprocessor;
  c. an air temperature sensor located near ground level within said enclosure for periodically providing current temperature data to said module; and
  d. said module capable of determining a water budget percentage by comparing said historical geo-environmental data to said temperature sensor data and communicating said percentage to said irrigation controller microprocessor.

90. The irrigation apparatus of claim 89 wherein the controller microprocessor is capable of adjusting its irrigation schedule according to said determined water budget percentage.

91. The irrigation apparatus of claim 89 further comprising at least one additional sensor selected from the group of precipitation, solar radiation, relative humidity, and combinations thereof.

92. The irrigation apparatus of claim 89 further comprising at least one irrigation shut down sensor selected from the group of precipitation, relative humidity, wind, freeze, and combinations thereof.

93. The irrigation apparatus of claim 90 wherein the adjustment to said irrigation schedule is selected from the group of: station run times, irrigation cycle start times, watering days, watering intervals, and combinations thereof.

94. The irrigation apparatus of claim 89 further comprising at least one non-watering times restriction and programming in said controller microprocessor to prevent watering when not allowed according to an implemented non-watering times restriction.

95. The irrigation apparatus of claim 94 wherein said non-watering times restriction is selected from the group of restricted times of the day, restricted days of the week, restricted days of the month, seasonally variable restrictions, and combinations thereof.

96. The irrigation apparatus of claim 89 further comprising at least one non-watering times restriction and programming in said module microprocessor to prevent watering when not allowed according to an implemented non-watering times restriction.

97. The irrigation apparatus of claim 96 wherein said non-watering times restriction is selected from the group of restricted times of the day, restricted days of the week, restricted days of the month, seasonally variable restrictions, and combinations thereof.

98. A method of automating the water budget feature of an irrigation controller provided inside an outdoor located ground mounted enclosure comprising the steps of:
  a. providing a separate module within said enclosure, said module having historical geo-environmental data for said location;
  b. locating an air temperature sensor near ground level within said enclosure in communication with said module;
  c. said temperature sensor periodically providing current temperature data to said module;

d. said module determining a water budget percentage by comparing said historical geo-environmental data to said current temperature data;

e. said module communicating said water budget percentage to said controller through an available input port; and f. said controller automating said water budget feature using said communicated water budget percentage.

99. The method of claim 98 comprising the additional step of providing said existing controller with an irrigation shut down sensor selected from to group of precipitation, freeze, wind, relative humidity, and combinations thereof.

100. The method of claim 98 comprising the additional step of adjusting at least one station run time of said controller using said water budget percentage.

101. The method of claim 98 comprising the additional step of said controller automatically preventing watering according to an automatically implemented non-watering times restriction programmed into said controller.

102. The method of claim 101 wherein said non-watering time restriction is selected from the group of restricted times of the day, restricted days of the week, restricted days of the month, seasonally variable restrictions, and combinations thereof.

103. The method of claim 98 comprising the additional step of said module automatically preventing watering according to an automatically implemented non-watering time restrictions programmed into said module.

104. The method of claim 103 wherein said non-watering time restriction is selected from the group of restricted times of the day, restricted days of the week, restricted days of the month, seasonally variable restrictions, and combinations thereof.

105. An irrigation system comprising:
a. an irrigation controller having a water budget feature located within an outdoor located ground mounted enclosure;
b. a separate module located within said enclosure in communication with said controller, said module having programming to automate the water budget feature of said controller using temperature data;
c. an air temperature sensor located near ground level within said enclosure for periodically providing said module with said temperature data; and
d. a power source for said system selected from the group of AC, DC, solar, battery, and ambient light.

106. The irrigation system of claim 105 further comprising at least one non-watering times restriction and programming in said module to prevent watering when not allowed according to an implemented non-watering times restriction.

107. The irrigation system of claim 106 wherein said non-watering times restriction is selected from the group of restricted times of the day, restricted days of the week, restricted days of the month, seasonally variable restrictions, and combinations thereof.

108. A method of operating a self-adjusting controller having an irrigation schedule located in an outdoor located ground mounted enclosure comprising the steps of:
a. placing an air temperature sensor near ground level within said enclosure;
b. periodically providing temperature data from said temperature sensor to said controller; and
c. said controller modifying said irrigation schedule according to said temperature data.

109. The method of claim 108 comprising the additional step of said controller automatically preventing watering according to an automatically implemented non-watering times restriction.

110. The method of claim 109 wherein said non-watering time restriction is selected from the group of restricted times of the day, restricted days of the week, restricted days of the month, seasonally variable restrictions, and combinations thereof.

111. The method of claim 108 comprising the additional step of providing said self-adjusting controller with at least one additional sensor selected from the group of precipitation, solar radiation, relative humidity, freeze, wind, and combinations thereof.

112. A self-adjusting irrigation controller having an irrigation schedule located in an outdoor located ground mounted enclosure comprising:
a. an air temperature sensor located near ground level within said enclosure and at least one additional environmental sensor located within or upon said enclosure, and
b. programming in said controller to adjust said irrigation schedule according to data provided by said temperature sensor and said at least one additional environmental sensor.

113. The irrigation controller of claim 112 wherein said at least one additional sensor is selected from the group of precipitation, relative humidity, solar radiation, wind, freeze, and combinations thereof.

114. The irrigation controller of claim 112 further comprising at least one non-watering times restriction and programming in said controller to prevent watering when not allowed according to an implemented non-watering times restriction.

115. The irrigation controller of claim 114 wherein said non-watering times restriction is selected from the group of restricted times of the day, restricted days of the week, restricted days of the month, seasonally variable restrictions, and combinations thereof.

116. A self-contained irrigation system comprising:
a. a self-adjusting irrigation controller with an irrigation schedule provided within an outdoor located ground mounted enclosure;
b. an air temperature sensor located near ground level within said enclosure and at least one additional environmental sensor located within or upon said enclosure; and
c. a microprocessor in said controller capable of using data from said at least one environmental sensor and said temperature sensor to automatically modify said irrigation schedule based on evapotranspiration or water budget percentage technology.

117. The irrigation system of claim 116 where said controller is powered by one of the group of: solar, battery, DC, ambient light, and AC.

118. The irrigation system of claim 116 wherein said at least one additional sensor is selected from the group of precipitation, relative humidity, solar radiation, wind, freeze, and combinations thereof.

119. The irrigation system of claim 116 further comprising at least one non-watering times restriction and programming in said microprocessor to prevent watering when not allowed according to an implemented non-watering times restriction.

120. The irrigation system of claim 119 wherein said non-watering times restriction is selected from the group of restricted times of the day, restricted days of the week, restricted days of the month, seasonally variable restrictions, and combinations thereof.

121. A self-contained, self-adjusting irrigation system comprising:
   a. an outdoor located ground mounted enclosure;
   b. a self-adjusting irrigation controller having a microprocessor located within said enclosure; and
   c. an air temperature sensor located near ground level within said enclosure;

wherein said controller microprocessor is capable of adjusting at least one irrigation schedule based on data from said temperature sensor.

122. The irrigation system of claim 121 wherein the self-adjusting technology of said controller is selected from the group of: evapotranspiration based and water budget percentage based.

123. The irrigation system of claim 121 further comprising at least one non-watering times restriction and programming in said controller microprocessor to prevent watering when not allowed according to an implemented non-watering times restriction.

124. The irrigation system of claim 123 wherein said non-watering times restriction is selected from the group of restricted times of the day, restricted days of the week, restricted days of the month, seasonally variable restrictions, and combinations thereof.

125. The irrigation system of claim 121 wherein said controller is battery, solar, or ambient light powered.

126. The irrigation system of claim 121 further comprising an additional sensor selected from the group of precipitation, solar radiation, relative humidity, wind, and combinations thereof, said additional sensor being located within or upon said ground mounted enclosure.

127. A method of adjusting an irrigation schedule of an irrigation controller in an outdoor located ground mounted enclosure comprising the steps of:
   a. providing said irrigation controller with self-adjusting technology;
   b. placing an air temperature sensor near ground level within said enclosure to provide current ambient temperature data to said controller;
   c. providing historic geo-environmental data for said location to said controller;
   d. said controller periodically determining a water budget percentage by comparing said historic geo-environmental data to said current ambient temperature sensor data; and
   e. said controller automatically adjusting said irrigation schedule according to said determined water budget percentage.

128. The method of claim 127 comprising the additional step of providing at least one additional environmental sensor within or upon said enclosure, said sensor being selected from the group of relative humidity, solar radiation, precipitation, wind, and combinations thereof.

129. The method of claim 127 wherein said self-adjusting technology is water budget percentage based or evapotranspiration based.

130. The method of claim 127 comprising the additional steps of:
   a. providing at least one irrigation shut down sensor within or upon said enclosure, said shut down sensor being selected from the group of relative humidity, precipitation, wind, freeze, and combinations thereof, and
   b. shutting down irrigation based on input from said shut down sensor.

131. The method of claim 127 comprising the additional step of powering said irrigation controller from a source selected from the group of AC, DC, battery, solar, and ambient light.

132. The method of claim 127 wherein said step of adjusting said irrigation schedule comprises modifying one of the group of:
   station run times, watering start times, watering intervals, watering days, and combinations thereof.

133. The method of 127 comprising the additional step of providing said irrigation controller with a schedule of allowed watering times.

134. The method of claim 133 with the additional step of allowing irrigation by said irrigation controller when allowed according to said schedule of watering times.

135. The method of claim 133 wherein said schedule of allowed watering times is selected from the group of restricted times of the day, restricted days of the week, restricted days of the month, seasonally variable restrictions, and combinations thereof.

136. The method of claim 127 comprising the additional steps of accumulating water budget percentages and preventing irrigation until a threshold of percentages is reached.

137. The method of claim 127 comprising the additional step of said controller automatically preventing watering according to an automatically implemented non-watering times restriction.

138. A self-adjusting irrigation system comprising:
   a. an irrigation controller with a microprocessor and a power source mounted within an outdoor located ground mounted enclosure;
   b. an air temperature sensor located near ground level within said enclosure in communication with said controller;
   c. at least one additional environmental sensor located within or upon said enclosure in communication with said controller;
   d. said microprocessor receiving and using data from said temperature and said additional environmental sensor to automatically adjust an irrigation schedule of said controller.

139. The irrigation system of claim 138 further comprising at least one additional environmental sensor selected from the group of solar radiation, precipitation, relative humidity, wind, and combinations thereof.

140. The irrigation system of claim 138 further comprising at least one non-watering times restriction and programming in said controller to prevent watering when not allowed according to an implemented non-watering times restriction.

141. The irrigation system of claim 140 wherein said non-watering times restriction is selected from the group of restricted times of the day, restricted days of the week, restricted days of the month, seasonally variable restrictions, and combinations thereof.

142. An irrigation system comprising:
   a. an irrigation controller housed within an outdoor located ground mounted enclosure; and
   b. an air temperature sensor within said enclosure located near ground level in communication with said controller for providing temperature data to said controller.

143. The irrigation system of claim 142 wherein said controller is programmed with smart water technology.

144. The irrigation system of claim 143 wherein said smart water technology is based on one of the group of evapotranspiration, water percentage budgeting, relative humidity, and solar radiation.

145. The irrigation system of claim 143 wherein said controller is further programmed with at least one restricted watering schedule.

146. The irrigation system of claim 142 wherein said controller is powered by one of: AC, DC, battery, solar, and ambient light.

147. The irrigation system of claim 142 further comprising an irrigation shut down sensor selected from the group of freeze, relative humidity, precipitation, wind, and combinations thereof.

148. The irrigation system of claim 142 wherein said controller is capable of using said temperature data to adjust an irrigation schedule of said controller.

149. The irrigation system of claim 142 wherein said controller is capable of using said temperature data to determine an irrigation schedule for said controller.

150. The irrigation system of claim 142 further comprising at least one additional sensor in communication with said controller selected from the group of precipitation, solar radiation, wind, relative humidity, and combinations thereof.

151. An irrigation system comprising an outdoor located ground mounted enclosure, a controller programmed with smart water technology and an irrigation schedule provided inside said enclosure, and an air temperature sensor located near ground level inside said enclosure in communication with said controller for providing environmental data to said controller for use in adjusting said irrigation schedule according to said smart water technology.

152. The irrigation system of claim 151 wherein said controller is programmed with the additional capability of automatically implementing non-watering time restrictions.

153. The irrigation system of claim 152 wherein said non-watering time restrictions are selected from the group of restricted times of the day, restricted days of the week, restricted days of the month, seasonally variable restrictions, and combinations thereof.

154. The irrigation system of claim 151 further comprising an additional sensor selected from the group of a solar radiation sensor, a precipitation sensor, a relative humidity sensor, a freeze sensor, and a wind sensor, and combinations thereof.

155. The irrigation system of claim 151 wherein said smart water technology is selected from the group of water percentage budgeting based, evapotranspiration based, soil moisture based, relative humidity based, solar radiation based, and combinations thereof.

156. The irrigation system of claim 151 wherein said smart water technology is water percentage budgeting.

157. The irrigation system of claim 151 further comprising a user selection between said smart water technology and automated watering restrictions.

158. An irrigation system comprising:
a. a controller including a microprocessor programmed with smart water technology mounted inside an outdoor located ground mounted enclosure;
b. an air temperature sensor located near ground level within said enclosure in communication with said microprocessor;
c. said microprocessor capable of using data from said sensor to automatically adjust at least one irrigation schedule of said controller.

159. The irrigation system of claim 158 wherein said smart water technology is selected from the group of water budget percentage based, evapotranspiration based, soil moisture based, solar radiation based, relative humidity based, and combinations thereof.

160. The irrigation system of claim 158 further comprising at least one additional environmental sensor selected from the group of precipitation, solar radiation, relative humidity, wind, ground moisture, freeze, and combinations thereof.

161. The irrigation system of claim 158 powered by AC, battery, solar, or ambient light.

162. The irrigation system of claim 158 wherein said microprocessor is programmed with the additional capability of automatically implementing at least one governmentally restricted watering schedule provided to said controller.

163. The irrigation system of claim 162 wherein the governmentally restricted watering schedule is selected from the group of: times of the day, days of the week, days of the month, seasonally, and combinations thereof.

164. A method of automating a water budget feature of an irrigation controller housed inside an outdoor located ground mounted enclosure comprising the steps of:
a. locating an air temperature sensor near ground level within said enclosure;
b. providing said controller with historical geo-environmental data for said location;
c. providing said controller with current environmental data from said sensor;
d. said controller periodically comparing said historical geo-environmental data to said current sensor data to determine a water budget percentage; and
e. automating said water budget feature of said controller with said determined water budget percentage.

165. The method of claim 164 comprising the additional step of providing at least one additional sensor selected from the group of temperature, precipitation, solar radiation, relative humidity, wind, freeze, and combinations thereof within or upon said enclosure.

166. The method of claim 164 comprising the additional step of adjusting said irrigation schedule according to one of the group of: station run time, starting time, watering day, and interval of days.

167. The method of claim 164 comprising the additional step of adjusting the irrigation schedule daily.

168. The method of claim 164 comprising the additional steps of:
a. setting a water budget percentage threshold
b. accumulating water budget percentages until said threshold is reached; and
c. allowing irrigation to occur when said accumulated percentages exceed said threshold.

169. A method of automating the water budget feature of an irrigation controller housed in an outdoor located ground mounted enclosure at a location comprising the steps of:
a. providing a separate module within said enclosure with an input port;
b. providing an air temperature sensor near ground level within said enclosure to provide current air temperature data to said module through said input port;
c. programming said module with historical geo-environmental data for said location;
d. said module determining a water budget percentage by comparing said historical geo-environmental data to said current temperature data;
e. communicating said determined water budget percentage to said controller; and
f. said controller automatically adjusting its water budget feature according to said communicated water budget percentage from said separate module.

170. The method of claim 169 comprising the additional steps of providing said module with at least one governmentally restricted watering schedule, and said module preventing said controller from irrigating when not allowed according to said schedule.

171. The method of claim 170 wherein said governmentally restricted watering schedule is selected from the group of: times of the day restrictions, days of the week restrictions, days of the month restrictions, calendar specified seasonal restrictions, and combinations thereof.

172. The method of claim 169 comprising the additional steps of:
 a. establishing a water budget threshold;
 b. periodically accumulating said percentages until said watering threshold is reached; and
 c. said controller preventing irrigation until said threshold is reached.

173. The method of claim 172 comprising the additional steps of providing said controller with at least one restricted watering schedule and allowing irrigation after said threshold is reached according to said watering restrictions.

174. The method of claim 169 comprising the additional steps of providing at least one additional environmental sensor in communication with said module selected from the group of: precipitation, solar radiation, relative humidity, wind, freeze, and combinations thereof, and said module adjusting irrigation according to input from said at least one additional sensor.

175. The method of claim 169 comprising the additional step of powering said controller using one of the group of AC, batteries, solar panels, and ambient light.

176. A method of providing environmental data to an irrigation controller with smart water technology for automatically adjusting an irrigation schedule in said controller comprising the steps of:
 a. providing said smart irrigation controller inside an outdoor located ground mounted enclosure;
 b. providing an air temperature sensor placed near ground level within said enclosure;
 c. communicating data from said sensor to said smart controller; and
 d. said controller using said sensor data to automatically adjust said irrigation schedule.

177. The method of claim 176 comprising the additional steps of providing at least one non-remotely located additional environmental sensor in communication with said controller, said additional sensor being selected from the group of ambient temperature, precipitation, solar radiation, relative humidity, wind, freeze, and combinations thereof; and
 said controller using data from said additional sensor to adjust said irrigation schedule.

178. The method of claim 176 wherein said smart irrigation technology is selected from the group of evapotranspiration based, water budget percentage based, relative humidity based, solar radiation based, or soil moisture based.

179. The method of claim 176 comprising the additional steps of providing said smart irrigation controller with at least one restricted watering schedule selected from the group of watering times of the day, watering days of the week, watering days of the month, seasonal, and combinations thereof, and said controller preventing irrigation when not allowed according to said at least one restricted watering schedule.

180. An irrigation system comprising:
 a. an irrigation controller provided within an outdoor located ground mounted enclosure;
 b. a separate module programmed with historical geo-environmental data provided within said enclosure in communication with said controller; and
 c. an air temperature sensor located near ground level within said enclosure in communication with said module for providing temperature data to said module.

181. The irrigation system of claim 180 wherein said controller is further programmed with at least one restricted watering schedule.

182. The irrigation system of claim 181 wherein said restricted watering schedule is selected from the group of restricted watering times of the day, days of the week, days of the month, seasonally, and combinations thereof.

183. The irrigation system of claim 180 wherein said controller is powered by one of: AC, DC, battery, solar, and ambient light.

184. The irrigation system of claim 180 further comprising an irrigation shut down sensor selected from the group of freeze, relative humidity, precipitation, wind, and combinations thereof.

* * * * *